United States Patent [19]

Ueki et al.

[11] Patent Number: 5,808,989

[45] Date of Patent: *Sep. 15, 1998

[54] OPTICAL DISK RECORDING AND/OR REPRODUCING APPARATUS FOR PERFORMING OPTIMIZING OPERATION FOR SERVO CONTROL WITH RECORDING AND/OR REPRODUCING OPERATION

[75] Inventors: Yasuhiro Ueki, Sagamihara; Hideaki Yamagami; Takeshi Aizawa, both of Yokohama, all of Japan

[73] Assignee: Victor Company of Japan, Ltd., Yokohama, Japan

[ * ] Notice: The term of this patent shall not extend beyond the expiration date of Pat. No. 5,612,939.

[21] Appl. No.: 782,146

[22] Filed: Jan. 10, 1997

Related U.S. Application Data

[63] Continuation of Ser. No. 591,938, Jan. 25, 1996, Pat. No. 5,612,939.

[30] Foreign Application Priority Data

Jan. 27, 1995 [JP] Japan .................................. 7-031514
Nov. 17, 1995 [JP] Japan .................................. 7-323707

[51] Int. Cl.⁶ .................................................... G11B 7/00
[52] U.S. Cl. ................................ 369/48; 369/54; 369/60; 369/94; 369/58
[58] Field of Search ................................ 369/54, 48, 60, 369/47, 94, 32, 44.31, 44.27, 44.38, 44.35, 58, 44.26

[56] References Cited

U.S. PATENT DOCUMENTS

| | | | |
|---|---|---|---|
| 5,212,678 | 5/1993 | Roth et al. | 369/60 |
| 5,337,295 | 8/1994 | Maeda | 369/32 |
| 5,343,456 | 8/1994 | Maeda | 369/59 |
| 5,408,453 | 4/1995 | Holtslag et al. | 369/94 X |
| 5,502,700 | 3/1996 | Shinada | 369/50 |
| 5,532,991 | 7/1996 | Sasaki | 369/54 |
| 5,612,939 | 3/1997 | Ueki et al. | 369/48 |

FOREIGN PATENT DOCUMENTS

| | | |
|---|---|---|
| 0516342 | 12/1992 | European Pat. Off. . |
| 0517491 | 12/1992 | European Pat. Off. . |
| 0620548 | 10/1994 | European Pat. Off. . |
| 62-88176 | 4/1987 | Japan . |
| 1-287874 | 11/1989 | Japan . |
| 6-302104 | 10/1994 | Japan . |

*Primary Examiner*—Thang V. Tran
*Attorney, Agent, or Firm*—Lowe Hauptman Gopstein Gilman & Berner

[57] ABSTRACT

In the beginning of a reproducing operation of information data from a first layer of a disk in an optical disk recording and/or reproducing apparatus, an optimizing operation of a servo control for an optical pick-up through which the information data are reproduced from the first layer is initially performed. Thereafter, the information data read from the first layer are temporarily stored in a DRAM at a first data rate, and the information data are read out from the DRAM to an external apparatus at a second data rate lower than the first data rate. Therefore, a volume of the information data in the DRAM increases in the reproducing operation. When the volume of the information data reaches an upper limit of the DRAM, the optical pick-up is set to a standby condition to stop the reading of the information data from the first layer, and optimizing operations for another or other layers of the disk are performed. During the reproducing operation, when a physical condition of the apparatus or the disk changes in the degree of requiring the optimization of the servo control, the optimizing operations are performed on condition that the optical pick-up is set to the standby condition. Accordingly, the optimizing operations can be performed without interrupting the reproducing operation.

24 Claims, 19 Drawing Sheets

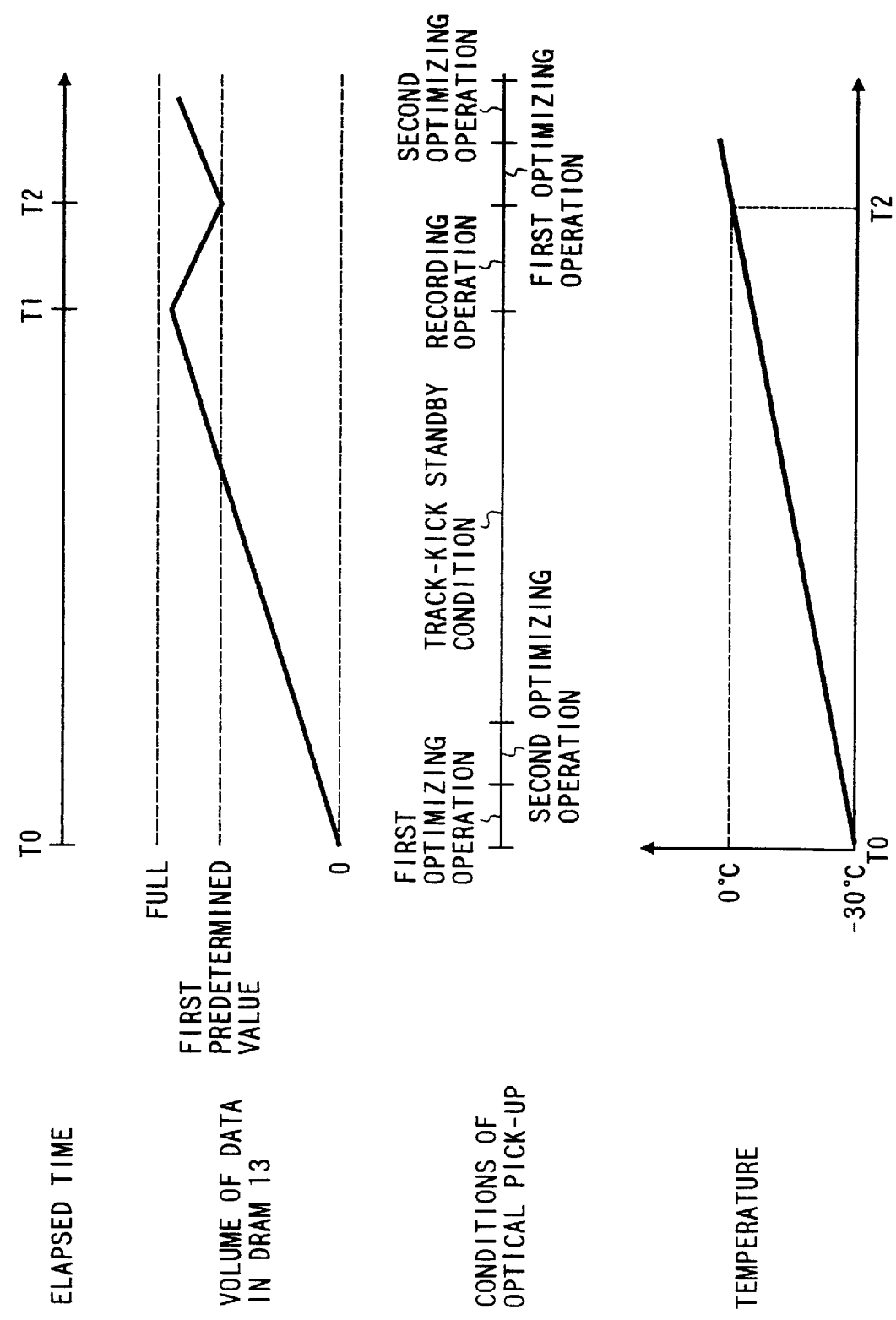

OPTICAL DISK RECORDING AND/OR REPRODUCING APPARATUS FOR PERFORMING OPTIMIZING OPERATION FOR SERVO CONTROL WITH RECORDING AND/OR REPRODUCING OPERATION

This application is a continuation of application Ser. No. 08/591,938 filed Jan. 25, 1996 now U.S. Pat. No. 5,612,939.

BACKGROUND OF THE INVENTION

1. Field of the Invention

The present invention relates generally to an optical disk recording and/or reproducing apparatus in which a signal is recorded or reproduced in/from a disk type of recording medium, and more particularly to an optical disk recording and/or reproducing apparatus in which a servo control mechanism of a recording/reproducing head is appropriately controlled to automatically adjust offset, balance and gain of a tracking error signal and a focus error signal while recording or reproducing a signal in/from a mini-disk (MD) or a phase changing (PC) type of disk on every predetermined block unit time.

2. Description of the Related Art

In general, a tracking control and a focus control for an optical head is performed in an information recording and reproducing apparatus such as an optical disk recording and reproducing apparatus or an optical disk reproducing apparatus to accurately write or read data in a recording or reproducing operation. In these control operations, the optical head is controlled by a so-called servo control circuit. In detail, when an optical beam spot is formed on a type of disk by a laser in a recording operation, an output power (hereinafter, called a laser power) of the laser is adjusted to one of a plurality of intensities indicated by a watt degree because the laser power depends on the type of desk. Also, the laser power is changeably set to one of the intensities in a reproducing operation to read data from any of several types of disks such as a premastered disk and a magneto optical disk, a gain of a tracking error signal and a gain of a focus error signal are respectively changed over to appropriately get a reproduced light, and an offset of each of the error signals is adjusted each time the gain is changed over. In addition, it is required to precisely adjust the offsets of the error signals and balance of the error signals while considering the compatibility with an external apparatus.

Also, even though the offsets, the balance and the gains of the tracking and focus error signals are accurately set, in cases where physical change of working circumstances such as temperature, humidity, voltage of an electric source or the like occurs after the accurate setting, the offsets, the balance and the gains of the tracking and focus error signals change with the physical change of the working circumstances, and it is required to readjust the error signals. In other words, in cases where the offsets, the balance and the gains of the tracking and focus error signals are not readjusted after the physical change of the working circumstances, one or both of the tracking control and the focus control cannot be performed, and the recording or reproducing operation cannot be accurately performed. In a worst case, the recording or reproducing operation cannot be performed at all.

In addition to the physical change of the working circumstances, in cases where a shape of a disk is not uniformly formed, the disk is eccentrically rotated or the disk is rotated while shaking its plane, and the recording or reproducing operation cannot be accurately performed in the same manner.

3. Problems to be Solved by the Invention

However, to readjust the offsets, the balance and the gains of the tracking and focus error signals in case of the physical change of the working circumstances for an optical disk recording and reproducing apparatus and an optical disk reproducing apparatus or the non-uniformity of the disk, it is required to manually stop the operation of the optical disk recording and reproducing apparatus or the optical disk reproducing apparatus, and it is required to manually release the apparatus from the recording or reproducing operation. Therefore, in cases where the working circumstance for the apparatus abruptly changes, data recording or reproduction is erroneously performed in a conventional optical disk recording and reproducing apparatus and a conventional optical disk reproducing apparatus. For example, a disk placed in a first working circumstance such as an outside air temperature of −30° C. is carried in a second working circumstance such as a room temperature of +20° C., and the disk is set in the conventional apparatus, the offsets, the balance and the gains of the tracking and focus error signals automatically set at the beginning of the recording or reproducing operation changes with time because the disk gradually warms, and a servo control becomes impossible when a temperature of the disk exceeds a certain temperature.

SUMMARY OF THE INVENTION

An object of the present invention is to provide, with due consideration to the drawbacks of such a conventional optical disk recording and/or reproducing apparatus, an optical disk recording and/or reproducing apparatus in which offsets, balances and gains of tracking and focus error signals are accurately and reliably readjusted at a short time without interrupting a recording or reproducing operation of the apparatus even though a physical condition (or a circumstance condition) for the apparatus changes or an optical recording medium such as an optical disk is not uniformly formed.

The object is achieved by the provision of an optical disk reproducing apparatus for reproducing pieces of information data recorded in a plurality of layers including a first layer and a second layer of an optical recording medium, comprising:

an optical pick-up for reading out the information data from each of the layers of the optical recording medium;

buffer storing means for temporarily storing the information data read out from each of the layers by the optical pick-up;

data rate controlling means for controlling the writing of the information data in the buffer storing means and the reading-out of the information data from the buffer storing means to write the information data read out by the optical pick-up in the buffer storing means at a first data rate and read out the information data stored in the buffer storing means to an external apparatus at a second data rate lower than the first data rate;

servo control performing means for performing a tracking control of the optical pick-up or a focus control of the optical pick-up;

standby condition setting means for setting the optical pick-up to a standby condition to temporarily stop the reading out of the information data from each of the layers of the optical recording medium performed by the optical pick-up;

optimizing operation performing means for performing a first optimizing operation for the first layer in which the tracking or focus control of the optical pick-up performed by the servo control performing means is optimized to read out the information data from the first layer of the optical recording medium, a second optimizing operation for the second layer in which the tracking or focus control of the optical pick-up performed by the servo control performing means is optimized to read out the information data from the second layer of the optical recording medium and another or other optimizing operations for other layers except for the first and second layers in which the tracking or focus control of the optical pick-up performed by the servo control performing means is optimized to read out the information data from the other layers of the optical recording medium;

reproduction request receiving means for receiving a first request requesting the reproduction of the information data recorded in the first layer of the optical recording medium or a second request requesting the reproduction of the information data recorded in the second layer of the optical recording medium; and controlling means for performing a first control, in cases where the first request is received by the reproduction request receiving means, in which the optimizing operation performing means is controlled to perform the first optimizing operation for the first layer, the optical pick-up of which the tracking or focus control is optimized by the optimizing operation performing means is controlled to read out pieces of first information data from the first layer of the optical recording medium under control of the servo control performing means, the data rate controlling means is controlled to write the first information data read out by the optical pick-up in the buffer storing means at the first data rate and read out the first information data stored in the buffer storing means to the external apparatus at the second data rate, it is judged whether or not a volume of the first information data stored in the buffer storing means is equal to or more than a first predetermined value, the standby condition setting means is controlled to set the optical pick-up to a standby condition in cases where the volume of the first information data is equal to or more than the first predetermined value, the optimizing operation performing means is controlled to perform the second and other optimizing operations for the second and other layers while setting the optical pick-up to the standby condition and reading out the first information data stored in the buffer storing means to the external apparatus, it is judged whether or not the volume of the first information data stored in the buffer storing means is equal to or less than a second predetermined value, and the optical pick-up and the data rate controlling means are controlled to read out pieces of other first information data from the first layer of the optical recording medium and write the other first information data in the buffer storing means in cases where the volume of the first information data is equal to or less than the second predetermined value, and performing a second control, in cases where the second request is received by the reproduction request receiving means, in which the optimizing operation performing means is controlled to perform the second optimizing operation for the second layer, the optical pick-up of which the tracking or focus control is optimized by the optimizing operation performing means is controlled to read out pieces of second information data from the second layer of the optical recording medium under control of the servo control performing means, the data rate controlling means is controlled to write the second information data read out by the optical pick-up in the buffer storing means at the first data rate and read out the second information data stored in the buffer storing means to the external apparatus at the second data rate, it is judged whether or not a volume of the second information data stored in the buffer storing means is equal to or more than the first predetermined value, the standby condition setting means is controlled to set the optical pick-up to a standby condition in cases where the volume of the second information data is equal to or more than the first predetermined value, the optimizing operation performing means is controlled to perform the first and other optimizing operations for the first and other layers while setting the optical pick-up to the standby condition and reading out the second information data stored in the buffer storing means to the external apparatus, it is judged whether or not the volume of the second information data stored in the buffer storing means is equal to or less than the second predetermined value, and the optical pick-up and the data rate controlling means are controlled to write pieces of other first information data read out from the first layer of the optical recording medium in the buffer storing means at the first data rate and read out the other first information data from the buffer storing means at the second data rate in cases where the volume of the second information data is equal to or less than the second predetermined value.

In the above configuration, a plurality of optimizing operations for rearranging and optimizing a focus or tracking control of the optical pick-up for all layers of the optical recording medium are not performed in the beginning of a reproducing operation. That is, in cases where the reproduction of pieces of first (or second) information data recorded in a first (or second) layer of the optical recording medium is requested by an operator, a first (or second) optimizing operation for the first (or second) layer is performed in the beginning of a reproducing operation. Thereafter, the reproduction operation for reproducing pieces of first (or second) information data recorded in the first (or second) layer is performed. In this case, the first (or second) information data are read out by the optical pick-up and are written in the buffer storing means at a first data rate under control of the data rate controlling means, and the first (or second) information data stored in the buffer storing means are read out to an external apparatus at a second data rate lower than the first data rate. Therefore, a volume of the first (or second) information data stored in the buffer storing means is gradually increased. In cases where the volume of the first (or second) information data is equal to or more than the first predetermined value, because it is required to decrease the volume of the information data, it is not required to read out pieces of other first (or second) information data from the first (or second) layer. Therefore, the optical pick-up is set to a standby condition by the standby condition setting means to temporarily stop the reading out of the other first (or second) information data from the first (or second) layer. In the present invention, second (or first) and other optimizing operations for second (or first) and other layers of the optical recording medium are performed during the standby condition of the optical pick-up.

Accordingly, because an optimizing operation for the first (or second) layer is only performed in the beginning of a reproducing operation, a reproducing operation for the first (or second) layer can be immediately started. Also, because second (or first) and other optimizing operations for second (or first) and other layers of the optical recording medium are performed when the optical pick-up is set to a standby condition, offsets, balances and gains of tracking and focus error signals can be accurately and reliably readjusted at a short time in the beginning of the reproducing operation without interrupting the reproducing operation.

Also, the object is achieved by the provision of an optical disk reproducing apparatus for reproducing pieces of information data recorded in a plurality of layers including a first layer and a second layer of an optical recording medium, comprising:

an optical pick-up for reading out the information data from each of the layers of the optical recording medium;

buffer storing means for temporarily storing the information data read out from each of the layers by the optical pick-up;

data rate controlling means for controlling the writing of the information data in the buffer storing means and the reading-out of the information data from the buffer storing means to write the information data read out by the optical pick-up in the buffer storing means at a first data rate and read out the information data stored in the buffer storing means to an external apparatus at a second data rate lower than the first data rate;

servo control performing means for performing a tracking control of the optical pick-up or a focus control of the optical pick-up;

standby condition setting means for setting the optical pick-up to a standby condition to temporarily stop the reading out of the information data from each of the layers of the optical recording medium performed by the optical pick-up;

optimizing operation performing means for performing a first optimizing operation for the first layer in which the tracking or focus control of the optical pick-up performed by the servo control performing means is optimized to read out the information data from the first layer of the optical recording medium, a second optimizing operation for the second layer in which the tracking or focus control of the optical pick-up performed by the servo control performing means is optimized to read out the information data from the second layer of the optical recording medium and another or other optimizing operations for other layers except for the first and second layers in which the tracking or focus control of the optical pick-up performed by the servo control performing means is optimized to read out the information data from the other layers of the optical recording medium;

reproduction request receiving means for receiving a first request requesting the reproduction of the information data recorded in the first layer of the optical recording medium or a second request requesting the reproduction of the information data recorded in the second layer of the optical recording medium;

optimizing operation requesting means for requesting the performance of the first or second optimizing operation of the optimizing operation performing means; and controlling means for performing a first control, in cases where the first request is received by the reproduction request receiving means, in which the optical pick-up is controlled to read out pieces of first information data from the first layer of the optical recording medium under control of the servo control performing means, the data rate controlling means is controlled to write the first information data read out by the optical pick-up in the buffer storing means at the first data rate and read out the first information data stored in the buffer storing means to the external apparatus at the second data rate, it is judged whether or not a volume of the first information data stored in the buffer storing means is equal to or more than a first predetermined value, the standby condition setting means is controlled to set the optical pick-up to a standby condition in cases where the volume of the first information data is equal to or more than the first predetermined value, it is judged whether or not the optimizing operation requesting means requests the performance of the first or second optimizing operation of the optimizing operation performing means in cases where the optical pick-up is set to the standby condition, the optimizing operation performing means is controlled to perform the first optimizing operation for the first layer in cases where the optimizing operation requesting means requests the performance of the first or second optimizing operation of the optimizing operation performing means, the optimizing operation performing means is controlled to perform the second and the other optimizing operations for the second and other layers while reading out the first information data stored in the buffer storing means to the external apparatus in cases where the first optimizing operation is performed by the optimizing operation performing means, it is judged whether or not the volume of the first information data stored in the buffer storing means is equal to or less than a second predetermined value, and the optical pick-up and the data rate controlling means are controlled to read out pieces of other first information data from the first layer of the optical recording medium and write the other first information data in the buffer storing means in cases where the volume of the first information data is equal to or less than the second predetermined value, and performing a second control, in cases where the second request is received by the reproduction request receiving means, in which the optical pick-up is controlled to read out pieces of second information data from the second layer of the optical recording medium under control of the servo control performing means, the data rate controlling means is controlled to write the second information data read out by the optical pick-up in the buffer storing means at the first data rate and read out the second information data stored in the buffer storing means to the external apparatus at the second data rate, it is judged whether or not a volume of the second information data stored in the buffer storing means is equal to or more than a first predetermined value, the standby condition setting means is controlled to set the optical pick-up to a standby condition in cases where the volume of the second information data is equal to or more than the first predetermined value, it is judged whether or not the optimizing operation requesting means requests the performance of the first or second optimizing operation of the optimizing operation performing means in cases where the optical pick-up is set to the standby condition, the optimizing operation performing means is controlled to perform the second optimizing operation for the second layer in cases where the optimizing operation requesting means requests the performance of the first or second optimizing operation of the optimizing operation performing means, the optimizing operation performing means is controlled to perform the first and the other optimizing operations for the first and other layers while reading out the second information data stored in the buffer storing means to the external apparatus in cases where the second optimizing operation is performed by the optimizing operation performing means, it is judged whether or not the volume of the second information data stored in the buffer storing means is equal to or less than a second predetermined value, and the optical pick-up and the data rate controlling means are controlled to write pieces of other second information data read out from the second layer of the optical recording medium in the buffer storing means at the first data rate and read out the other second information data from the buffer storing means at the second data rate in cases where the volume of the second information data is equal to or less than the second predetermined value.

In the above configuration, in cases where the reproduction of pieces of information data recorded in a first (or second) layer of the optical recording medium is requested by an operator, the reproduction operation for reproducing the information data recorded in the first (or second) layer is performed under the control of the controlling means. That is, pieces of first (or second) information data are read out by the optical pick-up and are written in the buffer storing means at a first data rate under control of the data rate controlling means, and the first (or second) information data stored in the buffer storing means are read out to an external apparatus at a second data rate lower than the first data rate. Therefore, a volume of the first (or second) information data stored in the buffer storing means is gradually increased. In cases where the volume of the first (or second) information data is equal to or more than the first predetermined value, it is not required to read out pieces of other first (or second) information data from the first (or second) layer, and the optical pick-up is set to a standby condition by the standby condition setting means to temporarily stop the reading out of the other first (or second) information data from the first (or second) layer. In the present invention, first, second and other optimizing operations for the first, second and other layers of the optical recording medium are performed during the standby condition of the optical pick-up in cases where an optimizing operation is requested by the optimizing operation requesting means.

Accordingly, because the first, second and other optimizing operations for the first, second and other layers of the optical recording medium are performed when the optical pick-up is set to a standby condition, offsets, balances and gains of tracking and focus error signals can be accurately and reliably readjusted at a short time during the reproducing operation without interrupting the reproducing operation of the apparatus.

Also, the object is achieved by the provision of an optical disk recording apparatus for recording pieces of information data transmitted from an external apparatus in a plurality of layers including a first layer and a second layer of an optical recording medium, comprising:

buffer storing means for temporarily storing the information data transmitted from the external apparatus;

data rate controlling means for controlling the writing of the information data in the buffer storing means and the reading-out of the information data from the buffer storing means to read out the information data from the buffer storing means at a first data rate and write the information data transmitted from the external apparatus in the buffer storing means at a second data rate lower than the first data rate;

an optical pick-up for writing the information data read out from the buffer storing means under control of the data rate controlling means in each of the layers of the optical recording medium;

servo control performing means for performing a tracking or focus control for the optical pick-up;

standby condition setting means for setting the optical pick-up to a standby condition to temporarily stop the writing of the information data performed by the optical pick-up;

optimizing operation performing means for performing a first optimizing operation for the first layer in which the tracking or focus control for the optical pick-up performed by the servo control performing means is optimized to write the information data in the first layer of the optical recording medium, a second optimizing operation for the second layer in which the tracking or focus control for the optical pick-up performed by the servo control performing means is optimized to write the information data in the second layer of the optical recording medium and another or other optimizing operations for other layers except for the first and second layers in which the tracking or focus control for the optical pick-up performed by the servo control performing means is optimized to write the information data in the other layers of the optical recording medium;

recording request receiving means for receiving a first request requesting the recording of the information data in the first layer of the optical recording medium or a second request requesting the recording of the information data in the second layer of the optical recording medium; and controlling means for performing a first control, in cases where the first request is received by the recording request receiving means, in which the optimizing operation performing means is controlled to perform the first optimizing operation for the first layer, the data rate controlling means is controlled to write pieces of first information data transmitted from an external apparatus in the buffer storing means at the second data rate and read out the first information data stored in the buffer storing means to the optical pick-up at the first data rate, the optical pick-up of which the tracking or focus control is optimized by the optimizing operation performing means is controlled to write the first information data read out from the buffer storing means in the first layer of the optical recording medium under control of the servo control performing means, it is judged whether or not a volume of the first information data stored in the buffer storing means is equal to or more than a first predetermined value, the standby condition setting means is controlled to set the optical pick-up to the standby condition in cases where the volume of the first information data is less than the first predetermined value, the optimizing operation performing means is controlled to perform the second and other optimizing operations for the second and other layers while writing one or more pieces of other first information data transmitted from the external apparatus in the buffer storing means in cases where the optical pick-up is set to the standby condition and the optical pick-up is controlled to write the first information data stored in the buffer storing means in the first layer of the optical recording medium under control of the servo control performing means in cases where the volume of the first information data is equal to or more than the first predetermined value, and performing a second control, in cases where the second request is received by the recording request receiving means, in which the optimizing operation performing means is controlled to perform the second optimizing operation for the second layer, the data rate controlling means is controlled to write pieces of second information data transmitted from an external apparatus in the buffer storing means at the second data rate and read out the second information data stored in the buffer storing means to the optical pick-up at the first data rate, the optical pick-up of which the tracking or focus control is optimized by the optimizing operation performing means is controlled to write the second information data in the second layer of the optical recording medium under control of the servo control performing means, it is judged whether or not a volume of the second information data stored in the buffer storing means is equal to or more than a first predetermined value, the standby condition setting means is controlled to set the optical pick-up to the standby condition in cases where the volume of the first information data is less than the first predetermined value, the optimizing operation performing means is controlled to perform the first and other optimizing operations for the first and other layers while writing one or more pieces of other second information data transmitted from the external apparatus in the buffer storing means in cases where the optical pick-up is set to the standby condition and the optical pick-up is controlled to write the second information data stored in the buffer storing means in the second layer of the optical recording medium under control of the servo control performing means in cases where the volume of the first information data is equal to or more than the first predetermined value.

In the above configuration, a plurality of optimizing operations for all layers of the optical recording medium are not performed in the beginning of a recording operation. That is, in cases where the recording of pieces of first (or second) information data in a first (or second) layer of the optical recording medium is requested by an operator, a first (or second) optimizing operation for the first (or second) layer is performed in the beginning of a recording operation. Thereafter, the recording operation for recording pieces of first (or second) information data in the first (or second) layer is performed. In this case, the first (or second) information data transmitted from the external apparatus are written in the buffer storing means at the second data rate and are read out from the buffer storing means to the optical pick-up at the first data rate under control of the data rate controlling means. Therefore, a volume of the first (or second) information data stored in the buffer storing means is gradually decreased. In cases where the volume of the first (or second) information data is less than the first predetermined value, because it is required to increase the volume of the information data, it is not required to record the first (or second) information data in the first (or second) layer. Therefore, the optical pick-up is set to a standby condition by the standby condition setting means to temporarily stop the writing of the first (or second) information data in the first (or second) layer. In the present invention, second (or first) and other optimizing operations for second (or first) and other layers of the optical recording medium are performed during the standby condition of the optical pick-up.

Accordingly, because an optimizing operation for the first (or second) layer is only performed in the beginning of a recording operation, a recording operation for the first (or second) layer can be immediately started. Also, because second (or first) and other optimizing operations for second (or first) and other layers of the optical recording medium are performed when the optical pick-up is set to a standby condition, offsets, balances and gains of tracking and focus error signals can be accurately and reliably readjusted at a short time in the beginning of the recording operation without interrupting the recording operation.

Also, the object is achieved by the provision of an optical disk recording apparatus for recording pieces of information data transmitted from an external apparatus in a plurality of layers including a first layer and a second layer of an optical recording medium, comprising:

buffer storing means for temporarily storing the information data transmitted from the external apparatus;

data rate controlling means for controlling the writing of the information data in the buffer storing means and the reading-out of the information data from the buffer storing means to read out the information data from the buffer storing means at a first data rate and write the information data transmitted from the external apparatus in the buffer storing means at a second data rate lower than the first data rate;

an optical pick-up for writing the information data read out from the buffer storing means under control of the data rate controlling means in each of the layers of the optical recording medium;

servo control performing means for performing a tracking or focus control for the optical pick-up;

standby condition setting means for setting the optical pick-up to a standby condition to temporarily stop the writing of the information data performed by the optical pick-up;

optimizing operation performing means for performing a first optimizing operation for the first layer in which the tracking or focus control for the optical pick-up performed by the servo control performing means is optimized to write the information data in the first layer of the optical recording medium, a second optimizing operation for the second layer in which the tracking or focus control for the optical pick-up performed by the servo control performing means is optimized to write the information data in the second layer of the optical recording medium and another or other optimizing operations for other layers except for the first and second layers in which the tracking or focus control for the optical pick-up performed by the servo control performing means is optimized to write the information data in the other layers of the optical recording medium;

recording request receiving means for receiving a first request requesting the recording of the information data in the first layer of the optical recording medium or a second request requesting the recording of the information data in the second layer of the optical recording medium;

optimizing operation requesting means for requesting the performance of the first or second optimizing operation of the optimizing operation performing means; and controlling means for performing a first control, in cases where the first request is received by the reproduction request receiving means, in which the data rate controlling means is controlled to write pieces of first information data transmitted from an external apparatus in the buffer storing means at the second data rate and read out the first information data from the buffer storing means at the first data rate, the optical pick-up is controlled to write the first information data read out from the buffer storing means in the first layer of the optical recording medium, it is judged whether or not a volume of the first information data stored in the buffer storing means is equal to or more than a first predetermined value, the standby condition setting means is controlled to set the optical pick-up to a standby condition in cases where the volume of the first information data is less than the first predetermined value, it is judged whether or not the optimizing operation requesting means requests the performance of the first or second optimizing operation of the optimizing operation performing means in cases where the optical pick-up is set to the standby condition, the optimizing operation performing means is controlled to perform the first optimizing operation for the first layer while writing one or more pieces of other first information data transmitted from the external apparatus in the buffer storing means in cases where the optimizing operation requesting means requests the performance of the first or second optimizing operation of the optimizing operation performing means, the optimizing operation performing means is controlled to perform the second and the other optimizing operations for the second and other layers while writing the other first information data in the buffer storing means in cases where the first optimizing operation is performed by the optimizing operation performing means and the optical pick-up is controlled to write the first information data stored in the buffer storing means in the first layer of the optical recording medium under control of the servo control performing means in cases where the volume of the first information data is equal to or more than the first predetermined value, and performing a second control, in cases where the second request is received by the reproduction request receiving means, in which the data rate controlling means is controlled to write pieces of second information data transmitted from the external apparatus in the buffer storing means at the second data rate and read out the second information data from the buffer storing means at the first data rate, the optical pick-up is controlled to write the second information data read out from the buffer storing means in the second layer of the optical recording medium, it is judged whether or not a volume of the second information data stored in the buffer storing means is equal to or more than the first predetermined value, the standby condition setting means is controlled to set the optical pick-up to a standby condition in cases where the volume of the second information data is less than the first predetermined value, it is judged whether or not the optimizing operation requesting means requests the performance of the first or second optimizing operation of the optimizing operation performing means in cases where the optical pick-up is set to the standby condition, the optimizing operation performing means is controlled to perform the second optimizing operation for the second layer while writing one or more pieces of other second information data transmitted from the external apparatus in the buffer storing means in cases where the optimizing operation requesting means requests the performance of the first or second optimizing operation of the optimizing operation performing means, the optimizing operation performing means is controlled to perform the first and the other optimizing operations for the first and other layers while writing the other second information data in the buffer storing means in cases where the second optimizing operation is performed by the optimizing operation performing means and the optical pick-up is controlled to write the second information data stored in the buffer storing means in the second layer of the optical recording medium under control of the servo control performing means in cases where the volume of the second information data is equal to or more than the first predetermined value.

In the above configuration, in cases where the recording of pieces of information data in a first (or second) layer of the optical recording medium is requested by an operator, a recording operation is performed under the control of the controlling means. That is, pieces of first (or second) information data transmitted from the external apparatus are written in the buffer storing means at the second data rate and are read out from the buffer storing means to the optical pick-up at the first data rate under control of the data rate controlling means, and a volume of the first (or second) information data stored in the buffer storing means is gradually decreased. Therefore, in cases where the volume of the first (or second) information data is less than the first predetermined value, the optical pick-up is set to a standby condition by the standby condition setting means to temporarily stop the writing of the first (or second) information data in the first (or second) layer.

In the present invention, first, second and other optimizing operations for the first, second and other layers of the optical recording medium are performed during the standby condition of the optical pick-up in cases where an optimizing operation is requested by the optimizing operation requesting means. Accordingly, offsets, balances and gains of tracking and focus error signals can be accurately and reliably readjusted at a short time during the recording operation without interrupting the recording operation.

Also, the object is achieved by the provision of an optimizing method of a servo control in an optical disk reproducing apparatus having an optical pick-up for reading out pieces of information data recorded in a plurality of layers including a first layer and a second layer of an optical recording medium, buffer storing means for temporarily storing the information data read out by the optical pick-up, data rate controlling means for controlling the writing of the information data in the buffer storing means and the reading-out of the information data from the buffer storing means to write the information data read out by the optical pick-up in the buffer storing means at a first data rate and read out the information data stored in the buffer storing means to an external apparatus at a second data rate lower than the first data rate, and servo controlling means for performing a tracking or focus control for the optical pick-up, comprising the steps of:

judging whether a first request requesting the reproduction of the information data recorded in the first layer of the optical recording medium is received or a second request requesting the reproduction of the information data recorded in the second layer of the optical recording medium is received;

performing a first optimizing operation for the first layer in which the tracking or focus control performed by the servo controlling means for the optical pick-up through which the information data are read out from the first layer of the optical recording medium is optimized in cases where it is judged that the first request is received;

reading out pieces of first information data from the first layer of the optical recording medium under control of the servo controlling means through the optical pick-up for which the tracking or focus control is optimized;

writing the first information data read out from the first layer in the buffer storing means at the first data rate under control of the data rate controlling means;

reading out the first information data stored in the buffer storing means to an external apparatus at the second data rate under control of the data rate controlling means;

judging whether or not a volume of the first information data stored in the buffer storing means is equal to or more than a first predetermined value;

setting the optical pick-up to a standby condition to temporarily stop the reading of the first information data from the first layer of the optical recording medium in cases where it is judged that the volume of the first information data stored in the buffer storing means is equal to or more than the first predetermined value;

performing second and other optimizing operations for the second and other layers, in which the tracking or focus control performed by the servo controlling means for the optical pick-up through which the information data are read out from the second and other layers of the optical recording medium is optimized, while reading out the first information data stored in the buffer storing means to the external apparatus in cases where the optical pick-up is set to the standby condition;

judging whether or not the volume of the first information data stored in the buffer storing means is equal to or less than a second predetermined value;

reading out pieces of other first information data from the first layer of the optical recording medium though the optical pick-up under control of the servo controlling means and writing the other first information data in the buffer storing means in cases where it is judged that the volume of the first information data is equal to or less than the second predetermined value;

performing the second optimizing operation for the second layer in cases where it is judged that the second request is received;

reading out pieces of second information data from the second layer of the optical recording medium under control of the servo controlling means through the optical pick-up for which the tracking or focus control is optimized;

writing the second information data read out from the second layer in the buffer storing means at the first data rate under control of the data rate controlling means;

reading out the second information data stored in the buffer storing means to the external apparatus at the second data rate under control of the data rate controlling means;

judging whether or not a volume of the second information data stored in the buffer storing means is equal to or more than the first predetermined value;

setting the optical pick-up to the standby condition to temporarily stop the reading of the second information from the second layer of the optical recording medium in cases where it is judged that the volume of the second information data stored in the buffer storing means is equal to or more than the first predetermined value;

performing the first and other optimizing operations for the first and other layers while reading out the second information data stored in the buffer storing means to the external apparatus in cases where the optical pick-up is set to the standby condition;

judging whether or not the volume of the second information data stored in the buffer storing means is equal to or less than the second predetermined value; and reading out pieces of other second information data from the second layer of the optical recording medium though the optical pick-up under control of the servo controlling means and writing the other second information data in the buffer storing means in cases where it is judged that the volume of the second information data is equal to or less than the second predetermined value.

In the above steps, the second (or first) and other optimizing operations for the second (or first) and other layers of the optical recording medium can be performed in the beginning of the reproducing operation for the first (or second) layer without interrupting the reproducing operation.

Also, the object is achieved by the provision of an optimizing method of a servo control in an optical disk reproducing apparatus having an optical pick-up for reading out pieces of information data recorded in a plurality of layers including a first layer and a second layer of an optical recording medium, buffer storing means for temporarily storing the information data read out by the optical pick-up, data rate controlling means for controlling the writing of the information data in the buffer storing means and the reading-out of the information data from the buffer storing means to write the information data read out by the optical pick-up in the buffer storing means at a first data rate and read out the information data stored in the buffer storing means to an external apparatus at a second data rate lower than the first data rate, servo controlling means for performing a tracking or focus control for the optical pick-up, and optimizing operation requesting means for requesting an optimizing operation, comprising the steps of:

judging whether a first request requesting the reproduction of the information data recorded in the first layer of the optical recording medium is received or a second request requesting the reproduction of the information data recorded in the second layer of the optical recording medium is received;

reading out pieces of first information data from the first layer of the optical recording medium under control of the servo controlling means through the optical pick-up in cases where it is judged that the first request is received;

writing the first information data read out from the first layer in the buffer storing means at the first data rate under control of the data rate controlling means;

reading out the first information data stored in the buffer storing means to an external apparatus at the second data rate under control of the data rate controlling means;

judging whether or not a volume of the first information data stored in the buffer storing means is equal to or more than a first predetermined value;

setting the optical pick-up to a standby condition to temporarily stop the reading of the first information data from the first layer of the optical recording medium in cases where it is judged that the volume of the first information data stored in the buffer storing means is equal to or more than the first predetermined value;

judging whether or not the optimizing operation requesting means requests an optimizing operation in cases where the optical pick-up is set to the standby condition;

performing a first optimizing operation for the first layer, in which the tracking or focus control performed by the servo controlling means for the optical pick-up through which the information data are read out from the first layer of the optical recording medium is optimized, while reading out the first information data stored in the buffer storing means to the external apparatus in cases where it is judged that the optimizing operation requesting means requests an optimizing operation;

performing second and other optimizing operations for the second and other layers, in which the tracking or focus control performed by the servo controlling means for the optical pick-up through which the information data are read out from the second and other layers of the optical recording medium is optimized, while reading out the first information data stored in the buffer storing means to the external apparatus in cases where the first optimizing operation is performed;

judging whether or not the volume of the first information data stored in the buffer storing means is equal to or less than a second predetermined value;

reading out pieces of other first information data from the first layer of the optical recording medium though the optical pick-up under control of the servo controlling means and writing the other first information data in the buffer storing means in cases where it is judged that the volume of the first information data is equal to or less than the second predetermined value;

reading out pieces of second information data from the second layer of the optical recording medium under control of the servo controlling means through the optical pick-up in cases where it is judged that the second request is received;

writing the second information data read out from the second layer in the buffer storing means at the first data rate under control of the data rate controlling means;

reading out the second information data stored in the buffer storing means to the external apparatus at the second data rate under control of the data rate controlling means;

judging whether or not a volume of the second information data stored in the buffer storing means is equal to or more than the first predetermined value;

setting the optical pick-up to the standby condition to temporarily stop the reading of the second information data from the second layer of the optical recording medium in cases where it is judged that the volume of the second information data stored in the buffer storing means is equal to or more than the first predetermined value;

judging whether or not the optimizing operation requesting means requests an optimizing operation in cases where the optical pick-up is set to the standby condition;

performing the second optimizing operation for the second layer while reading out the second information data stored in the buffer storing means to the external apparatus in cases where it is judged that the optimizing operation requesting means requests an optimizing operation;

performing the first and other optimizing operations for the first and other layers while reading out the second information data stored in the buffer storing means to the external apparatus in cases where the second optimizing operation is performed;

judging whether or not the volume of the second information data stored in the buffer storing means is equal to or less than the second predetermined value; and reading out pieces of other second information data from the second layer of the optical recording medium though the optical pick-up under control of the servo controlling means and writing the other second information data in the buffer storing means in cases where it is judged that the volume of the second information data is equal to or less than the second predetermined value.

In the above steps, the first, second and other optimizing operations for the first, second and other layers of the optical recording medium can be performed during the reproducing operation for the first or second layer without interrupting the reproducing operation.

Also, the object is achieved by the provision of an optimizing method of a servo control in an optical disk recording apparatus having buffer storing means for temporarily storing pieces of information data transmitted from an external apparatus, data rate controlling means for controlling the writing of the information data in the buffer storing means and the reading-out of the information data from the buffer storing means to read out the information data from the buffer storing means at a first data rate and write the information data in the buffer storing means at a second data rate lower than the first data rate, an optical pick-up for writing the information data read out from the buffer storing means in a plurality of layers including a first layer and a second layer of an optical recording medium, and servo controlling means for performing a tracking or focus control for the optical pick-up, comprising the steps of:

judging whether a first request requesting the recording of the information data recorded in the first layer of the optical recording medium is received or a second request requesting the recording of the information data recorded in the second layer of the optical recording medium is received;

performing a first optimizing operation for the first layer in which the tracking or focus control performed by the servo controlling means for the optical pick-up through which the information data are written in the first layer of the optical recording medium is optimized in cases where it is judged that the first request is received;

writing pieces of first information data transmitted from the external apparatus in the buffer storing means at the second data rate under the control of the data rate controlling means;

reading out the first information data stored in the buffer storing means to the optical pick-up at the first data rate under the control of the data rate controlling means;

judging whether or not a volume of the first information data stored in the buffer storing means is equal to or more than a first predetermined value;

setting the optical pick-up to a standby condition to temporarily stop the writing of the first information data performed by the optical pick-up in cases where the volume of the first information data is less than the first predetermined value;

performing second and other optimizing operations for the second and other layers, in which the tracking or focus control performed by the servo controlling means for the optical pick-up through which the information data are written in the second and other layers of the optical recording medium is optimized, while writing one or more pieces of other first information data transmitted from the external apparatus in the buffer storing means in cases where the optical pick-up is set to the standby condition;

writing the first information data stored in the buffer storing means in the first layer of the optical recording medium under control of the servo controlling means in cases where the volume of the first information data is equal to or more than the first predetermined value;

performing the second optimizing operation for the second layer in cases where it is judged that the second request is received;

writing pieces of second information data transmitted from the external apparatus in the buffer storing means at the second data rate under the control of the data rate controlling means;

reading out the second information data stored in the buffer storing means to the optical pick-up at the first data rate under the control of the data rate controlling means;

judging whether or not a volume of the second information data stored in the buffer storing means is equal to or more than the first predetermined value;

setting the optical pick-up to the standby condition to temporarily stop the writing of the second information data performed by the optical pick-up in cases where the volume of the second information data is less than the first predetermined value;

performing the first and other optimizing operations for the first and other layers while writing one or more pieces of other second information data transmitted from the external apparatus in the buffer storing means in cases where the optical pick-up is set to the standby condition; and writing the second information data stored in the buffer storing means in the second layer of the optical recording medium under control of the servo controlling means in cases where the volume of the second information data is equal to or more than the first predetermined value.

In the above steps, the second (or first) and other optimizing operations for the second (or first) and other layers of the optical recording medium can be performed in the beginning of the recording operation for the first (or second) layer without interrupting the recording operation.

Also, the object is achieved by the provision of an optimizing method of a servo control in an optical disk recording apparatus having buffer storing means for temporarily storing pieces of information data transmitted from an external apparatus, data rate controlling means for controlling the writing of the information data in the buffer storing means and the reading-out of the information data from the buffer storing means to read out the information data from the buffer storing means at a first data rate and write the information data in the buffer storing means at a second data rate lower than the first data rate, an optical pick-up for writing the information data read out from the buffer storing means in a plurality of layers including a first layer and a second layer of an optical recording medium, servo controlling means for performing a tracking or focus control for the optical pick-up, and optimizing operation requesting means for requesting an optimizing operation, comprising the steps of:

judging whether a first request requesting the recording of the information data recorded in the first layer of the optical recording medium is received or a second request requesting the recording of the information data recorded in the second layer of the optical recording medium is received;

writing pieces of information data transmitted from the external apparatus in the buffer storing means at the second data rate under control of the data rate controlling means in cases where it is judged that the first request is received;

reading out the first information data from the buffer storing means at the first data rate under control of the data rate controlling means to write the first information data in the first layer of the optical recording medium through the optical pick-up;

judging whether or not a volume of the first information data stored in the buffer storing means is equal to or more than a first predetermined value;

setting the optical pick-up to a standby condition to temporarily stop the writing of the first information data performed by the optical pick-up in cases where the volume of the first information data is less than the first predetermined value;

judging whether or not the optimizing operation requesting means requests an optimizing operation in cases where the optical pick-up is set to the standby condition;

performing a first optimizing operation for the first layer, in which the tracking or focus control performed by the servo controlling means for the optical pick-up through which the first information data are written in the first layer of the optical recording medium is optimized, while writing one or more pieces of other first information data transmitted from the external apparatus in the buffer storing means in cases where the optimizing operation requesting means requests the optimizing operation;

performing second and other optimizing operations for the second and other layers, in which the tracking or focus control performed by the servo controlling means for the optical pick-up through which the information data are written in the second and other layers of the optical recording medium is optimized, while writing the other first information data in the buffer storing means in cases where the first optimizing operation is performed;

writing the first information data stored in the buffer storing means in the first layer of the optical recording medium through the optical pick-up under control of the servo controlling means in cases where the volume of the first information data is equal to or more than the first predetermined value;

writing pieces of second information data transmitted from the external apparatus in the buffer storing means at the second data rate under control of the data rate controlling means in cases where it is judged that the second request is received;

reading out the second information data from the buffer storing means at the first data rate under control of the data rate controlling means to write the second information data in the first layer of the optical recording medium through the optical pick-up;

judging whether or not a volume of the second information data stored in the buffer storing means is equal to or more than the first predetermined value;

setting the optical pick-up to the standby condition to temporarily stop the writing of the second information data performed by the optical pick-up in cases where the volume of the second information data is less than the first predetermined value;

judging whether or not the optimizing operation requesting means requests an optimizing operation in cases where the optical pick-up is set to the standby condition;

performing the second optimizing operation for the second layer while writing one or more pieces of other second information data transmitted from the external apparatus in the buffer storing means in cases where the optimizing operation requesting means requests the optimizing operation;

performing the first and other optimizing operations for the first and other layers while writing the other second information data in the buffer storing means in cases where the second optimizing operation is performed; and writing the second information data stored in the buffer storing means in the second layer of the optical recording medium through the optical pick-up under control of the servo controlling means in cases where the volume of the second information data is equal to or more than the first predetermined value.

In the above steps, the first, second and other optimizing operations for the first, second and other layers of the optical recording medium can be performed during the recording operation for the first or second layer without interrupting the recording operation.

BRIEF DESCRIPTION OF THE DRAWINGS

The objects, features and advantages of the present invention will be apparent from the following description taken in conjunction with the accompanying drawings, in which:

FIG. 11 shows a timing chart of a volume of data stored in the DRAM in a recording operation, optical pick-up conditions, the transmission of pieces of recording information, and temperatures measured by the temperature sensor;

DETAIL DESCRIPTION OF THE EMBODIMENTS

Preferred embodiments of an optical disk recording and/or reproducing apparatus and an optical disk reproducing apparatus according to the present invention are described with reference to drawings.

Types of digital video disks (DVDs) well-known are classified into a pit type of disk for only reading data in the same manner as a conventional audio type disk for recording audio or sound signals, a phase changing type of optical disk in which data is recordable and reproducible, and a so-called write-once type disk in which data is writable only once. In the embodiments, a type of disk having two recording layers in lamination structure in which data is recordable and reproducible is used for an optical disk recording and/or reproducing apparatus.

Figure 1:
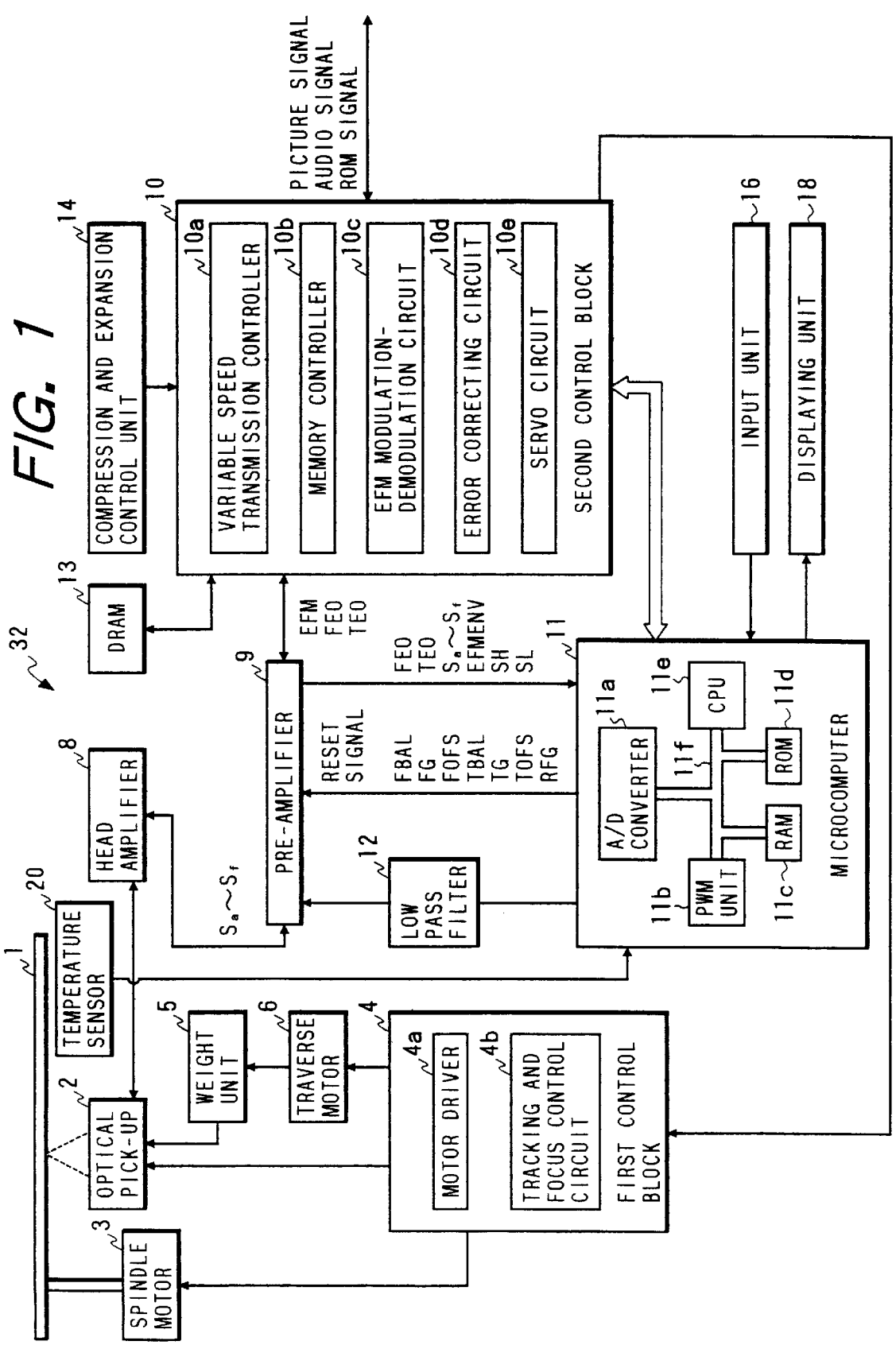
FIG. 1 is a block diagram of a DVD type optical disk recording and/or reproducing apparatus according to a first embodiment of the present invention.

FIG. 1 is a block diagram of a DVD type optical disk recording and/or reproducing apparatus according to a first embodiment of the present invention.

As shown in FIG. 1, an optical disk 1 receives a laser beam radiated from an optical pick-up (or an optical head, an optical magnetic head or a transducer) 2 having a laser diode (not shown). The optical disk 1 has a first layer and a second layer, a series of tracks extending from an inner track portion to an outer track portion is formed in spiral shape in each of the layers of the optical disk 1, and a photo-spot (or a focusing spot) of the laser beam is formed on one track of one layer of the optical disk 1. Therefore, pieces of information data representing document information, aural or sound information and picture information arranged in a prescribed format are optically recorded and reproduced in/from the disk 1. The disk 1 is rotated at a constant linear velocity by a spindle motor 3 under control of a motor driver 4a of a first control block 4. Also, a weight unit 5 is attached to the optical pick-up 2, and the optical pick-up 2 is moved in a radial direction of the disk 1 by a traverse motor 6 under control of the motor driver 4a of the first control block 4 in cooperation with the weight unit 5.

The optical pick-up 2 receives a laser beam which is radiated to the disk 1 from the laser diode of the optical pick-up 2 and reflects on the disk 1. In this case, four types of focus error detecting signals Sa to Sd are obtained from the reflecting laser beam according to an astigmatic aberration method, and two types of tracking error detecting signals Se and Sf are obtained from the reflecting laser beam according to a three-beams method. The focus error detecting signals Sa to Sd and the tracking error detecting signals Se and Sf obtained in the optical pick-up 2 are amplified by a head amplifier 8 by changing frequency characteristics of the reproduced signal, and the detecting signals Sa to Sf are transmitted to a pre-amplifier 9 functioning as a detecting and adjusting means. In the pre-amplifier 9, an eight-to-fourteen modulation (EFM) plus signal indicating a block of information data recorded in the disk 1 is produced from the focus error detecting signals Sa to Sd, the focus error detecting signals Sa to Sd are amplified to produce a focus error signal FEO, and the tracking error detecting signals Se and Sf are amplified to produce a tracking error signal TEO. Also, an actuating signal for actuating the laser diode of the optical pick-up 2 is generated in the pre-amplifier 9, and the actuating signal is applied to the optical pick-up 2 through the head amplifier 8.

The EFM plus signal and the error signals FEO and TEO are transmitted to a second control block 10 comprising a variable speed transmission controller 10a, a memory controller 10b, an EFM modulation-demodulation circuit 10c, an error correcting circuit 10d and a servo circuit 10e. The servo circuit 10e is, for example, formed by a digital signal processor. A servo signal is generated according to the error signals FEO and TEO by the servo circuit 10e of the second control block 10, the motor driver 4a and a tracking and focus control circuit 4b of the first control block 4 is controlled by the servo signal, and a servo control is performed by controlling the optical pick-up 2 under the control of the tracking and focus control circuit 4b of the first control block 4.

A temperature sensor 20 is placed in the neighborhood of the optical pick-up 2 and the disk 1, and an ambient atmosphere temperature is measured by the temperature sensor 20. A temperature signal indicating the ambient atmosphere temperature is output to a microcomputer 11. A dynamic random access memory (DRAM) 13 having a memory capacity of 4 Mbits is provided to temporarily store a plurality of EFM plus signals transmitted to the second control block 10 one after another in a reproducing operation under control of the memory controller 10b and temporarily store a plurality of recording signals transmitted from an external apparatus to the second control block 10 in a recording operation under control of the memory controller 10b.

In a recording operation, a plurality of recording signals temporarily stored in the DRAM 13 are read out to the second control block 10 under the control of the memory controller 10b and are coded and modulated to a plurality of EFM plus signals by the EFM modulation-demodulation circuit 10c. In this case, an error correcting code is added to each of the EFM plus signal by the error correcting circuit 10d. Thereafter, the EFM plus signals are transmitted to the head amplifier 8 through the pre-amplifier 9 in a variable speed controlled by the variable speed transmission controller 10a. Also, the optical pick-up 2 is moved to the neighborhood of an innermost track portion of the disk 1 under the control of the microcomputer 11, identification information (or table of contents TOC) recorded in the innermost track is read out, and an offset and balance of the tracking error signal TEO are adjusted according to the identification information.

In a reproducing operation, a plurality of EFM plus signals temporarily stored in the DRAM 13 are read out to the second control block 10 under the control of the memory controller 10b and are decoded and demodulated to a plurality of reproduced signals indicating the information data by the EFM modulation-demodulation circuit 10c of the block 10, error correcting codes included in the reproduced signals are decoded and removed by the error correcting circuit 10d, and the reproduced signals are transmitted one after another to an external apparatus in a variable speed controlled by the variable speed transmission controller 10a.

The compression (or encoding) of a plurality of recording signals transmitted from an external apparatus and the expansion (decoding) of a plurality of reproduced signals read from the disk 1 are performed according to a prescribed method under the control of a compression and expansion control unit 14. Picture signals, audio or sound signals and ROM signals are transmitted to the second control block 10 as the recording signals. In this case, it is applicable that an A/D converter and a D/A converter be provided between the block 10 and the external apparatus.

The microcomputer 11 comprises an analog-digital (A/D) converter 11a for receiving the focus error detecting signals Sa to Sd, the tracking error detecting signals Se and Sf, the error signals FEO and TEO and the like from the pre-amplifier 9, a pulse width modulation (PWM) unit 11b for controlling an output power of the laser diode placed in the optical pick-up 2 by actuating the laser diode according to a pulse width modulation (PWM) signal, for example, having 12 bits, a random access memory (RAM) 11c having a plurality of work areas for storing upper and lower peak values of the tracking error signal TEO, control data and ambient atmosphere temperatures around the disk 1, a read only memory (ROM) 11d for storing a control program, a central processing unit (CPU) 11e for controlling the weight unit 5, the pre-amplifier 9 and the second control block 10 according to the control program stored in the ROM 11d, and a bus 11f connecting the elements 11a to 11e. A PWM signal generated by the PWM unit 11b is converted into a PWM signal having a direct current voltage by a low pass filter (LPF) 12 and is applied to a laser power control unit 22 (shown in FIG. 2) of the pre-amplifier 9. Thereafter, the PWM signal is transmitted to the laser diode of the optical pick-up 2 through the head amplifier 8, and the laser diode is actuated.

An input unit 16 and a displaying unit 18 are connected to the microcomputer 11. The input unit 16 functions as a reproduction request receiving means for receiving a request requesting the production of the information data recorded in the first or second layer of the disk 1 and functions as a recording request receiving means for receiving a request requesting the recording of the recording information in the first or second layer of the disk 1. In cases where an instruction or request is input to the input unit 18 by an user, a recording condition, a reproducing condition or a control condition is displayed on the displaying unit 18.

Next, the production of the error signals FEO and TEO and the EFM plus signal used for a servo control is described in detail with reference to FIG. 2.

Figure 2:
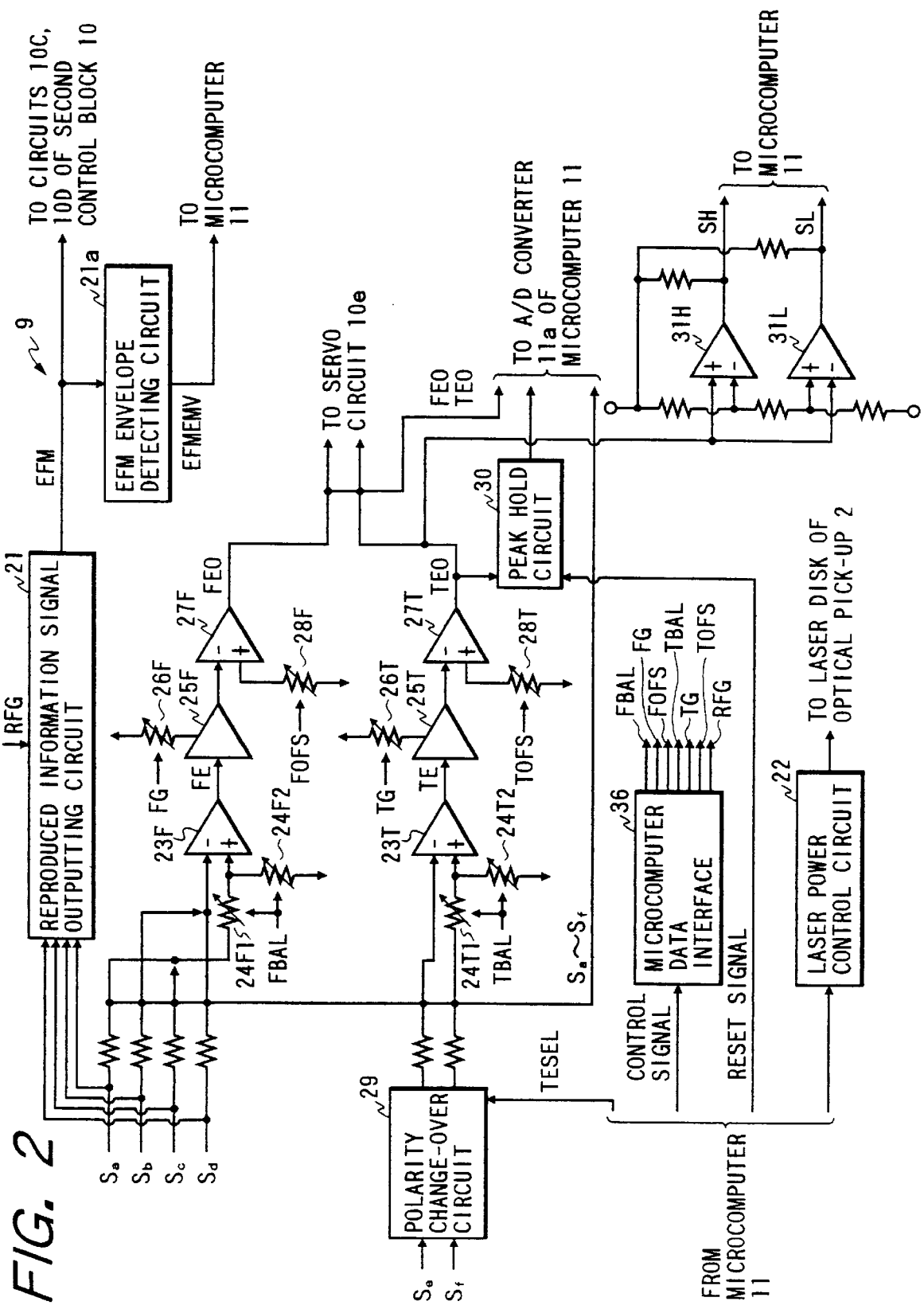
FIG. 2 is a block diagram of a pre-amplifier shown in FIG. 1.

FIG. 2 is a block diagram of the pre-amplifier 9.

As shown in FIG. 2, the focus error detecting signals Sa to Sd transmitted from the optical pick-up 2 through the head amplifier 8 is converted to the EFM plus signal in a reproduced information signal outputting circuit 21, and the EFM plus signal is transmitted to the EFM modulation-demodulat ion circuit 10c and the error correcting circuit 10d of the second control block 10. Also, an envelope of the EFM plus signal is detected in an EFM envelope detecting circuit 21a, and an EFM envelope signal EFMENV is produced and transmitted to the A/D converter 11a of the microcomputer 11.

Also, after the focus error detecting signals Sa to Sd are separated from each other in a four-division sensor (not shown), the focus error detecting signals Sa and Sc are applied to a plus terminal of a focus balance differential amplifier 23F, and the focus error detecting signals Sb and Sd are applied to a minus terminal of the focus balance differential amplifier 23F. Because a focus balance voltage determined by a pair of focus balance variable resisting elements 24F1 and 24F2 is applied to the plus terminal of the focus balance differential amplifier 23F, a focus error signal FE having a voltage level $\{\alpha(A+C)-B-D\}$ is calculated from the focus error detecting signals Sa to Sd in differential amplifier 23F. Here, a symbol A denotes a voltage level of the signal Sa, a symbol B denotes a voltage level of the signal Sb, a symbol C denotes a voltage level of the signal Sc, a symbol D denotes a voltage level of the signal Sd, and a symbol $\alpha$ denotes a coefficient for a focus balance adjusting degree. Thereafter, the focus error signal FE is amplified by a focus gain amplifier 25F and a variable resisting element 26F according to a focus gain signal FG, and a focus offset of the focus error signal FE amplified is adjusted by a focus offset differential amplifier 27F and a variable resisting element 28F according to a focus offset signal FOFS. Therefore, the focus error signal FEO is produced and transmitted to the servo circuit 10e of the second control block 10 and the A/D converter 11a of the microcomputer 11.

The tracking error detecting signals Se and Sf are separated from each other in a two-division sensor (not shown) and are applied to a polarity change-over circuit 29. In the circuit 29, polarities of the detecting signals Se and Sf are changed according to a polarity selecting signal TESEL. Thereafter, the detecting signals Se an Sf are applied to a tracking balance differential amplifier 23T, and a tracking error signal TE is produced by the differential amplifier 23T and a pair of variable resisting elements 24T1 and 24T2 according to a tracking balance signal TBAL. In cases where the polarity selecting signal TESEL is "straight", the tracking error signal TE has a voltage level $(\beta F-E)$. In contrast, in cases where the polarity selecting signal TESEL is "cross", the tracking error signal TE has a voltage level $(\beta E-F)$. Here, a symbol E denotes a voltage level of the signal Se, a symbol F denotes a voltage level of the signal Sf, and a symbol β denotes a coefficient for a tracking balance adjusting degree. Thereafter, the tracking error signal TE is amplified by a tracking gain amplifier 25T and a variable resisting element 26T according to a tracking gain signal TG, and a tracking offset of the tracking error signal TE amplified is adjusted by a tracking offset differential amplifier 27T and a variable resisting element 28T according to a tracking offset signal TOFS. Therefore, the tracking error signal TEO is produced and transmitted to the servo circuit 10e of the second control block 10 and the A/D converter 11a of the microcomputer 11.

Each of the focus balance variable resisting elements 24F1 and 24F2, the variable resisting element 26F, the variable resisting element 28F, the variable resisting elements 24T1 and 24T2, the variable resisting element 26T and the variable resisting element 28T is composed of a plurality of resistors arranged in ladder shape and an analog switch. A pair of variable resistance values of the focus balance variable resisting elements 24F1 and 24F2 are controlled in correlation with each other, and a pair of variable resistance values of the tracking balance variable resisting elements 24T1 and 24T2 are controlled in correlation with each other. The focus balance signal FBAL, the focus gain signal FG, the focus offset signal FOFS, the tracking balance signal TBAL, the tracking gain signal TG and the tracking offset signal TOFS are supplied from a microcomputer data interface 36 according to the control data stored in the RAM 11c of the microcomputer 11, and the analog switches of the variable resisting elements 24F, 26F, 28F, 24T, 26T and 28T are respectively and selectively set to "on" or "off" according to the signals FBAL, FG, FOFS, TBAL, TG and TOFS. Therefore, a resistance value of each variable resisting element is changed in step shape. As a result, balance, gain and offset of the focus error signal FEO and balance, gain and offset of the tracking error signal TEO can be adjusted.

An upper peak voltage VH and a lower peak voltage VL in the tracking error signal TEO output from the differential amplifier 27T are held by a peak hold circuit 30 functioning as a peak measuring means to adjust the balance and offset of the tracking error signal TEO. The upper and lower peak voltages VH and VL are transmitted to the A/D converter 11a of the microcomputer 11. Also, it is judged by a pair of differential amplifiers 31H and 31L whether the tracking error signal TEO output from the differential amplifier 27T is crossed to a positive side or a negative side. In other words, a polarity of the tracking error signal TEO is judged. In cases where the tracking error signal TEO is crossed to a positive side, a track cross signal SH indicating a positive cross is detected by the differential amplifier 31H. In contrast, in cases where the tracking error signal TEO is crossed to a negative side, a track cross signal SL indicating a negative cross is detected by the differential amplifier 31L. The track cross signals SH and SL are transmitted to an input port (not shown) of the microcomputer 11. The peak hold circuit 30 can be reset by a reset signal transmitted from the microcomputer 11.

In the above configuration of a DVD type optical disk recording and/or reproducing apparatus 32 shown in FIG. 1, in cases where an optimizing operation performed in a servo control means comprising the first and second control blocks 4 and 10 and the pre-amplifier 9 is required during a reproducing operation of the apparatus 32 or at the beginning of the reproducing operation. The optimizing operation performed at the beginning of the reproducing operation of the apparatus 32 is described with reference to FIGS. 3 and 4.

Figure 3:
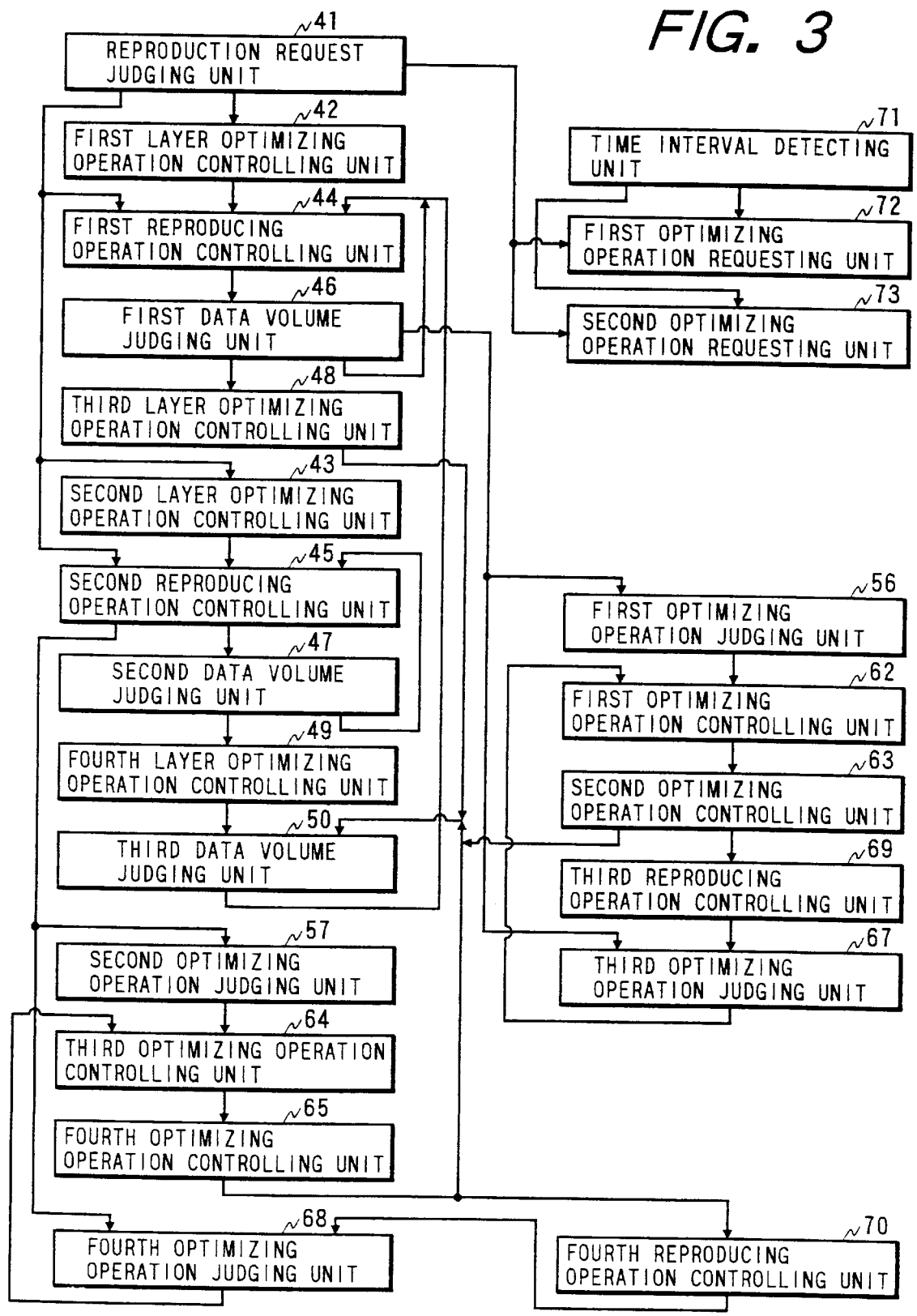
FIG. 3 is a functional block diagram of a CPU of a microcomputer shown in FIG. 1.

FIG. 3 is a functional block diagram of the CPU 11e of the microcomputer 11.

As shown in FIG. 3, the CPU 11e comprises a reproduction request judging unit 41 for judging whether a request input to the input unit 16 is a first request requesting the reproduction of the information data recorded in the first layer of the disk 1 or a second request requesting the reproduction of the information data recorded in the second layer of the disk 1;

a first layer optimizing operation controlling unit 42 for controlling the servo circuit 10e of the second control block 10 to control a first optimizing operation for the first layer of the disk 1 and controlling the servo circuit 10e to move the optical pick-up 2 to the inner track portion of the first layer of the disk 1 and read out a table of contents (TOC) recorded in the first layer of the disk 1 in cases where it is judged by the reproduction request judging unit 41 that the first request is input to the input unit 16;

a second layer optimizing operation controlling unit 43 for controlling the servo circuit 10e to control a second optimizing operation for the second layer of the disk 1 and controlling the servo circuit 10e to move the optical pick-up 2 to the inner track portion of the second layer of the disk 1 and read out a table of contents (TOC) recorded in the second layer of the disk 1 in cases where it is judged by the reproduction request judging unit 41 that the second request is input to the input unit 16;

a first reproducing operation controlling unit 44 for controlling the servo circuit 10e and the optical pick-up 2 to control a first reproducing operation in which pieces of information data recorded in the first layer of the disk 1 are read out at the first data rate and reproduced as a plurality of reproduced signals at the second data rate in cases where it is judged by the reproduction request judging unit 41 that the first request is input;

a second reproducing operation controlling unit 45 for controlling the servo circuit 10e and the optical pick-up 2 to control a second reproducing operation in which pieces of information data recorded in the second layer of the disk 1 are read out and reproduced as a plurality of reproduced signals in cases where it is judged by the reproduction request judging unit 41 that the second request is input;

a first data volume judging unit 46 for judging whether or not a volume of data stored in the DRAM 13 according to the first reproducing operation controlled by the first reproducing operation controlling unit 44 is equal to or more than a first predetermined value;

a second data volume judging unit 47 for judging whether or not a volume of data stored in the DRAM 13 according to the second reproducing operation controlled by the second reproducing operation controlling unit 45 is equal to or more than the first predetermined value;

a third layer optimizing operation controlling unit 48 for controlling the servo circuit 10e to set the optical pick-up 2 in a standby condition and perform a second optimizing operation for the second layer of the disk 1 in cases where it is judged by the first data volume judging unit 46 that a volume of the information data stored in the DRAM 13 is equal to or more than the first predetermined value;

a fourth layer optimizing operation controlling unit 49 for controlling the servo circuit 10e to set the optical pick-up 2 in a standby condition and perform a first optimizing operation for the first layer of the disk 1 in cases where it is judged by the second data volume judging unit 47 that a volume of the information data stored in the DRAM 13 is equal to or more than the first predetermined value; and a third data volume judging unit 50 for judging whether or not a volume of the information data stored in the DRAM 13 is equal to or less than a second predetermined value.

Figure 4:
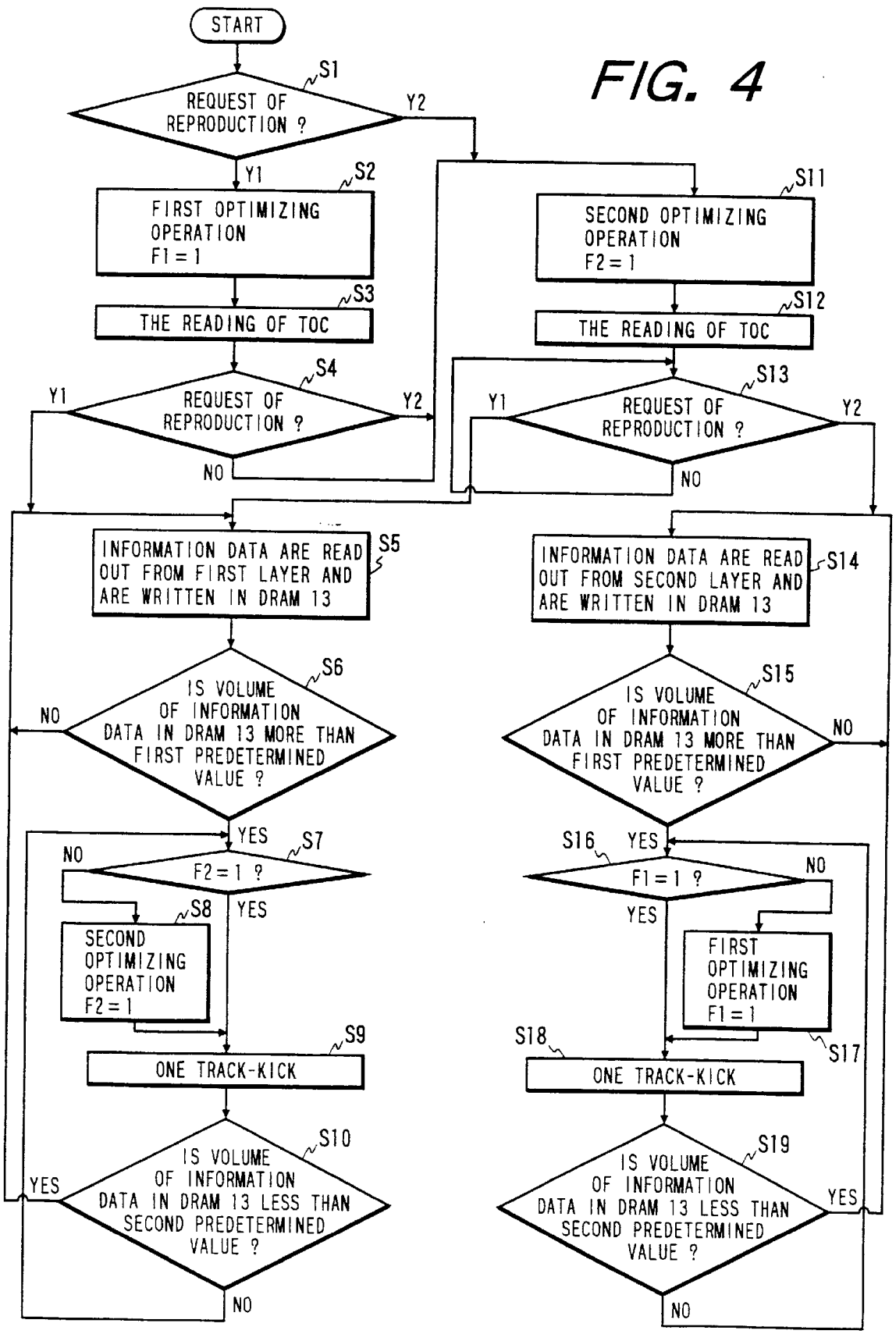
FIG. 4 is a flow chart showing the procedure of an optimizing operation which is required at the beginning of a producing operation performed in the apparatus shown in FIG. 1.

FIG. 4 is a flow chart showing the procedure of an optimizing operation which is required at the beginning of the reproducing operation.

For example, when an electric source for the apparatus 32 is switched on and the disk 1 is set in the apparatus 32, an optimizing operation shown in FIG. 3 is started. In this case, a first optimizing request flag F1 for a first layer of the disk 1 is initially set to "0", and a second optimizing request flag F2 for a second layer of the disk 1 is initially set to "0".

In a step S1, it is judged by the reproduction request judging unit 41 of the CPU 11e whether or not a first request Y1 requesting the reproduction of information recorded in a first layer of the disk 1 or a second request Y2 requesting the reproduction of information recorded in a second layer of the disk 1 is input to the input unit 16. In cases where the first request Y1 is detected by the CPU 11e or any request is not detected, the procedure proceeds to a step S2. In contrast, in cases where the second request Y2 is detected by the CPU 11e, the procedure proceeds to a step S11 to perform a second optimizing operation for the second layer.

In the step S2, a first optimizing operation for the first layer of the disk 1 is performed under the control of the first control block 4, the servo circuit 10e and the first layer optimizing operation controlling unit 42 of the servo circuit 10e. In the first optimizing operation and the second optimizing operation for the second layer, offset, balance or gain of the tracking error signal TEO is adjusted to optimize a tracking control for the optical pick-up 2, and offset, balance or gain of the focus error signal FEO is adjusted to optimize a focus control for the optical pick-up 2. In this case, it is preferred that the offset, the balance and the gain of the tracking and focus error signals TEO and FEO be adjusted. The first and second optimizing operations are described later in detail. When the first optimizing operation is finished, the first optimizing request flag F1 is set to "1". Thereafter, the optical pick-up 2 is moved to the inner track portion of the first layer of the disk 1, a table of contents (TOC) recorded in the first layer of the disk 1 is read out, and the adjustment of a laser power and an initial set of the differential amplifiers 23F, 23T, 25F, 25T, 27F, 27T, 31H and 31L are performed according to the TOC (step S3). Also, a specific address is read out, and the optical pick-up 2 is moved to the specific address to perform the reproducing operation.

Thereafter, in a step S4, it is judged in the same manner as in the step S1 whether or not the first request Y1 requesting the reproduction of information recorded in the first layer of the disk 1 or the second request Y2 requesting the reproduction of information recorded in the second layer of the disk 1 is input to the input unit 16.

In cases where the first request Y1 is again detected by the CPU 11e, the procedure proceeds to a step S5. In the step S5, pieces of information data are read out one after another from the first layer of the disk 1 through the optical pick-up 2 at a first data rate under the control of the first reproducing operation controlling unit 44 and are transmitted to the second control block 10 through the head amplifier 8 and the pre-amplifier 9. Thereafter, the information data are temporarily stored in the DRAM 13 functioning as a buffer storing means at the first data rate under the control of the memory controller 10b and are read out to the second control block 10 at a second data rate lower than the first data rate under the control of the memory controller 10b. Therefore, the memory controller 10b functions as a data rate controlling means, and a volume of data stored in the DRAM 13 is gradually increased during a reading operation in which the information data are read out from the disk 1. Thereafter, the information data are decoded by the EFM modulation-demodulation circuit 10c and are time-expanded under the control of the compression and expansion control unit 14, and the information data decoded and expanded are output to an external apparatus one after another as a plurality of reproduced signals in variable speed under control of the variable speed transmission controller 10a.

Thereafter, in a step S6, it is judged by the first data volume judging unit 46 of the CPU 11e whether or not a volume of the information data stored in the DRAM 13 is equal to or more than a first predetermined value (for example, 80% of a data storage capacity of the DRAM 13). That is, in cases where information data stored in the DRAM 13 is read out, the information data is deleted in the DRAM 13, and a volume of the information data stored in the DRAM 13 is gradually decreased as pieces of information data are read out from the DRAM 13. Therefore, in cases where a volume of the information data stored in the DRAM 13 is less than the first predetermined value, the procedure returns to the step S5, and a piece of information data recorded in the first layer of the disk 1 are read out and stored in the DRAM 13 to continue the reproducing operation. In contrast, in cases where a volume of the information data stored in the DRAM 13 is equal to or more than the first predetermined value, it is not required to moreover read out pieces of information data from the first layer. Therefore, the optical pick-up 2 is set to a standby condition by the third layer optimizing operation controlling unit 48 to temporarily stop the reading out of pieces of information data from the first layer, and the reading out of the information data stored in the DRAM 13 is continued. Thereafter, it is judged by the CPU 11e whether or not the second optimizing request flag F2 is set to "1" (step S7). In cases where the second optimizing request flag F2 is set to "0", because the second optimizing operation for the second layer has not been performed, the second optimizing operation for the second layer is performed under control of the third layer optimizing operation controlling unit 48, the servo circuit 10e and the first control block 4 (a step S8). When the second optimizing operation is finished, the second optimizing request flag F2 is set to "1". Therefore, the second optimizing operation for the second layer is performed during the time that the reading out of pieces of information data (for example, audio or sound data or picture data) from the first layer of the disk 1 is temporarily stopped. Thereafter, the procedure proceeds to a step S9. In contrast, in cases where the second optimizing request flag F2 is set to "1" in the step S7, because the second optimizing operation for the second layer is finished, the procedure also proceeds to the step S9.

In the step S9, a one track kick is performed. That is, the optical pick-up 2 is moved by one track under control of the tracking and focus control circuit of the first control block 4, and the optical pick-up 2 is on standby for reading out piece of information data from another track of the first layer of the disk 1. Thereafter, in a step S10, it is judged by the third data volume judging unit 50 of the CPU 11e whether or not a volume of the information data stored in the DRAM 13 is equal to or less than a second predetermined value (for example, 20% of a data storage capacity of the DRAM 13). In cases where a volume of the information data stored in the DRAM 13 is equal to or less than the second predetermined value, the procedure returns to the step S5, and piece of information data recorded in another track of the first layer of the disk 1 is read out, and the information data is stored in the DRAM 13. In contrast, in cases where a volume of data stored in the DRAM 13 is more than the second predetermined value, the procedure returns to the step S7, and the standby condition of the optical pick-up 2 is continued until the volume of the information data stored in the DRAM 13 becomes equal to or less than the second predetermined value.

Accordingly, the second optimizing operation for the second layer is performed during a standby condition of the optical pick-up 2 in which any piece of information data is not read out from the disk 1 through the optical pick-up 2. In other words, the second optimizing operation for the second layer is performed during the time that the information data read out from the first layer of the disk 1 are time-expanded in the second control block 10 under the control of the control unit 14 and are output as the reproduced signals to an external apparatus on condition that a volume of the data stored in the DRAM 13 ranges from the first predetermined value to the second predetermined value. Therefore, the reproducing operation of the information data stored in the first layer of the disk 1 is not substantially interrupted by the second optimizing operation.

In contrast, in the step S4, in cases where the second request Y2 is detected by the CPU 11e or any request is not detected, the procedure proceeds to a step S11. In the step S11, a second optimizing operation for the second layer of the disk 1 is performed under the control of the first control block 4, the servo circuit 10e and the second layer optimizing operation controlling unit 43 of the servo circuit 10e. When the second optimizing operation is finished, the second optimizing request flag F2 is set to "1". Thereafter, the optical pick-up 2 is moved to the inner track portion of the second layer of the disk 1, table of contents (or TOC) recorded in the second layer of the disk 1 is read out, and the adjustment of a laser power and an initial set of the differential amplifiers 23F, 23T, 25F, 25T, 27F, 27T, 31H and 31L are performed according to the TOC (step S12). Also, a specific address is read out, and the optical pick-up 2 is moved to the specific address to perform the reproducing operation. In cases where any table of contents (or TOC) is not recorded in the second layer of the disk 1, the step S12 is omitted.

Thereafter, it is judged by the CPU 11e whether or not the first request Y1 requesting the reproduction of information recorded in the first layer of the disk 1 or the second request Y2 requesting the reproduction of information recorded in the second layer of the disk 1 is input to the input unit 16 (step S13). In cases where the first request Y1 is detected, the steps S5 to S10 are performed. In contrast, the second request Y2 is detected, the procedure proceeds to a step S14.

In the step S14, pieces of information data are read out from the second layer of the disk 1 one after another through the optical pick-up 2 under the control of the second reproducing operation controlling unit 45 and are transmitted to the DRAM 13 through the second control block 10 at the first data rate. Thereafter, the information data are read out from the DRAM 13 to the second control block 10 at the second data rate one after another, and the information data are output from the second control block 10 as a plurality of reproduced signals in the same manner as in the step S5.

Thereafter, in a step S15, it is judged by the second data volume judging unit 47 of the CPU 11e whether or not a volume of the information data stored in the DRAM 13 is equal to or more than the first predetermined value, in the same manner as in the step S6. In cases where a volume of the information data stored in the DRAM 13 is less than the first predetermined value, the procedure returns to the step S14, and one or more pieces of information data recorded in the second layer of the disk 1 are read out and stored in the DRAM 13. In contrast, in cases where a volume of information data stored in the DRAM 13 is equal to or more than the first predetermined value, the optical pick-up 2 is set to a standby condition by the fourth layer optimizing operation controlling unit 49 to temporarily stop the reading out of pieces of information data from the second layer, and the reading out of the information data stored in the DRAM 13 is continued. Thereafter, it is judged by the CPU 11e whether or not the first optimizing request flag F1 is set to "1" (step S16). In cases where the first optimizing request flag F1 is set to "0", the first optimizing operation for the first layer is performed under control of the fourth layer optimizing operation controlling unit 49, the servo circuit 10e and the first control block 4 (a step S17). When the first optimizing operation is finished, the first optimizing request flag F1 is set to "1". Therefore, the first optimizing operation for the first layer is performed during the time that the reading out of pieces of information data (for example, audio or sound data or picture data) from the second layer of the disk 1 is temporarily stopped. Thereafter, the procedure proceeds to a step S18. In contrast, in cases where the first optimizing request flag F1 is set to "1" in the step S16, the procedure also proceeds to the step S18. In the step S18, a one track kick is performed in the same manner as in the step S9, and the optical pick-up 2 is on standby for reading out another piece of information data from the second layer of the disk 1. Thereafter, in a step S19, it is judged by the third data volume judging unit 50 of the CPU 11e whether or not a volume of the information data stored in the DRAM 13 is equal to or less than the second predetermined value. In cases where a volume of the information data stored in the DRAM 13 is equal to or less than the second predetermined value, the procedure returns to the step S14, and another piece of information data recorded in the second layer of the disk 1 is read out, and the information data is stored in the DRAM 13. In contrast, in cases where a volume of the information data stored in the DRAM 13 is more than the second predetermined value, the procedure returns to the step S16.

Accordingly, the first optimizing operation for the first layer is performed during a standby condition of the optical pick-up 2 in which any piece of information data is not read out from the second layer of the disk 1 through the optical pick-up 2. In other words, the first optimizing operation for the first layer is performed during the time that the information data read out from the second layer of the disk 1 are time-expanded in the second control block 10 under the control of the control unit 14 and are output as the reproduced signals to an external apparatus on condition that a volume of the information data stored in the DRAM 13 ranges from the first predetermined value to the second predetermined value. Therefore, the reproducing operation of the information data stored in the second layer of the disk 1 is not substantially interrupted by the first optimizing operation.

The optimizing operation performed in the beginning of the reproducing operation is described in FIG. 4. However, an optimizing operation performed in the beginning of a recording operation can be performed in the same manner.

Next, the optimizing operation performed during a reproducing operation is described with reference to FIG. 5.

As shown in FIG. 3, the CPU 11e further comprises a first optimizing operation judging unit 56 for judging according to one or more measured temperatures measured by the temperature sensor 20 whether or not a first optimizing operation for the first layer of the disk 1 is required in cases where it is judged by the reproduction request judging unit 41 that the first request is input to the input unit 16;

a second optimizing operation judging unit 57 for judging according to one or more measured temperatures measured by the temperature sensor 20 whether or not a second optimizing operation for the second layer of the disk 1 is required in cases where it is judged by the reproduction request judging unit 41 that the second request is input to the input unit 16;

a first optimizing operation controlling unit 62 for controlling the servo circuit 10e and the optical pick-up 2 to control the first optimizing operation for the first layer of the disk 1 in cases where it is judged by the first data volume judging unit 46 that a volume of the information data stored in the DRAM 13 is equal to or more than the first predetermined value and it is judged by the first optimizing operation judging unit 56 that the first optimizing operation for the first layer of the disk 1 is required;

a second optimizing operation controlling unit 63 for controlling the servo circuit 10e and the optical pick-up 2 to control the second optimizing operation for the second layer of the disk 1 in cases where the first optimizing operation is performed under the control of the first optimizing operation controlling unit 62;

a third optimizing operation controlling unit 64 for controlling the servo circuit 10e and the optical pick-up 2 to control the second optimizing operation for the second layer of the disk 1 in cases where it is judged by the second data volume judging unit 47 that a volume of the information data stored in the DRAM 13 is equal to or more than the first predetermined value and it is judged by the second optimizing operation judging unit 57 that the second optimizing operation for the second layer of the disk 1 is required; and a fourth optimizing operation controlling unit 65 for controlling the servo circuit 10e and the optical pick-up 2 to control the first optimizing operation for the first layer of the disk 1 in cases where the second optimizing operation is performed under the control of the second optimizing operation controlling unit 64.

Figure 5:
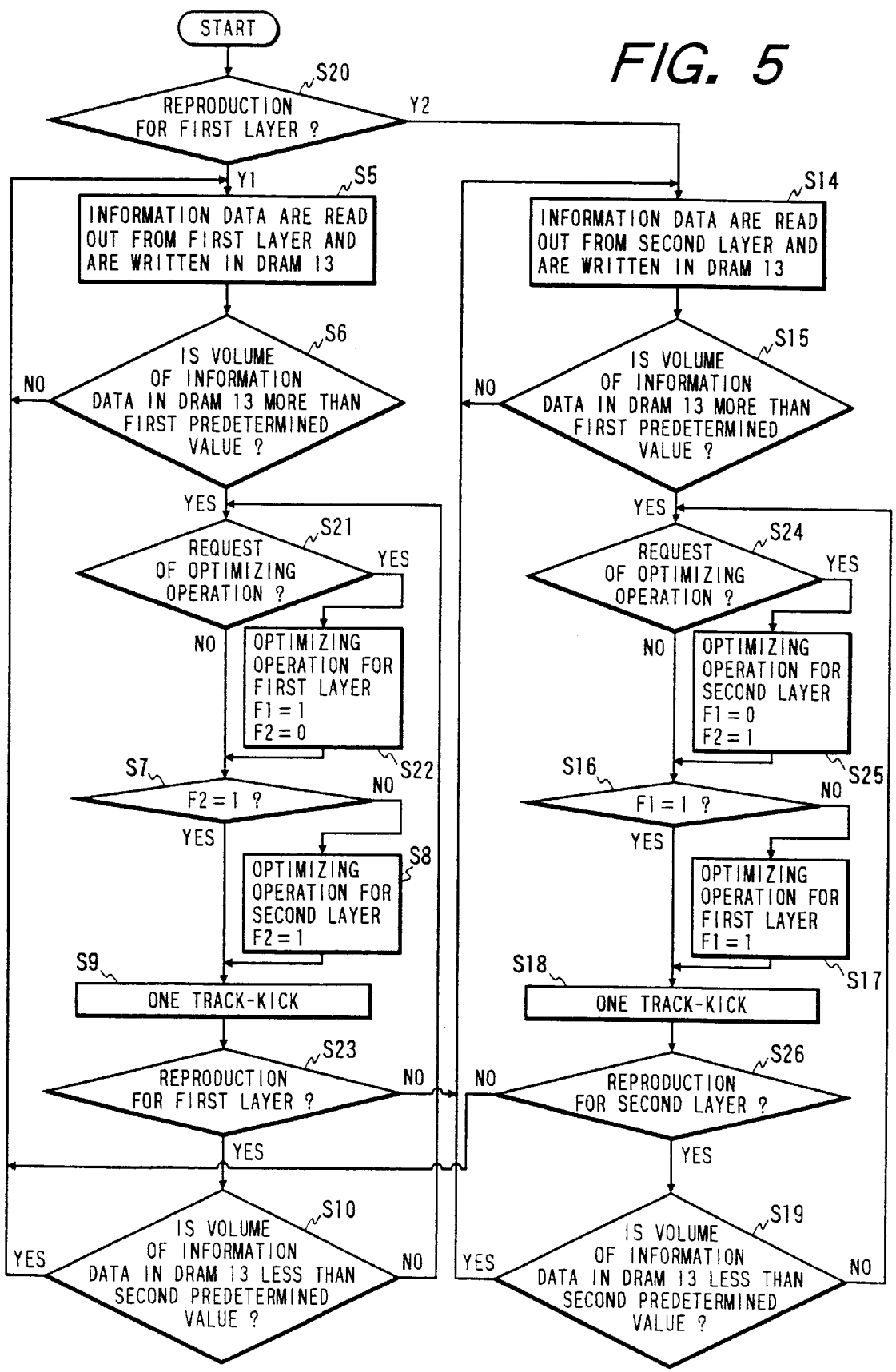
FIG. 5 is a flow chart showing the procedure of an optimizing operation which is required during a reproducing operation performed in the apparatus shown in FIG. 1.

FIG. 5 is a flow chart showing the procedure of an optimizing operation which is required during a reproducing operation performed in the apparatus 32.

The ambient atmosphere temperature around the disk 1 is always measured by the temperature sensor 20 on real time, and a measured temperature is written in the RAM 11c on every measuring time. Each of the measured temperatures is compared with a reference temperature, or a current measured temperature is compared with a previous measured temperature. The comparison of the measured temperatures is performed under the control of the CPU 11e. In cases where a measured temperature detected by the temperature sensor 20 exceeds the reference temperature or a difference between current and previous measured temperatures is larger than a prescribed value, an optimizing operation is requested by the CPU 11e.

As shown in FIG. 5, in a step S20, it is judged by the reproduction request judging unit 41 of the CPU 11e whether or not a first request Y1 requesting the reproduction of information recorded in a first layer of the disk 1 or a second request Y2 requesting the reproduction of information recorded in a second layer of the disk 1 is input to the input unit 16.

In cases where the first request Y1 is detected, the step S5 is performed in the same manner under the control of the first reproducing operation controlling unit 44 of the CPU 11e, the servo circuit 10e and the first control block 4, and the step S6 is performed under the control of the first data volume judging unit 46. Thereafter, in cases where it is judged in the step S6 that the volume of information data stored in the DRAM 13 is enough, the optical pick-up 2 is set to a standby condition to temporarily stop the reading out of the information data from the first layer of the disk 1, and the judgement whether or not a first optimizing operation for the first layer is required is performed by the first optimizing operation judging unit 56 of the CPU 11e according to one or more measured temperatures measured by the temperature sensor 20 (step S21). In cases where a measured temperature detected by the temperature sensor 20 exceeds a reference temperature or a difference between current and previous measured temperatures is larger than a prescribed value, the first optimizing operation is required, and the procedure proceeds to a step S22. In the step S22, the first optimizing operation is performed under the control of the first optimizing operation controlling unit 62 of the CPU 11e, a first optimizing request flag F1 is set to "1", a second optimizing request flag F2 is set to "0", and the steps S7 to S9 are performed in the same manner. In this case, because the second optimizing request flag F2 is set to "0" after the first optimizing operation, the second optimizing operation is performed in the step S8 under the control of the second optimizing operation controlling unit 63 of the CPU 11e. In contrast, in cases where the first optimizing operation is not required in the step S21, the steps S7 to S9 are performed. Thereafter, in a step S23, it is again judged by the CPU 11e whether or not the first request Y1 is input to the input unit 16. In cases where the first request Y1 is detected, the step S10 is performed in the same manner by the third data volume judging unit 50, and the procedure returns to the step S5 or S21.

Therefore, in cases where the ambient atmosphere temperature around the disk 1 abruptly changes during the reproducing operation for the information data recorded in the first layer of the disk 1, it is judged in the step S21 that the first optimizing operation is required, the first optimizing operation is performed in the step S22, and the second optimizing operation is performed in the step S8.

In contrast, in cases where the second request Y2 is detected in the step S23, the steps S14 and S15 are performed in the same manner. Also, in cases where the second request Y2 is detected in the step S20, the step S14 is performed in the same manner under the control of the first reproducing operation controlling unit 44 of the CPU 11e, the servo circuit 10e and the first control block 4, and the step S15 is performed under the control of the second data volume judging unit 47. Thereafter, in a step S24, the judgement whether or not a second optimizing operation for the second layer is required is performed by the second optimizing operation judging unit 57 of the CPU 11e according to one or more measured temperatures measured by the temperature sensor 20. In cases where the second optimizing operation is required, the procedure proceeds to a step S25. In the step S25, the second optimizing operation is performed under the control of the second optimizing operation controlling unit 64 of the CPU 11e, the second optimizing request flag F2 is set to "1", the first optimizing request flag F1 is set to "0", and the steps S16 to S18 are performed in the same manner. In this case, because the first optimizing request flag F1 is set to "0" after the second optimizing operation, the first optimizing operation is performed in the step S17 under the control of the fourth optimizing operation controlling unit 65 of the CPU 11e. In contrast, in cases where the second optimizing operation is not required, the steps S16 to S18 are performed. Thereafter, in a step S26, it is again judged by the CPU 11e whether or not the second request Y2 is input to the input unit 16. In cases where the second request Y2 is detected, the step S19 is performed in the same manner by the third data volume judging unit 50, and the procedure returns to the step S14 or S24.

Therefore, in cases where the ambient atmosphere temperature around the disk 1 abruptly changes during the reproducing operation for the information data recorded in the second layer of the disk 1, it is judged in the step S24 that the second optimizing operation is required, the second optimizing operation is performed in the step S25, and the first optimizing operation is performed in the step S17.

Accordingly, the first and second optimizing operations for the first and second layers are performed during a standby condition of the optical pick-up 2 in which any piece of information data is not read out from the disk 1 through the optical pick-up 2 in the middle of the producing operation. Therefore, the reproducing operation of the information data performed by the apparatus 32 is not substantially interrupted by the first and second optimizing operations.

Figure 6:
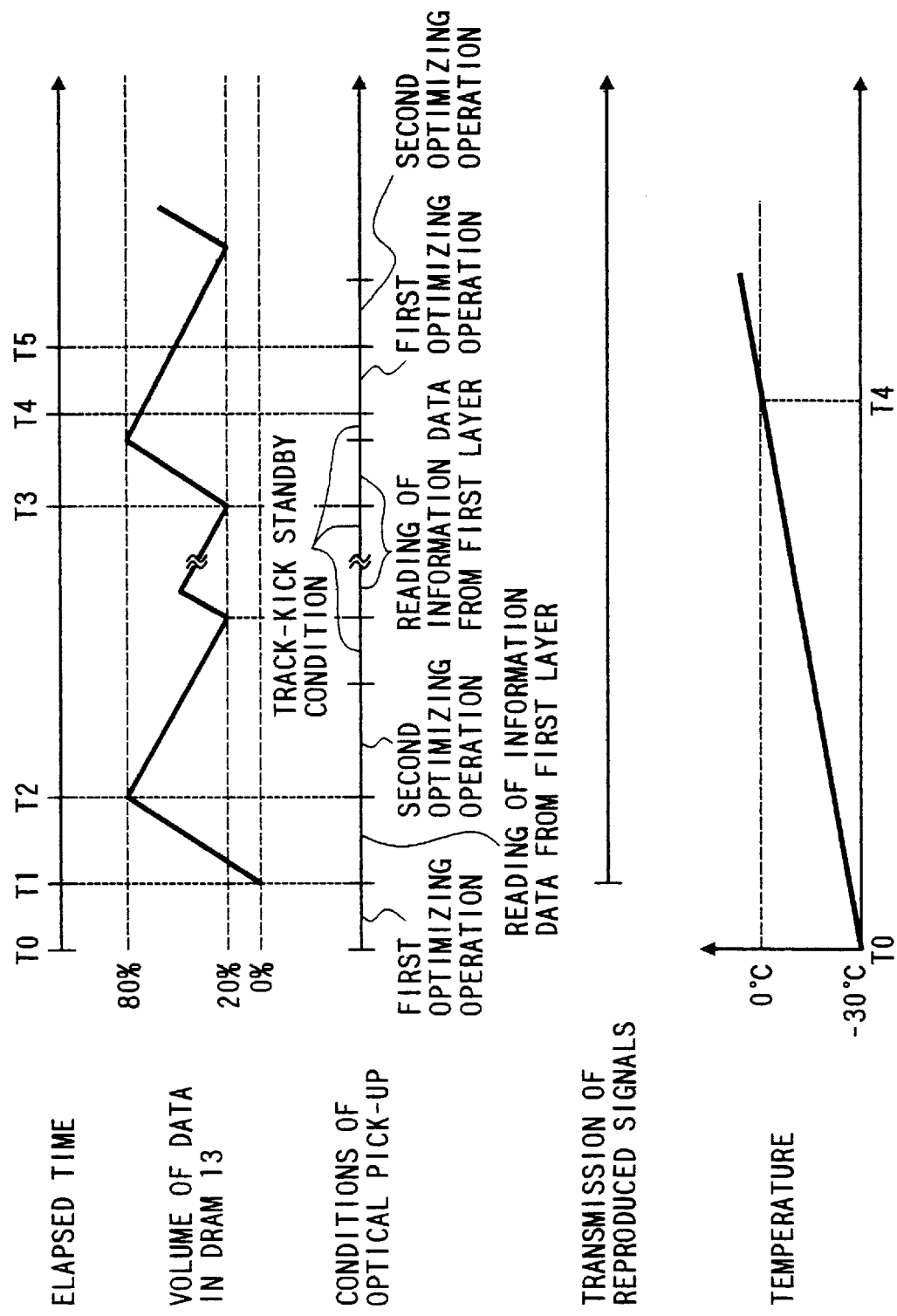
FIG. 6 shows a timing chart of a volume of data stored in a DRAM shown in FIG. 1, optical pick-up conditions, the transmission of pieces of reproduced signals, and temperatures measured by a temperature sensor shown in FIG. 1.

In the apparatus 32, the first and second optimizing operations are performed according to the procedure shown in FIGS. 4 and 6. Therefore, the first and second optimizing operations can be performed during the reproducing operation and at the beginning of the reproducing operation.

FIG. 6 shows a timing chart of a volume of data stored in the DRAM 13, optical pick-up conditions, the transmission of pieces of reproduced signals, and temperatures measured by the temperature sensor 20.

As shown in FIG. 6, when the operation of the apparatus 32 is started (elapsed time T0), the optical pick-up 2 is set in a first layer optimization condition, and the first optimizing operation is, for example, performed (step S2 in FIG. 4) before the reproducing operation. Thereafter, the optical pick-up 2 is set in a disk reproduction condition (elapsed time T1), and pieces of information data recorded in the first layer of the disk 2 are read out. Therefore, a volume of data remaining in the DRAM 13 is gradually increased, and the transmission of pieces of reproduced signals from the second control block 10 to a speaker or a display is started. Also, ambient temperature around the disk 1 is gradually increased because of the operation of the apparatus 32. When a volume of data remaining in the DRAM 13 reaches the first predetermined value such as 80% of a full capacity of the DRAM 13 (elapsed time T2), the reading of the information data from the disk 1 is stopped, the optical pick-up 2 is set in a second layer optimization condition, and a second optimizing operation is performed (step S8 in FIG. 4). In this case, the transmission of pieces of reproduced signals is continued to decrease the volume of data remaining in the DRAM 13. When the volume of data remaining in the DRAM 13 decreased to the second predetermined value such as 20% of a full capacity of the DRAM 13 (elapsed time T3), the optical pick-up 2 is again set in the disk reproduction condition, and the reading of the information data from the disk 1 is started again.

Thereafter, for example, when a difference between a starting temperature (−30° C.) and a current temperature exceeds 30° C. during the first reproducing operation (elapsed time T4), the reading of the information data from the first layer of the disk 1 is stopped, the optical pick-up 2 is again set in the first layer optimization condition, and the first optimizing operation is performed (step S22 in FIG. 5). Thereafter, the optical pick-up 2 is again set in the second layer optimization condition (elapsed time T5), and the second optimizing operation is performed (step S8 in FIG. 5).

Next, a DVD type optical disk recording and/or reproducing apparatus according to a second embodiment is described.

Figure 7:
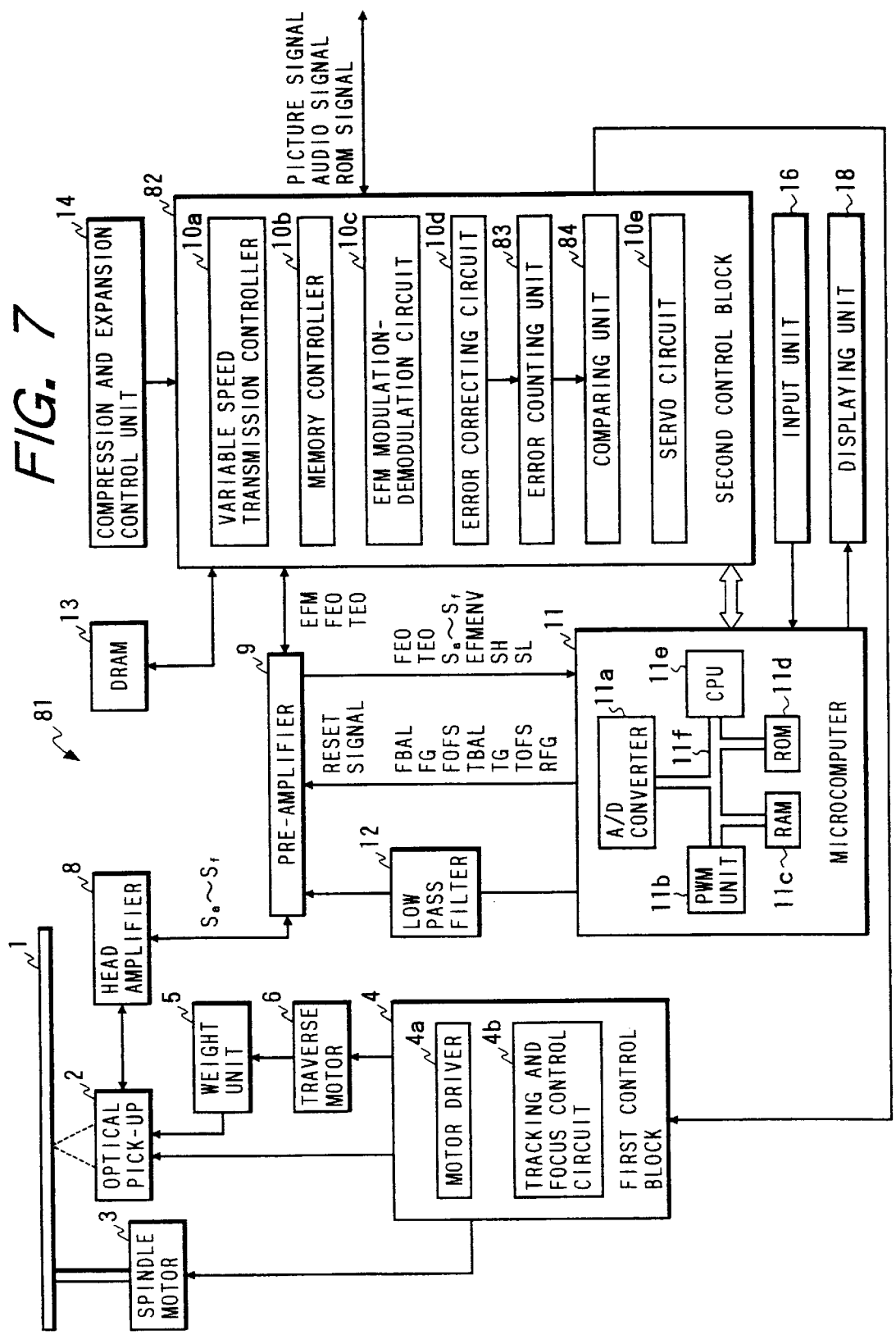
FIG. 7 is a block diagram of a DVD type optical disk recording and/or reproducing apparatus according to a second embodiment of the present invention.

FIG. 7 is a block diagram of a DVD type optical disk recording and/or reproducing apparatus according to a second embodiment of the present invention.

As shown in FIG. 7, a DVD type optical disk recording and/or reproducing apparatus 81 comprises the optical pick-up 2, the spindle motor 3, the first control block 4, the weight unit 5, the traverse motor 6, the head amplifier 8, the pre-amplifier 9, the microcomputer 11, the LPF 12, the DRAM 13, the compression and expansion control unit 14, the inputting unit 16, the displaying unit 18, and a second control block 82. The second control block 82 comprises the variable speed transmission controller 10a, the memory controller 10b, the EFM modulation-demodulation circuit 10c, the error correcting circuit 10d, the servo circuit 10e, an error counting unit 83 for counting the number of erred signals which are corrected to a plurality of reproduced signals in the reproducing operation by the error correcting circuit 10d, and a comparing unit 84 for comparing the number of erred signals calculated by the error counting unit 83 with a reference number.

In the above configuration, any working circumstance condition measuring unit such as a temperature sensor is not provided for the DVD type optical disk recording and/or reproducing apparatus 81, but the error counting unit 83 and the comparing unit 84 are added in the second embodiment as compared with the apparatus 32.

A block of information data read out from the disk 1 is demodulated by the EFM modulation-demodulation circuit 10c of the second control block 82 for each of the reading operations and is checked by the error correcting circuit 10d of the second control block 82 whether or not each of the information data is demodulated to an erred signal. Each of the erred signal is corrected to a produced signal by the error correcting circuit 10d. In cases where the change of a physical condition of the working circumstances around the disk 1 exceeds a permissible degree, the number of erred signals for one block of information data is abruptly increased. Therefore, the number of erred signals occurring in the second control unit 82 is counted by the error counting unit 83, and the number of erred signals counted is compared with a prescribed number by the comparing unit 84. In cases where the number of erred signals counted is equal to or more than the prescribed number, it is judged by a third (or fourth) optimizing operation judging unit 67 (or 68) of the CPU 11e that the change of a physical condition of the working circumstances around the disk 1 exceeds a permissible degree. Therefore, the reproducing operation performed in the apparatus 81 is stopped, and the first and second optimizing operations are performed under the control of the first and second optimizing operation controlling units 62 and 63 (or the third and fourth optimizing operation controlling units 64 and 65).

Accordingly, even though any working circumstance condition measuring unit such as a temperature sensor is not provided, an unacceptable change of a physical condition of the working circumstances around the disk 1 can be reliably detected, and the first and second optimizing operations can be rapidly performed.

Figure 8:
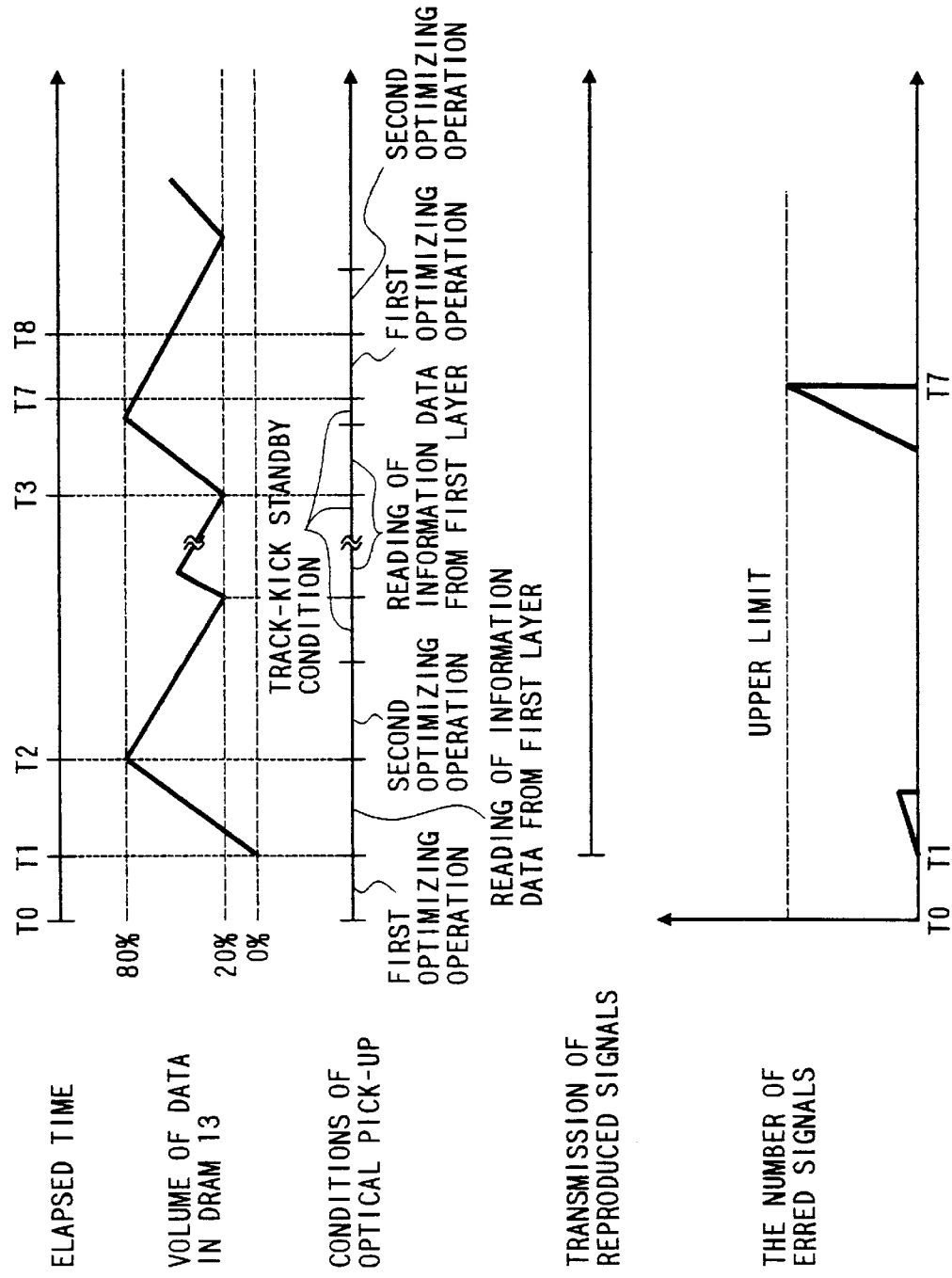
FIG. 8 shows a timing chart of a volume of data stored in a DRAM shown in FIG. 7, optical pick-up conditions, the transmission of pieces of reproduced signals and the number of erred signals counted by an error counting unit shown in FIG. 7 according to the second embodiment.

FIG. 8 shows a timing chart of a volume of data stored in the DRAM 13, optical pick-up conditions, the transmission of pieces of reproduced signals and the number of erred signals counted by the error counting unit 83 according to the second embodiment.

As shown in FIG. 8, the first and second optimizing operations are performed at the beginning of the reproducing operation in the apparatus 81 in the same manner as in the apparatus 32. When it is judged by the CPU 11e that the number of erred signals occurring in the second control block 82 is equal to or more than the prescribed number (elapsed time T7), the reading of the information data from the first layer of the disk 1 is stopped, the optical pick-up 2 is again set in the first layer optimization condition, and the first optimizing operation is performed (step S22 in FIG. 5). Thereafter, the optical pick-up 2 is again set in the second layer optimization condition (elapsed time T8), and the second optimizing operation is performed (step S8 in FIG. 5).

The error counting unit 83 can be embodied by a C1 or C2 type of error counter or a C1, C2 or C3 type of error counter (in case of a DVD-ROM or CDROM). Also, the microcomputer 11 can function as the error counting unit 83 in software technique. Also, it is applicable that an error counting unit and a comparing unit be placed in the error correcting circuit 10d. Also, the microcomputer 11 can function as the comparing unit 84 in software technique.

Next, a DVD type optical disk recording and/or reproducing apparatus according to a third embodiment is described.

As shown in FIG. 3, the CPU 11e further comprises a third reproducing operation controlling unit 69 for controlling the servo circuit 10e to operate a first reproducing operation in which the information data just read out from the first layer of the disk 1 are again read out and reproduced as a plurality of corrected reproduced signals in cases where the first and second optimizing operations are performed under the control of the first and second optimizing operation controlling units 62 and 63, and a fourth reproducing operation controlling unit 70 for controlling the servo circuit 10e to operate a second reproducing operation in which the information data just read out from the second layer of the disk 1 are again read out and reproduced as a plurality of reproduced signals in cases where the first and second optimizing operations are performed under the control of the third and fourth optimizing operation controlling units 64 and 65.

Figure 9:
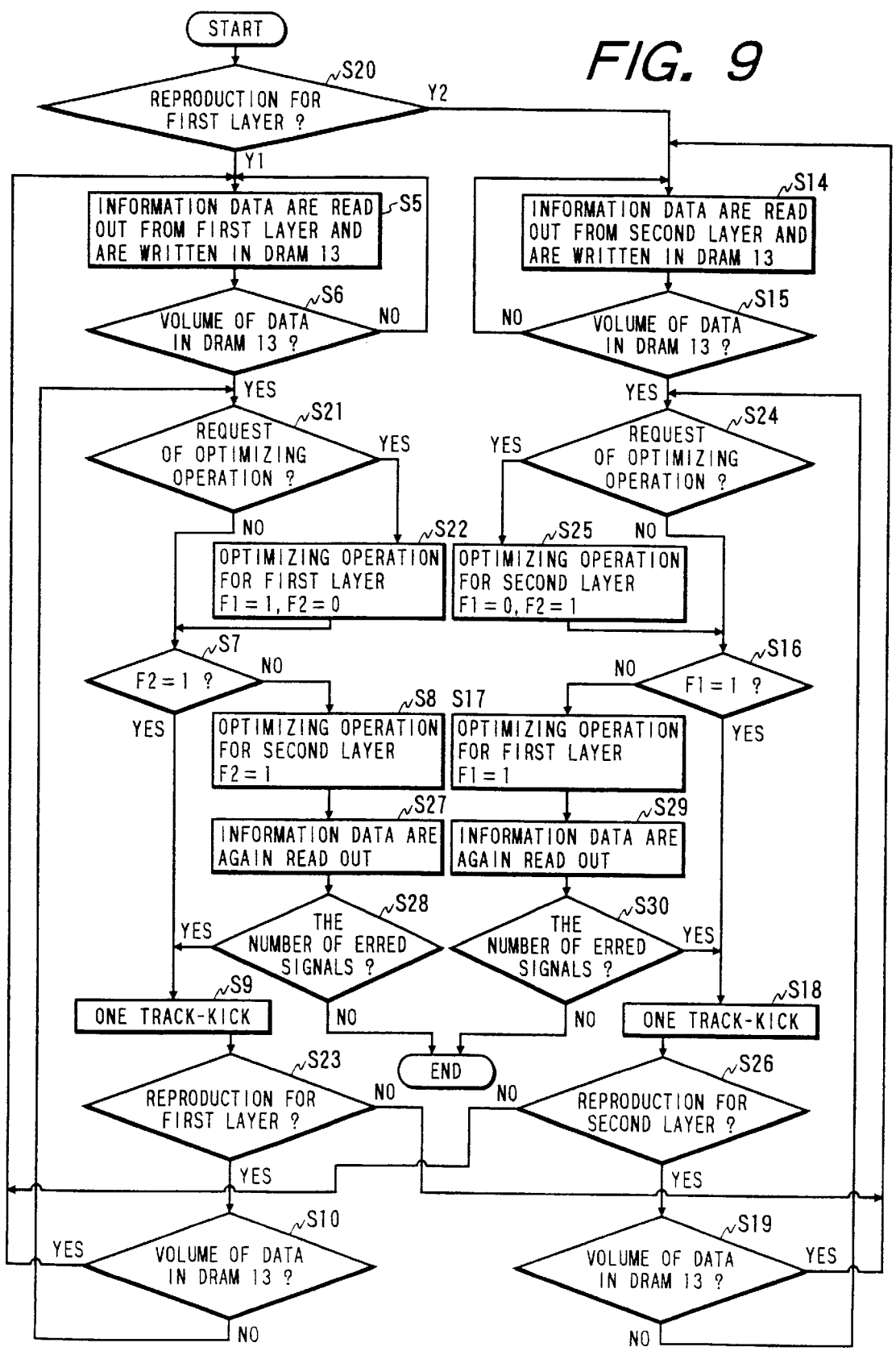
FIG. 9 is a flow chart showing the procedure of an optimizing operation performed during a reproducing operation according to the third embodiment.

FIG. 9 is a flow chart showing the procedure of an optimizing operation performed during a reproducing operation according to the third embodiment As shown in FIG. 9, after the steps S20, S5 and S6 (or S14) are performed in the same manner as in the first embodiment, it is judged by the third (or fourth) optimizing operation judging unit 67 (or 68) according to a compared result of the comparing unit 84 whether or not a first (or second) optimizing operation for the first (or second) layer of the disk 1 is required, in the same manner as in the second embodiment (step S21 or S24). In cases where the number of erred signals compared by the comparing unit 84 is equal to or larger than the reference number, the steps S22, S7 and S8 (or S25, S16 and S17) are performed in the same manner as in the first and second embodiments. Thereafter, the information data just read out from the first (or second) layer of the disk 1 are again read out and reproduced as a plurality of corrected reproduced signals under the control of the third (or fourth) reproducing operation controlling unit 69 or 70 (step S27 or S29), and it is judged by the third (or fourth) optimizing operation judging unit 67 (or 68) according to a compared result of the comparing unit 84 whether or not a first (or second) optimizing operation for the first (or second) layer of the disk 1 is required (step S28 or S30). That is, it is judged in the step S28 (or S30) whether or not the number of erred signals is reduced to a value lower than the reference number by performing the first (or second) optimizing operation in the step S22 (or S25).

In cases where the number of erred signals becomes lower than the reference number, it is judged by the unit 67 (or 68) that the first (or second) optimizing operation is effective for a DVD type optical disk recording and/or reproducing apparatus according to the third embodiment. Therefore, the judgement based on the number of erred signals is continued in the apparatus. In contrast, in cases where the number of erred signals is still equal to or more than the reference number, it is judged by the unit 67 (or 68) that the first (or second) optimizing operation is noneffective for the apparatus, and the first (or second) optimizing operation is stopped. That is, in cases where the number of erred signals is not effectively reduced even though the first (or second) optimizing operation is performed, there is high possibility that the disk 1 is considerably degraded, the optical pick-up 2 is covered with dust, or a circumstance condition such as temperature or humidity is out of a working range. In this case, the performance of the first (or second) optimizing operation is useless. Therefore, it is preferred that an alarm signal be transmitted from the microcomputer 11 to the displaying unit 18 to warn a user.

Next, a DVD type optical disk recording and/or reproducing apparatus according to a fourth embodiment is described.

As shown in FIG. 3, the CPU 11e further comprises a time interval detecting unit 71 for detecting a predetermined time interval, a first optimizing operation requesting unit 72 for requesting the performance of the first optimizing operation on every predetermined time interval detected by the time interval detecting unit 71 in cases where it is judged by the reproduction request judging unit 41 that the first request is input to the input unit 16, and a second optimizing operation requesting unit 73 for requesting the performance of the second optimizing operation on every predetermined time interval detected by the time interval detecting unit 71 in cases where it is judged by the reproduction request judging unit 41 that the second request is input to the input unit 16.

In the above configuration, because circumference conditions of a DVD type optical disk recording and/or reproducing apparatus changes with time, a detecting signal is transmitted to the requesting units 72 and 73 on every predetermined time interval by the time interval detecting unit 71, a first optimizing operation for the first layer of the disk 1 is performed on every predetermined time under control of the requesting unit 72, and a second optimizing operation for the second layer of the disk 1 is performed on every predetermined time under control of the requesting unit 73.

Therefore, even though any working circumstance condition measuring unit such as a temperature sensor or any error counting unit is not provided for the apparatus, the apparatus can be always operated in the optimized conditions. Also, because the optimizing operation is performed on every predetermined time interval under the control of the microcomputer 11, the apparatus can be manufactured at the lowest cost.

Next, the optimizing operation performed during a recording operation is described with reference to FIG. 10 according to a fifth embodiment.

Figure 10:
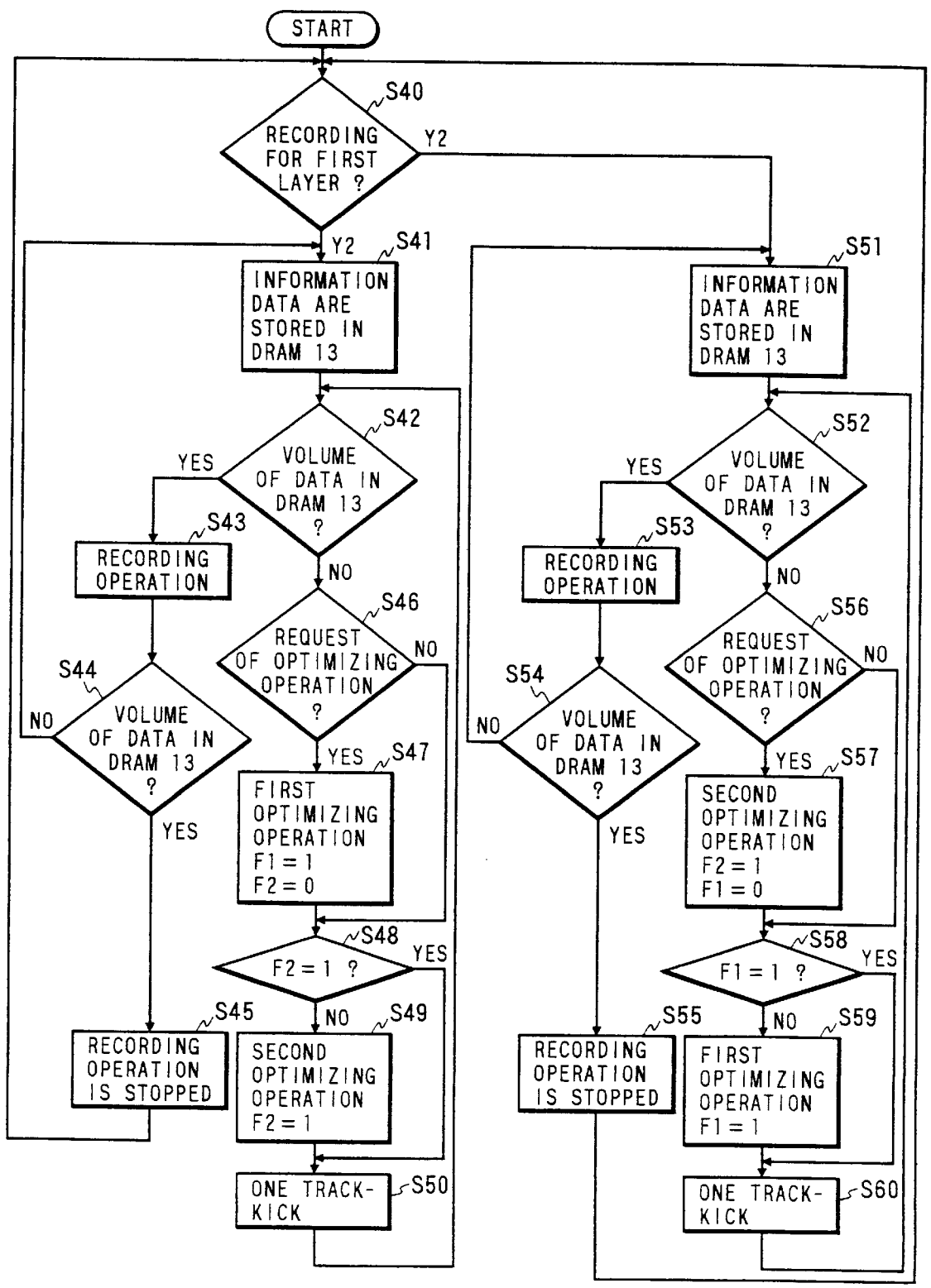
FIG. 10 is a flow chart showing the procedure of an optimizing operation which is required during a recording operation performed in the apparatus shown in FIG. 1.

FIG. 10 is a flow chart showing the procedure of an optimizing operation which is required during a recording operation performed in the apparatus 32.

In cases where a measured temperature detected by the temperature sensor 20 exceeds a reference temperature or a difference between current and previous measured temperatures is larger than a prescribed value, an optimizing operation is requested by the CPU 11e.

As shown in FIG. 10, in a step S40, it is judged by the CPU 11e whether or not a first request Y1 requesting the recording of information to a first layer of the disk 1 or a second request Y2 requesting the recording of information to a second layer of the disk 1 is input to the input unit 16.

In cases where the first request Y1 is detected, pieces of recording information are transmitted one after another from an external apparatus to the second control block 10, and the recording information are temporarily stored in the DRAM 13 under the control of the memory controller 10b (step S41). Thereafter, it is judged by the CPU 11e whether or not a volume of data stored in the DRAM 13 is equal to or more than a first predetermined value (step S42).

In cases where the volume of data is equal to or more than the first predetermined value, it is judged that the volume of data stored in the DRAM 13 is enough, and a recording operation is performed (step S43) while reading out the recording information stored in the DRAM 13. During the recording operation, it is judged by the CPU 11e whether or not a volume of data stored in the DRAM 13 is equal to or less than a second predetermined value (step S44). The second predetermined value is lower than the first predetermined value. In cases where the volume of data is more than the second predetermined value, the transmission of the recording information from the external apparatus to the DRAM 13 is continued in the step S41, and the recording operation is continued. In contrast, in cases where the volume of data is equal to or less than the second predetermined value in the step S44, it is judged that all of the recording information transmitted from the external apparatus are read out from the DRAM 13 and are recorded in the first layer of the disk 1, the recording operation is stopped (step S45), and the procedure returns to the step S40.

In contrast, in cases where the volume of data is smaller than the first predetermined value in the step S42, it is required to increase the volume of data stored in the DRAM 13, and the optical pick-up 2 is set to a standby condition. Therefore, the recording operation is temporarily stopped, and the judgement whether or not a first optimizing operation for the first layer is required is performed by the CPU 11e (step S46) in the same manner as in the step S21 of FIG. 5. In cases where the first optimizing operation is required, the first optimizing operation is performed, the first optimizing request flag F1 is set to "1", the second optimizing request flag F2 is set to "0" (step S47), and the procedure proceeds to a step S48. In the step S48, it is judged by the CPU 11e whether or not the second optimizing request flag F2 is set to "1". In cases where the first optimizing operation is performed in the step S47, a second optimizing operation is performed because the second optimizing request flag F2 is set to "0" in the step S47, the second optimizing request flag F2 is set to "1" (step S49), and the procedure proceeds to a step S50. In contrast, in cases where the first optimizing operation is not required in the step S46, the procedure proceeds to the step S48, it is judged that the second optimizing request flag F2 is set to "0", and the procedure proceeds to the step S50 without performing the first or second optimizing operation. In the step S50, a track-kick is performed in the same manner as in the step S9 of FIGS. 4 and 9, and the procedure returns to the step S42.

In contrast, in cases where the second request Y2 is detected in the step S40, steps S51 to S60 are performed in the same manner as in the steps S41 to S50 to record pieces of recording information to the second layer and perform the first and second optimizing operations.

Accordingly, the first and second optimizing operations for the first and second layers can be performed during a standby condition of the optical pick-up 2 in which any piece of information data is not recorded in the disk 1 by the optical pick-up 2 in the middle of the recording operation. Therefore, the recording operation for the recording information performed by the apparatus 32 is not interrupted by the first and second optimizing operations.

FIG. 11 shows a timing chart of a volume of data stored in the DRAM 13 in the recording operation, optical pick-up conditions, the transmission of pieces of recording information, and temperatures measured by the temperature sensor 20.

As shown in FIG. 11, when the recording operation for recording pieces of recording information in the first (or second) layer of the disk 1 is started (elapsed time T0), the transmission of pieces of recording information from an external apparatus to the DRAM 13 through the second control block 10 is started, the optical pick-up 2 is set in a optimization condition, and the first and second (or second and first) optimizing operations are performed in that order (steps S47 and S49 or steps S57 and S59). Also, ambient temperature around the disk 1 is gradually increased because of the operation of the apparatus 32. Thereafter, when the volume of recording information stored in the DRAM 13 reaches the first predetermined value (elapsed time T1), the optical pick-up 2 is set in a recording condition, pieces of recording information are written in the disk 1, and the volume of recording information stored in the DRAM 13 is gradually decreased. Thereafter, for example, when a difference between a starting temperature (−30° C.) and a current temperature exceeds 30° C. during the recording operation (elapsed time T2), the recording of the recording information is temporarily stopped, the optical pick-up 2 is again set in the optimization condition, and the first and second (or second and first) optimizing operations are performed in that order. Thereafter, when the volume of recording information stored in the DRAM 13 reaches the first predetermined value, the optical pick-up 2 is again set in the recording condition, and pieces of recording information are written in the disk 1.

In the first to fifth embodiment, the optical disk 1 has two or more layers. However, the present invention can be applied for an optical mini-disk having a single layer. The optimizing operation performed in a reproducing operation for the optical mini-disk is described with reference to FIG. 12 according to a sixth embodiment.

Figure 12A:
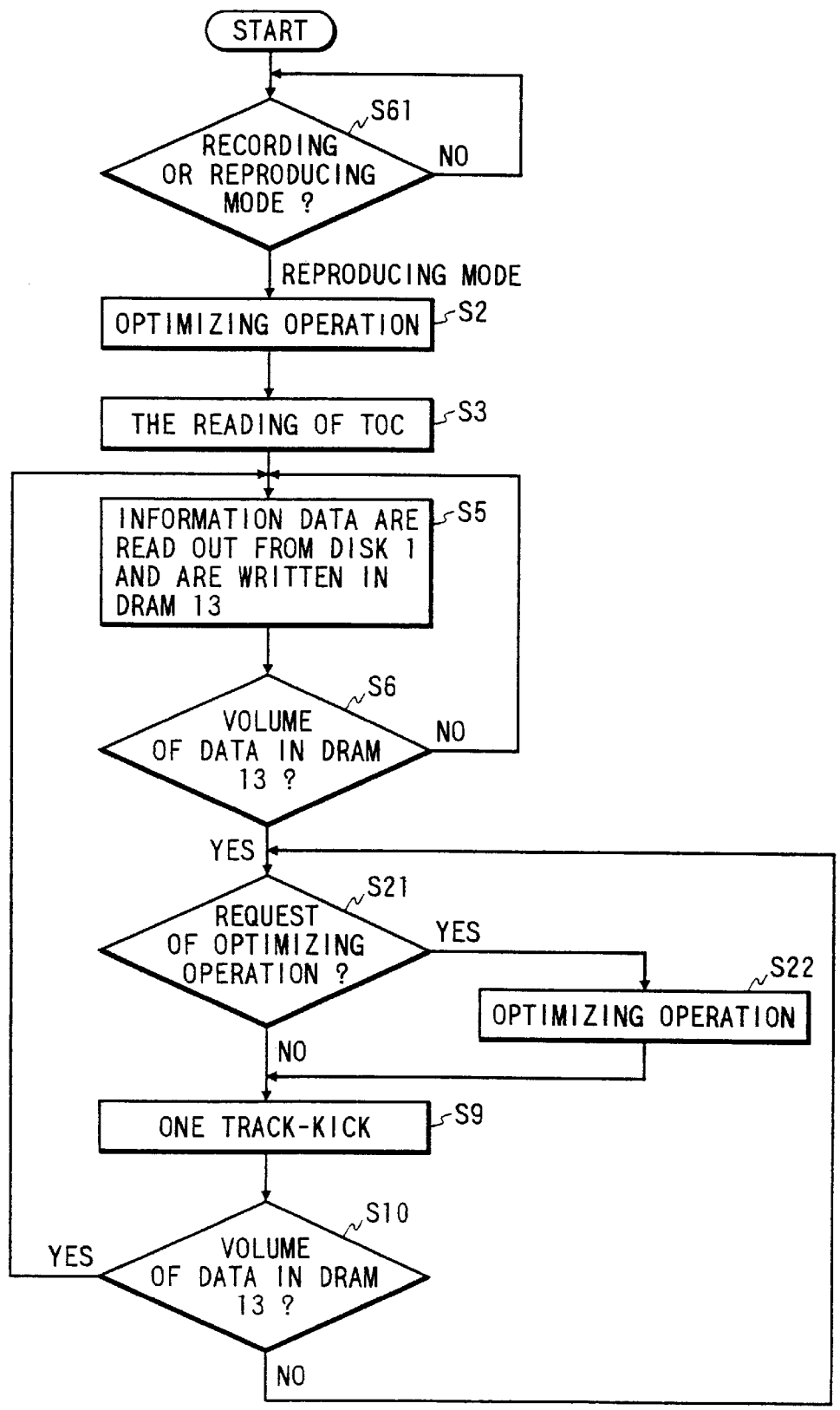
FIG. 12A is a flow chart showing the procedure of an optimizing operation which is required for an optical mini-disk having only a first layer during a reproducing operation performed in the apparatus.

FIG. 12A is a flow chart showing the procedure of an optimizing operation which is required for an optical mini-disk having only a first layer in a reproducing operation performed in the apparatus 32.

For example, when an electric source for the apparatus 32 is switched on and the disk 1 is set in the apparatus 32, an optimizing operation shown in FIG. 12A is started. In a step 61, it is judged by a mode judging unit of the CPU 11e whether or not a request input to the input unit 16 is a recording mode for requesting a recording operation or a reproducing mode for requesting a reproducing operation. In cases where the reproducing mode is detected, an optimizing operation for the first layer of the optical mini-disk is performed in the steps S2 and S3 at the beginning of the reproducing operation. Thereafter, the optimizing operation is again performed during the reproducing operation in the steps S5, S6, S21, S22, S9 and S10 when the optimizing operation is required.

Therefore, the optimizing operation can be performed without interrupting the reproducing operation, in the same manner as in the first embodiment.

Figure 12B:
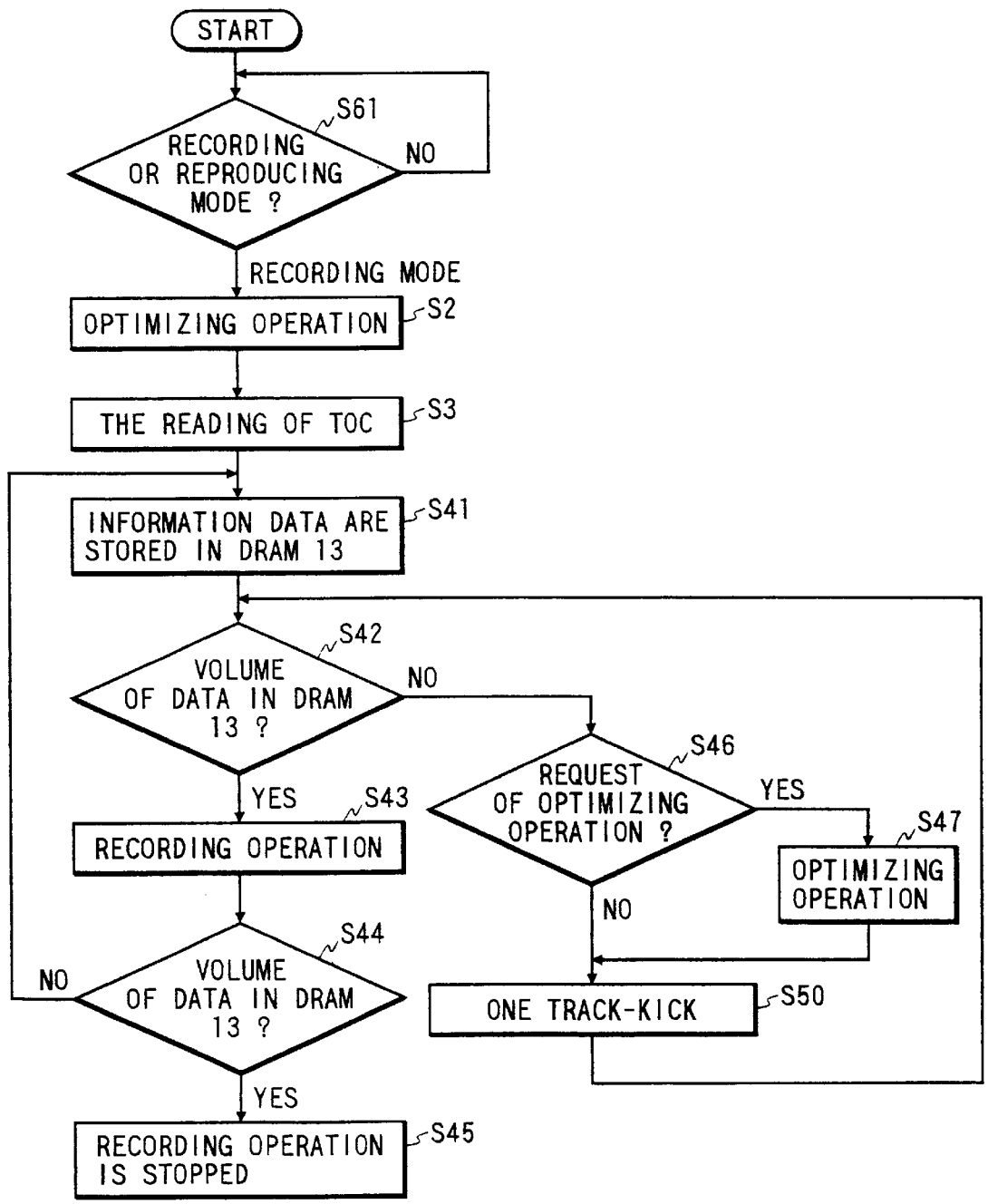
FIG. 12B is a flow chart showing the procedure of an optimizing operation which is required for an optical mini-disk having only a first layer in a recording operation performed in the apparatus.

Also, the optimizing operation for the optical mini-disk having a single layer in a recording operation is performed as shown in FIG. 12B.

Next, the optimizing operation representing the first and second optimizing operations performed in the producing and recording operations (the steps S2, S8, S11, S17, S22, S25, S47, S49, S57 and S59) of the first to sixth embodiments is described in detail.

In cases where the first (or second) optimizing operation for the first (or second) layer of the disk 1 is performed during the reproducing (or recording) operation for the first (or second) layer of the disk 1 (step S22, S25, S47 and S57), a photo-spot of a laser beam formed on the first (or second) layer by the optical pick-up 2 is not moved, or the photo-spot is moved to the innermost track (or TOC region) of the first (or second) layer in which table of contents (or TOC) is recorded. Also, in cases where the first (or second) optimizing operation for the first (or second) layer of the disk 1 is performed during the reproducing (or recording) operation for the second (or first) layer of the disk 1 (step S8, S17, S49 and S59), the optical pick-up 2 by which a photo-spot of a laser beam is converged on the second (or first) layer is controlled, and the photo-spot is moved in a direction perpendicular to the disk 1 to place the photo-spot on the first (or second) layer or the photo-spot is moved to the innermost track (or a TOC region) of the first (or second) layer in which table of contents (or TOC) is recorded. In the optimizing operation, one of the offset, the balance and the gain in the tracking control is at least adjusted, and one of the offset, the balance and the gain in the focus control is at least adjusted. However, it is preferred that all of the offset, the balance and the gain in the focus and tracking controls be adjusted.

In a recording or reproducing operation, a phase lock loop (PLL) circuit of the servo circuit 10e of the second control block 10 is operated to perform a feed-back control of the rotation of the disk 1 rotated by the spindle motor 3 through the first control block 4.

In contrast, in the optimizing operation, the operation of the PLL circuit is stopped, a fixed value is transmitted from the servo circuit 10e to the first control block 4, and the spindle motor 3 is rotated by a prescribed rotational speed. Also, the servo control for the tracking and focus control operations is set to an "off" condition to be stopped, a laser power control signal is transmitted from the microcomputer 11 to the laser diode LD of the optical pick-up 2 through the laser power control circuit 22, and a power of the laser diode LD is set to zero. In the above condition of the DVD type optical disk recording and/or reproducing apparatus 32 or 81, the tracking error signal TEO and the focus error signal FEO generated in the pre-amplifier 9 are transmitted to the CPU 11e of the microcomputer 11 through the A/D converter 11a, and electric voltage values of the error signals TEO and FEO are measured. Thereafter, a piece of tracking offset control data and a piece of focus offset control data are transmitted from the microcomputer 11 to the microcomputer data interface 36 to output a tracking offset signal TOFS and a focus offset signal FOFS from the microcomputer data interface 36 to the variable resisting elements 28F and 28T for the purpose of setting differences between a reference voltage Vref and the electric voltage values of the error signals TEO and FEO at zero. Thereafter, the laser diode LD is operated, the servo control for the tracking and focus control operations is set to an "on" condition to be operated, an EFM envelope signal EFMENV of the envelope detecting circuit 21a is transmitted to the CPU 11e of the microcomputer 11 through the A/D converter 11a, and a voltage value of the EFM envelope signal EFMENV is measured for the purpose of adjusting a focus balance. Thereafter, the optical pick-up 2 is controlled according to the voltage value of the EFM envelope signal EFMENV to move a focus point (or a photo-spot) of a laser beam in an optical axis direction perpendicular to a disk surface. In detail, a piece of focus balance control data is transmitted from the microcomputer 11 to the microcomputer data interface 36 to output a focus balance signal FBAL from the microcomputer data interface 36 to the variable resisting elements 24F1 and 24F2 for the purpose of setting the focus point at an optimum position at which an amplitude of the EFM signal is, for example, maximized. Thereafter, a tracking servo control is set to an "off" condition to be stopped for the purpose of adjusting a tracking balance, a tracking error signal TEO generated in the pre-amplifier 9 is transmitted to the CPU 11e of the microcomputer 11 through the A/D converter 11a, and upper and lower peak voltage values of the tracking error signal TEO are measured in the CPU 11e. Thereafter, a piece of tracking balance control data is transmitted from the microcomputer 11 to the microcomputer data interface 36 to output a tracking balance signal TBAL from the microcomputer data interface 36 to the variable resisting elements 24T1 and 24T2 for the purpose of equalizing the upper and lower peak voltage values of the tracking error signal TEO. Also, a piece of tracking gain data is transmitted from the microcomputer 11 to the microcomputer data interface 36 according to the upper and lower peak voltage values to output a tracking gain signal TG from the microcomputer data interface 36 to the variable resisting element 26T for the purpose of controlling a tracking gain. After the tracking servo in the servo circuit 10e is restarted, a gain of the EFM signal output from the reproduced information signal outputting circuit 21 is appropriately adjusted according to the EFM envelope signal EFMENVEFM output from the envelope detecting circuit 21a. Also, a piece of focus gain data is transmitted from the microcomputer 11 to the microcomputer data interface 36 according to upper and lower peak voltage values of the focus error signal FEO to output a focus gain signal FG from the microcomputer data interface 36 to the variable resisting element 26F for the purpose of controlling a focus gain.

Next, a first example of the optimizing operation for adjusting the balance and offset of the tracking error signal TEO is described with reference to FIGS. 13A and 13B and FIG. 14.

Figure 13A:
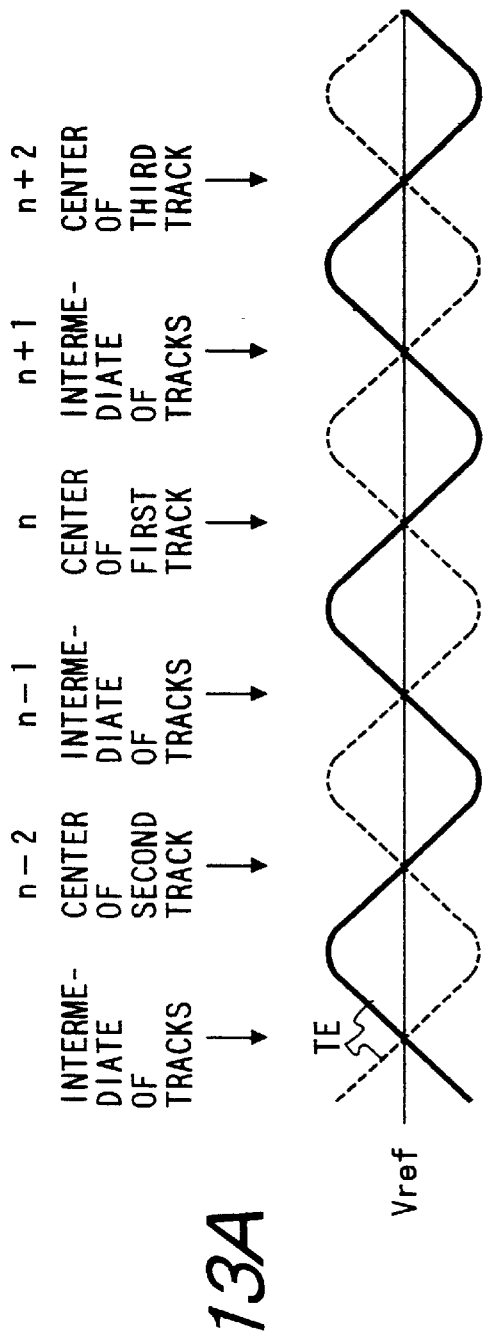
FIGS. 13A and 13B show a track-jump of a laser beam from a track to another track of a disk in a first example.
Figure 13B:
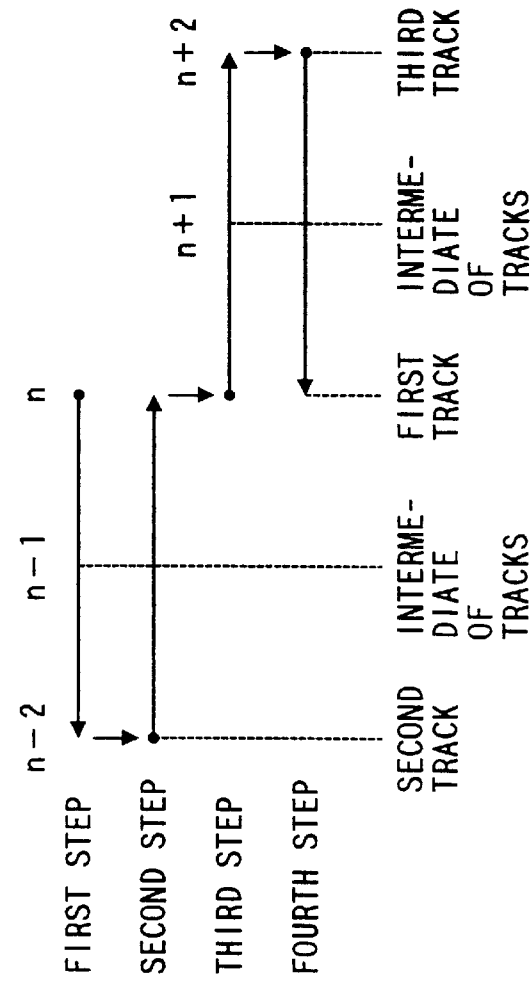
Figure 14:
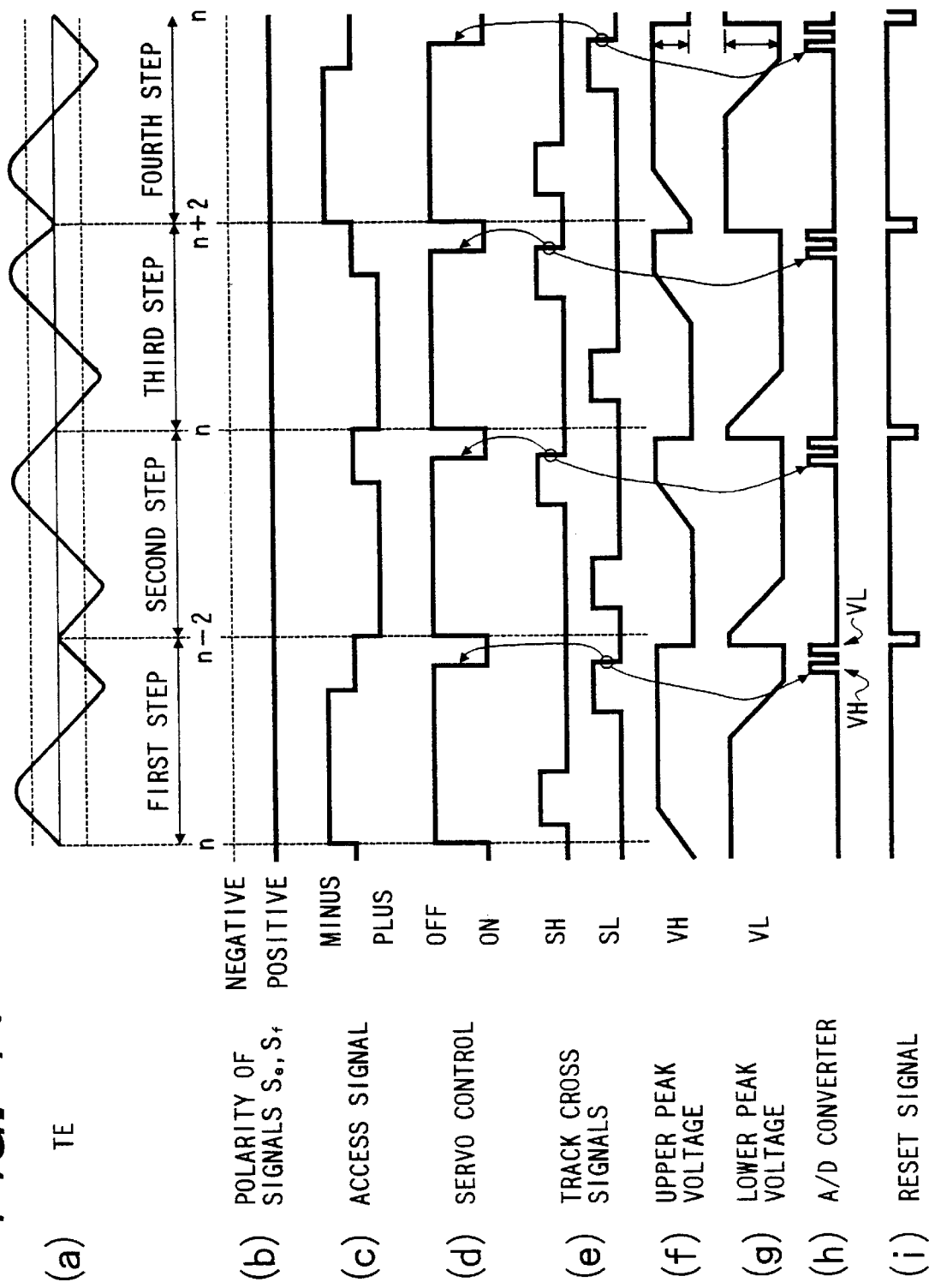
FIG. 14 (or a group of FIGS. 14(a) to 14(i)) is a timing chart of an adjusting operation in which the balance and offset of a tracking error signal are adjusted in the first example.

FIGS. 13A and 13B show a track-jump of a laser beam from a track to another track in a first example, and FIG. 14 (or a group of FIGS. 14(a) to 14(i)) is a timing chart of an adjusting operation in which the balance and offset of the tracking error signal TEO are adjusted in the first example.

As shown in FIGS. 13A and 13B, a photo-spot of the laser beam focused on a first track is moved to a second track adjacent to a minus side (or an inner direction of the disk 1) of the first track in a first step. That is, a photo-spot of the laser beam is moved from the first track to the second track placed on a minus side. Also, a photo-spot of the laser beam is moved from the second track to the first track placed on a plus side in a second step, a photo-spot of the laser beam is moved from the first track to a third track placed on the plus side in a third step, and a photo-spot of the laser beam is moved from the third track to the first track placed on the minus side in a fourth step. Here, a symbol "n−2" denotes a center of the second track, a symbol "n" denotes a center of the first track, a symbol "n+2" denotes a center of the third track, a symbol "n−1" denotes an intermediate position between the first and second tracks, and a symbol "n+1" denotes an intermediate position between the first and third tracks. Also, solid and broken curved lines indicate sine waves of a tracking error signal TEO having polarities opposite to each other, and a wavelength of each sine wave corresponds to a tracking error signal TEO for one track. Also, the tracking error signal TEO is adjusted by the servo control circuit 10e to set a decreasing voltage of the tracking error signal TEO indicated by the solid line to the reference voltage Vref at the center of each track.

As shown in FIG. 14, the tracking offset signal TOFS produced in the microcomputer data interface 36 is adjusted by the microcomputer 11 to equalize a difference voltage Ve−Vf obtained by subtracting a voltage Vf of the tracking error detecting signal Sf from a voltage Ve of the tracking error detecting signal Se with the reference voltage Vref. Thereafter, the tracking gain signal TG produced in the microcomputer data interface 36 is adjusted by using the adjusted tracking offset signal TOFS to set a difference voltage between the voltage Ve−Vf and the reference voltage Vref to a predetermined value. Thereafter, a focus servo of the servo circuit 10e is continuously set to the "on" condition by the microcomputer 11, and polarities of the tracking error detecting signals Se and Sf are respectively fixed to a positive side by the polarity change-over circuit 29 under the control of the microcomputer 11 (refer to FIG. 14(b)). Also, a current flowing through a focus actuating coil of the optical pick-up 2 is directed in a minus direction according to a minus-sided access signal in the first step to move the photo-spot of the laser beam to the minus side, the current is directed in a plus direction according to a plus-sided access signal in the second step to move the photo-spot of the laser beam to the plus side, the current is directed in the plus direction according to a plus-sided access signal in the third step, and the current is directed in the minus direction according to a minus-sided access signal in the fourth step (refer to FIG. 14(c)). In the first step, as shown in FIGS. 14(a) and 14(d), after the tracking servo is set to the "on" condition by the microcomputer 11 on a tentative condition that positive and negative peak values of the tracking error signal TE do not agree with each other in case of the first track "n", the tracking servo is set to the "off" condition by the microcomputer 11, a track-jump from the first track "n" to the second track "n−2" is performed by controlling the optical pick-up 2 under the control of the microcomputer 11 and the first control block 4, and the access signal for the first step is stopped in the middle of the track-jump. Thereafter, when one of the track cross signals SH and SL produced by the differential amplifiers 31H and 31L is detected by the microcomputer 11 (refer to FIG. 14(e), the tracking servo is again set to the "on" condition under the control of the microcomputer 11 (refer to FIG. 14(d)). Thereafter, the upper and lower peak voltages VH and VL of the tracking error signal TEO held by the peak hold circuit 30 are transmitted to the CPU 11e through the A/D converter 11a (refer to FIGS. 14(f) to 14(h), and the peak hold circuit 30 is reset (refer to FIG. 14(i)).

In the same manner as in the first step, in each of the second, third and fourth steps, the tracking servo is set to the "off" condition for each of the second, first and third tracks "n−2", "n" and "n+2", the focus point (or photo-spot) of the laser beam is track-jumped by one track, and the access signal is stopped in the middle of the track-jump. Thereafter, when one of the track cross signals SH and SL is detected, the tracking servo is again set to the "on" condition, the upper and lower peak voltages VH and VL of the tracking error signal TEO held by the peak hold circuit 30 are transmitted to the CPU 11e through the A/D converter 11a (refer to FIGS. 14(f) to 14(h)), and the peak hold circuit 30 is reset (refer to FIG. 14(i)). Thereafter, upper peak voltages VH and lower peak voltages VL for a plurality of tracks ranging from several tracks to tens of tracks are transmitted to the CPU 11e in the same manner, an upper sum SVH of the upper peak voltages VH and a lower sum SVL of the lower peak voltages VL are calculated in the CPU 11e, a peak difference between the upper and lower sums SVH and SVL is calculated, and the tracking balance signal TBAL output from the microcomputer data interface 36 is adjusted by the microcomputer 11 to minimize the peak difference.

Accordingly, because the servo control is set to the "on" condition when the focus point (or photo-spot) of the laser beam is track-jumped by one track on condition that the servo control is set to the "off" condition, an "off" period of the tracking servo is shortened. Therefore, even though an external shock occurs in the apparatus, a probability that the focus point (or photo-spot) of the laser beam is erroneously track-jumped to an undesired track can be prevented. Also, an erroneous recording of information data can be prevented, and a time required to return from an erroneous track to a predetermined track can be shortened. In particular, in cases where a test-writing operation is performed by using a type of disk in which the number of test-tracks for the test-writing operation is low as the disk 1, a probability that the tracking error signal TEO is erroneously adjusted by radiating a laser beam having a high laser power for the test-writing operation to a track for the reading and writing operations can be reduced, and a probability that information data recorded in the tracks for the reading and writing operations is lost can be reduced. Also, even though the disk 1 is eccentrically rotated or the disk 1 is rotated while shaking its plane in cases where a shape of the disk 1 is not uniformly formed, because the upper and lower peak voltages VH and VL of the tracking error signal TEO are reliably and accurately held by the peak hold circuit 30, the reliability for the measured upper and lower peak voltages can be considerably improved.

The optimizing operation is not limited to the above-described example. That is, the number of measuring operations for measuring the upper and lower peak voltages VH and VL of the tracking error signal TEO held by the peak hold circuit 30 is not limited. Also, the number of tracks moved in one track-jump is not limited to one. Also, it is applicable that one of the upper and lower peak voltages VH and VL of the tracking error signal TEO be only held by the peak hold circuit 30 and another peak voltage be produced by inverting the held peak voltage. Also, it is applicable that a composite signal produced from the track cross signals SH and SL be detected by the CPU 11e. Also, it is preferred that a plurality of A/D converting operations be repeatedly performed for the tracking error signal TEO by the A/D converter 11a to measure the upper and lower peak voltages VH and VL of the tracking error signal TEO without using the peak hold circuit 30.

Next, a second example of the optimizing operation for adjusting the balance and offset of the tracking error signal TEO is described with reference to FIGS. 15A and 15B and FIG. 16.

Figure 15A:
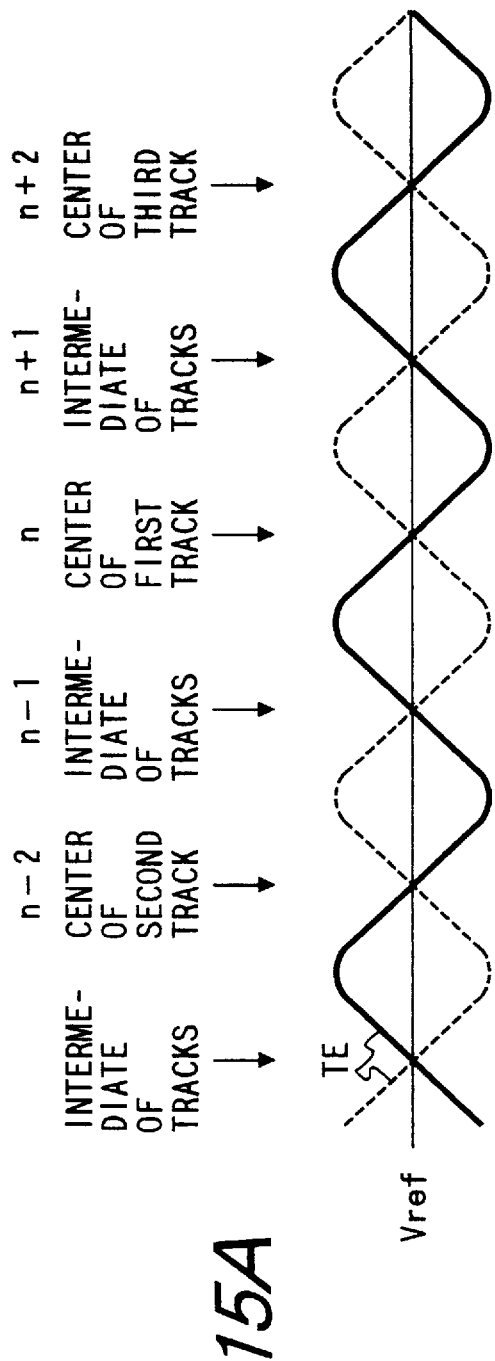
FIGS. 15A and 15B show a track-jump of a laser beam from a track to another track of a disk in a second example.
Figure 15B:
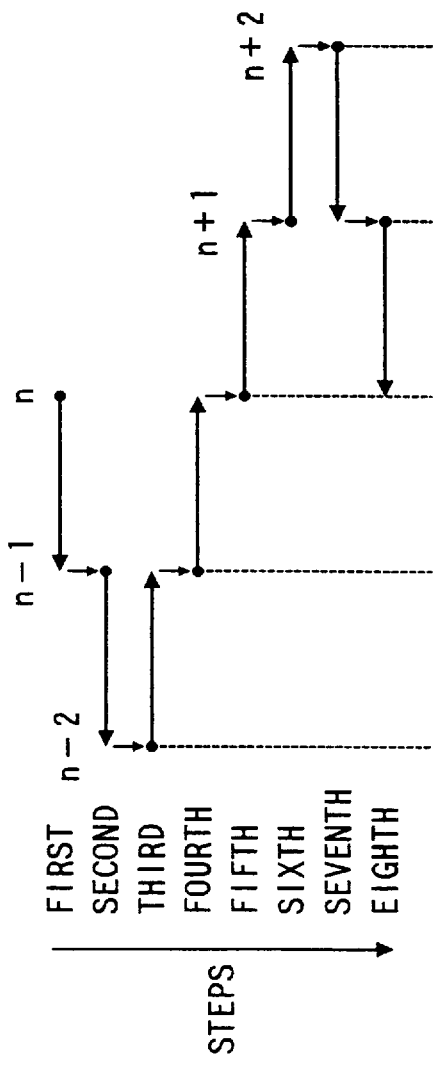
Figure 16:
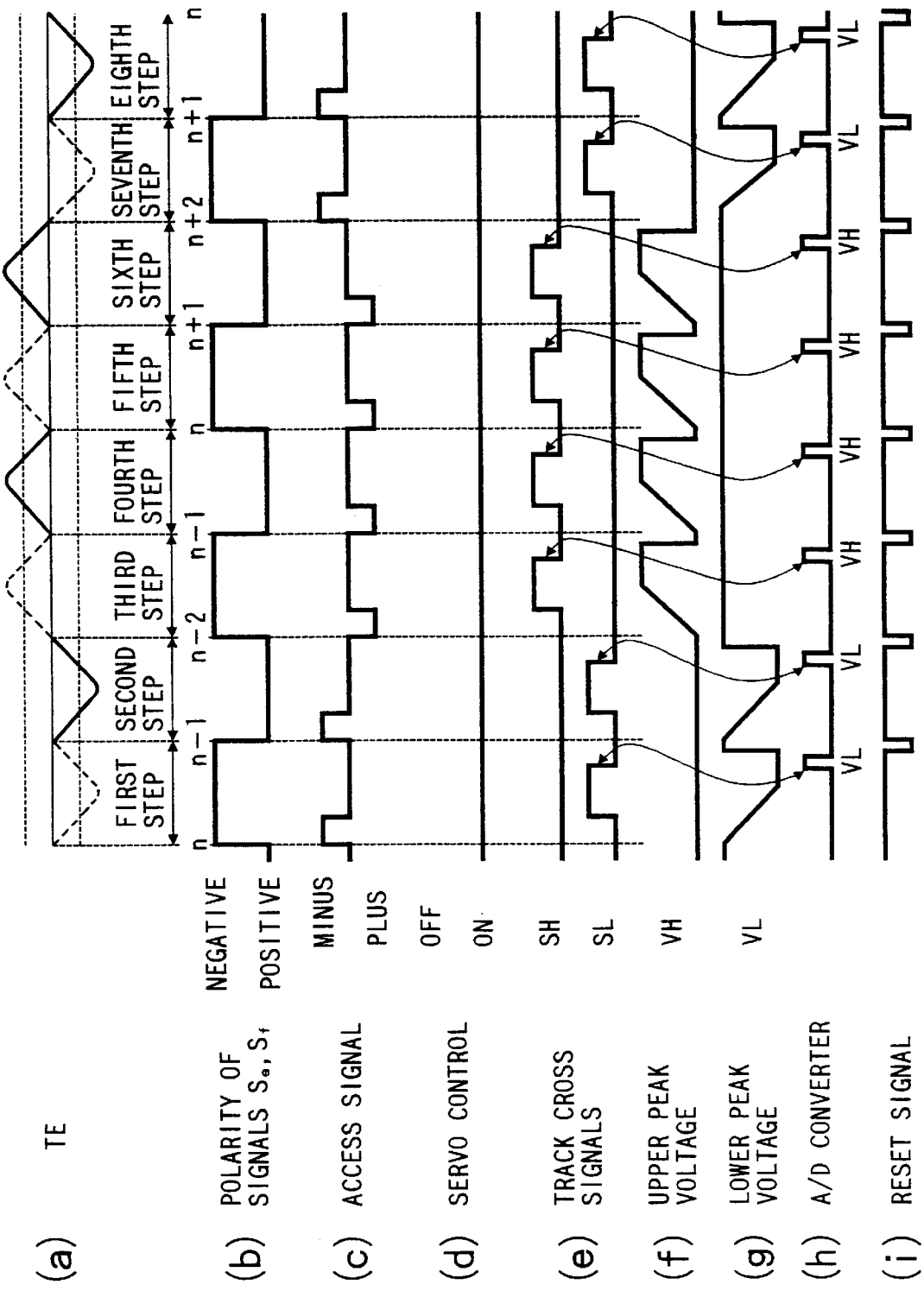
FIG. 16 (or a group of FIGS. 16(a) to 16(i)) is a timing chart of an adjusting operation in which the balance and offset of a tracking error signal are adjusted in the second example.

FIGS. 15A and 15B show a track-jump of a laser beam from a track to another track in a second example, and FIG. 16 (or a group of FIGS. 16(a) to 16(i)) is a timing chart of an adjusting operation in which the balance and offset of the tracking error signal TEO are adjusted in the second example.

As shown in FIGS. 15A and 15B, a photo-spot of the laser beam is track-jumped by a half-track for each of steps. That is, the photo-spot is moved to the minus side in first and second steps, the photo-spot is moved to the plus side in third to sixth steps, and the photo-spot is moved to the minus side in seventh and eighth steps.

In detail, as shown in FIG. 16, the focus servo is continuously set to the "on" condition (FIG. 16(d)), polarities of the tracking error detecting signals Se and Sf are changed over for each step by the polarity change-over circuit 29 according to the polarity selecting signal TESEL under the control of the microcomputer 11 (refer to FIG. 16(b)). Also, a current flowing through a focus actuating coil of the photo pick-up 2 is directed in a minus direction according to a minus-sided access signal in the first and second steps to move the photo-spot of the laser beam to the minus side by a half track, the current is directed in a plus direction according to a plus-sided access signal in the third to sixth steps to move the photo-spot of the laser beam to the plus side by a half-track, the current is directed in the minus direction according to a minus-sided access signal in the seventh and eighth steps (FIG. 16(c)).

In the first step, polarities of the tracking error detecting signals Se and Sf are set to a negative side (FIG. 16(b)), and the photo-spot of the laser beam is moved by a half track according to a minus-sided access signal (FIG. 16(c)). When a track cross signal SL is detected (FIG. 16(e)), a lower voltage VL held in the peak hold circuit 30 is transmitted to the CPU 11e through the A/D converter 11a (FIGS. 16(g) and 16(h)), and the peak hold circuit 30 is reset (FIG. 16(i)).

In the second step, when a track cross signal SL is detected (FIG. 16(e)), a lower voltage VL held in the peak hold circuit 30 is transmitted to the CPU 11e through the A/D converter 11a (FIGS. 16(g) and 16(h)) in the same manner as in the first step, and the peak hold circuit 30 is reset (FIG. 16(i)). In each of the third to sixth steps, when a track cross signal SH is detected (FIG. 16(e)), an upper voltage VH held in the peak hold circuit 30 is transmitted to the CPU 11e through the A/D converter 11a (FIGS. 16(f) and 16(h)), and the peak hold circuit 30 is reset (FIG. 16(i)). In each of the seventh and eighth steps, when a track cross signal SL is detected (FIG. 16(e)), a lower voltage VL held in the peak hold circuit 30 is transmitted to the CPU 11e through the A/D converter 11a (FIGS. 16(g) and 16(h)) in the same manner as in the first step, and the peak hold circuit 30 is reset (FIG. 16(i)). Thereafter, upper peak voltages VH and lower peak voltages VL for a plurality of tracks ranging from several tracks to tens of tracks are transmitted to the CPU 11e in the same manner, an upper sum SVH of the upper peak voltages VH and a lower sum SVL of the lower peak voltages VL are calculated in the CPU 11e, a peak difference between the upper and lower sums SVH and SVL is calculated, and the tracking balance signal TBAL output from the microcomputer data interface 36 is adjusted by the microcomputer 11 to minimize the peak difference.

Accordingly, because the photo-spot of the laser beam is moved by a half track according to the access signal on condition that the track servo is set to the "on" condition without setting the track servo to the "off" condition, even though an external shock occurs in the apparatus, a probability that the photo-spot of the laser beam is erroneously track-jumped to an undesired track can be perfectly prevented. Also, an erroneous reproduction of information data can be perfectly prevented, and a time for returning from an erroneous track to a predetermined track is not required.

In the above examples, a current flowing through the focus actuating coil can be directed in both plus and minus directions. However, it is applicable that the current flowing through the focus actuating coil be only directed in one direction and the photo pick-up 2 be moved in another direction by using a wind pressure caused by the rotation of the disk 1 or a power of a spring arranged in the optical pick-up 2.

Also, the polarities of the tracking error detecting signals Se and Sf are changed over each time the photo-spot of the laser beam is moved by a half-track. However, in cases where a tracking error signal detecting method except for the three-beam method is adopted, it is applicable that the polarities be inverted by subdividing each step in dependence on the tracking direction.

Next, another example of an offset control method for the tracking error signal TEO and the focus error signal FEO is described with reference to FIG. 17.

Figure 17A:
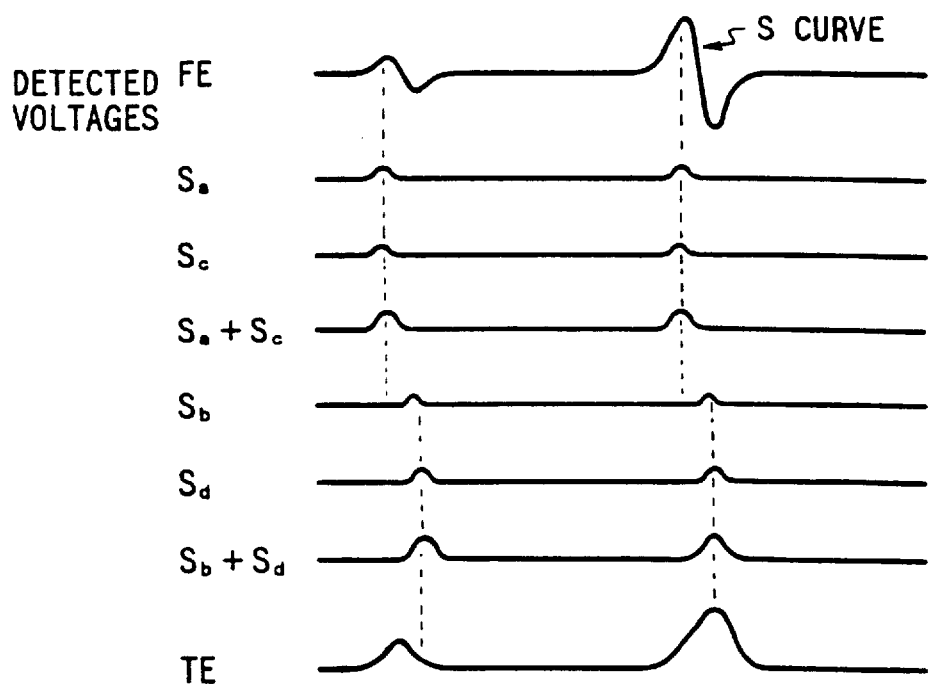
FIG. 17A and B shows the change of an intensity of a laser beam reflecting on an optical disk shown in FIG. 1, voltages of focus and tracking error signals, voltages of focus error detecting signals and voltages of tracking error detecting signals with respect to a distance between the optical pick-up and a recording layer nearer to a disk surface of the optical disk 1.
Figure 17B:
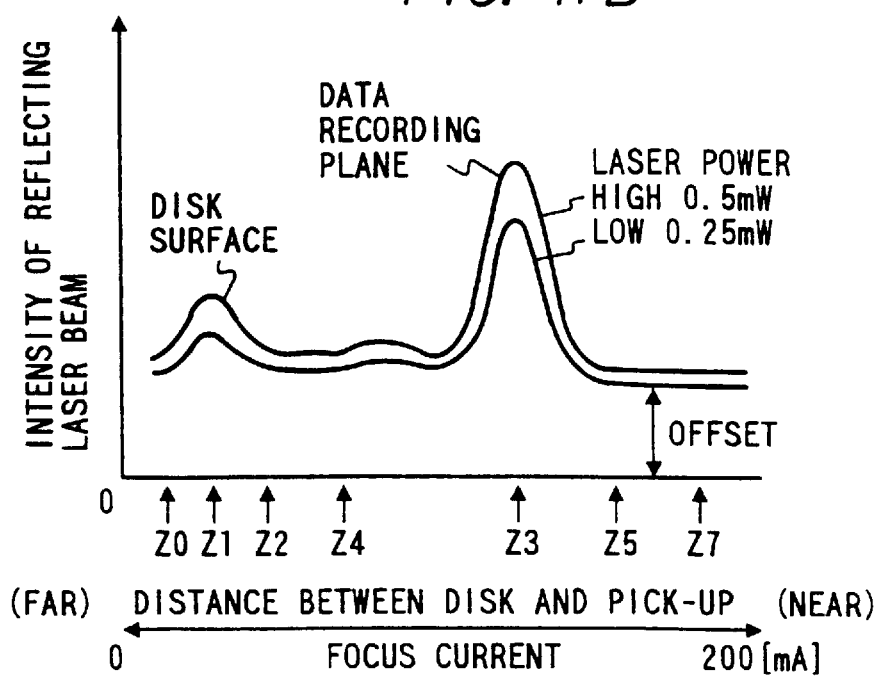

FIG. 17 shows the change of an intensity of a laser beam reflecting on the disk 1, voltages of the focus and tracking error signals FE and TE, voltages of the focus error detecting signals Sa to Sd and voltages of the tracking error detecting signals Se and Sf with respect to a distance between the optical pick-up 2 and a recording layer nearer to a disk surface of the optical disk 1.

As shown in FIG. 17, as a focus current supplied to the optical pick-up 2 is increased, the optical pick-up 2 approaches the optical disk 1. A data recording plane denotes a recording layer nearer to a disk surface of the optical disk 1, and the reflection of the laser beam from other recording layers is omitted. In cases where an intensity of a reflecting laser beam obtained when the optical pick-up 2 is placed at a focusing position Z5 denotes a true offset based on circuits of the DVD type optical disk recording and/or reproducing apparatus 32 or 81 and an optical system composed of the apparatus 32 or 81 and the disk 1, when an initial focusing position of the optical pick-up 2 is positioned at one of focusing positions Z0, Z1 and Z2, the true offset cannot be obtained. For example, in cases where the laser beam is initially focused on the focusing position Z1, signals existing in the disk surface are erroneously measured. Also, in cases where the optical pick-up 2 is initially placed at one of the focusing positions Z0, Z2 and Z4, the laser beam is erroneously focused on a portion placed in the neighborhood of the disk surface or a non-transparent portion surrounded by polycarbonate resin. Therefore, in nine operational examples described hereinafter, a focus current corresponding to one of the focusing positions Z0, Z1 and Z2 is set as an initial focus current before the spindle motor 3 is operated, and the focus current flowing through a focus actuator coil of the optical pick-up 2 is gradually increased to move the optical pick-up 2 toward the disk 1.

A first operational example of the offset control method for the tracking error signal TEO and the focus error signal FEO is described.

In cases where any disk is not set in the apparatus 32 or 81, no existence of the disk 1 is detected by a detecting signal output from a disk detecting switch (not shown), the optical pick-up 2 is initially placed at a focusing position selected from the positions Z0, Z1 and Z2, voltages of the focus error signal FEO and the tracking error signal TEO are measured by the CPU 11e, an offset table registered in the ROM 11d in advance is searched for a focus offset value and a tracking offset value corresponding to the measured voltages, and the focus and tracking offset values are output to the microcomputer data interface 36 through a D/A converter.

In contrast, in cases where the disk 1 is set in the apparatus 32 or 81, it is regarded that an initial focusing position of the optical pick-up 2 is placed on the left side of the focusing position Z0 in FIG. 17. In other words, it is regarded that an initial focusing position of the laser beam is placed far from the disk surface. Therefore, the focus current is increased step by step by increasing a drive voltage in a D/A converter (not shown) of the servo circuit 10e, and a voltage of the tracking error signal TEO is measured by the CPU 11e each time the focus current is increased. Thereafter, when the voltage of the tracking error signal TEO exceeds a first predetermined threshold, it is judged by the CPU 11e that a first peak of the intensity of the laser beam focused on the disk surface is detected, and a value of the drive voltage corresponding to the optical pick-up 2 placed at the focusing position Z1 is stored in the RAM 11c as a first D/A value DA1. Thereafter, when the voltage of the tracking error signal TEO exceeds a second predetermined threshold, it is judged by the CPU 11e that a second peak of the intensity of the laser beam focused on a recording layer nearer to the disk surface is detected, and a value of the drive voltage corresponding to the optical pick-up 2 placed at a focusing position Z3 is stored in the RAM 11c as a second D/A value DA2. Thereafter, an average value (DA1+DA2)/2 is calculated in the CPU 11e and is output to move the optical pick-up 2 to the focusing position Z4 placed at the midpoint of the focusing positions Z1 and Z3 according to the average value (DA1+DA2)/2, and the offsets of the focus and tracking error signals FE and TE are adjusted. That is, the adjustment of the offsets is performed by measuring voltages of the focus and tracking error signals FE and TE, voltages of the focus error detecting signals Sa to Sd and voltages of the tracking error detecting signals Se and Sf and outputting focus and tracking offset values stored in the ROM 11d to the microcomputer data interface 36 through the D/A converter to set the voltages to a reference voltage Vref. In this case, because a returning light component is included in a reflecting laser beam when the optical pick-up 2 is placed at the focusing position Z4, the intensity of the reflecting laser beam slightly differs from the true offset. However, the difference between the intensity of the reflecting laser beam and the true offset is within an allowable range.

Next, a second operational example of the offset control method is described. Because an operation performed in the apparatus 32 or 81 in case of no existence of the disk 1 is the same as in the first operational example, the description of the operation is omitted.

In cases where the disk 1 is set in the apparatus 32 or 81, a value of the drive voltage corresponding to the optical pick-up 2 placed at the focusing position Z1 is stored in the RAM 11c as a first D/A value DA1, and a value of the drive voltage corresponding to the optical pick-up 2 placed at the focusing position Z3 is stored in the RAM 11c as a second D/A value DA2 in the same manner as in the first operational example. Thereafter, a particular drive voltage DA2+(DA2−DA1)/2 is calculated by the CPU 11e, a particular focus current corresponding to the particular drive voltage is supplied to the optical pick-up 2 to move the optical pick-up 2 to a focusing position Z5, and offsets of the focus and tracking error signals FE and TE, the focus error detecting signals Sa to Sd and the tracking error detecting signals Se and Sf are adjusted to an intensity of the reflecting laser beam at the focusing position Z5. In this case, though a time for moving the optical pick-up 2 from the focusing position Z3 to the focusing position Z5 is required and the focus current is increased as compared with those in the first operational example, because the laser beam is not focused on anything, the offset adjustment can be accurately performed.

Next, a third operational example of the offset control method is described. An operation performed in the apparatus 32 or 81 in case of no existence of the disk 1 is the same as in the first operational example.

In cases where the disk 1 is set in the apparatus 32 or 81, the optical pick-up 2 is initially placed at an unspecified focusing position such as the focusing position Z0, Z1 or Z2. Therefore, the focus current is increased step by step by increasing a drive voltage in the D/A converter of the servo circuit 10e, and a voltage of the tracking error signal TEO is measured by the CPU 11e each time the focus current is increased. Thereafter, when the voltage of the tracking error signal TEO exceeds a predetermined threshold, it is judged by the CPU 11e that a peak of the intensity of the laser beam focused on a recording layer nearer to the disk surface is detected, and a value of the drive voltage corresponding to the optical pick-up 2 placed at the focusing position Z3 is stored in the RAM 11c as a first D/A value DA1 in the same manner as in the first operational example. Thereafter, a particular drive voltage DA1+Da is calculated by the CPU 11e by adding a constant offset Da (Da>0) to the first D/A value DA1, a particular focus current corresponding to the particular drive voltage is supplied to the optical pick-up 2 to move the optical pick-up 2 to the focusing position Z5, and offsets of the focus and tracking error signals FE and TE, the focus error detecting signals Sa to Sd and the tracking error detecting signals Se and Sf are adjusted to an intensity of the reflecting laser beam at the focusing position Z5. Therefore, the offset adjustment can be accurately performed in the same manner as in the second operational example.

Next, a fourth operational example of the offset control method is described. An operation performed in the apparatus 32 or 81 in case of no existence of the disk 1 is the same as in the first operational example.

In cases where the disk 1 is set in the apparatus 32 or 81, the optical pick-up 2 is initially placed at an unspecified focusing position such as the position Z0, Z1 or Z2. Therefore, the focus current is increased step by step by increasing a drive voltage in the D/A converter of the servo circuit 10e, and a voltage of the tracking error signal TEO is measured by the CPU 11e each time the focus current is increased. Thereafter, when the voltage of the tracking error signal TEO exceeds a predetermined threshold, it is judged by the CPU 11e that a peak of the intensity of the laser beam focused on a recording layer nearer to the disk surface is detected, and a value of the drive voltage corresponding to the optical pick-up 2 placed at the focusing position Z3 is stored in the RAM 11c as a first D/A value DA1 in the same manner as in the first operational example. Thereafter, a particular drive voltage DA1−Da is calculated by the CPU 11e by adding a constant offset −Da (Da>0) to the first D/A value DA1, a particular focus current corresponding to the particular drive voltage is supplied to the optical pick-up 2 to move the optical pick-up 2 to the focusing position Z4, and offsets of the focus and tracking error signals FE and TE, the focus error detecting signals Sa to Sd and the tracking error detecting signals Se and Sf are adjusted to an intensity of the reflecting laser beam at the focusing position Z4.

Therefore, the adjustment of the offsets can be performed in the same manner as in the first operational example.

Next, a fifth operational example of the offset control method is described. An operation performed in the apparatus 32 or 81 in case of no existence of the disk 1 is the same as in the first operational example.

In cases where the disk 1 is set in the apparatus 32 or 81, the optical pick-up 2 is initially placed at an unspecified focusing position such as the focusing position Z0, Z1 or Z2. Therefore, the focus current is increased step by step by increasing a drive voltage in the D/A converter of the servo circuit 10e, and a voltage of the tracking error signal TEO is measured by the CPU lie each time the focus current is increased. Thereafter, when the voltage of the tracking error signal TEO exceeds a predetermined threshold, it is judged by the CPU 11e that the optical pick-up 2 is placed at the focusing position Z3 to focus the laser beam on the data recording plane. Thereafter, a focus servo performed by the servo circuit 10e is set to the "on" condition under control of the microcomputer 11 to obtain the change of the voltage of the tracking error signal TE. That is, the voltage of the tracking error signal TE changes to draw an S curve when the optical pick-up 2 is moved around the focusing position Z3 to perform the focus servo. Thereafter, an average value DA1 of drive voltages corresponding to voltages of the tracking error signal TE drawing the S curve is calculated by the CPU 11e. Therefore, the average value DA1 corresponds to a central voltage of the tracking error signal TE drawing the S curve. Thereafter, a particular drive voltage DA1+Da (or DA1−Da) is calculated by the CPU 11e by adding a constant offset Da (or −Da) (Da>0) to the average value DA1, a particular focus current corresponding to the particular drive voltage is supplied to the optical pick-up 2 to move the optical pick-up 2 to the focusing position Z5 (or Z4), and offsets of the focus and tracking error signals FE and TE, the focus error detecting signals Sa to Sd and the tracking error detecting signals Se and Sf are adjusted to an intensity of the reflecting laser beam at the focusing position Z5 (or Z4). Therefore, the adjustment of the offsets can be performed in the same manner as in the third (or fourth) operational example.

Accordingly, in the first to fifth operational examples, the optical pick-up 2 is moved to the focusing position Z4 (or Z5) which is nearer to (or further from) the photo pick-up 2 than the data recording plane, and offsets of the focus and tracking error signals FE and TE, the focus error detecting signals Sa to Sd and the tracking error detecting signals Se and Sf are adjusted to an intensity of the reflecting laser beam at the focusing position Z4 (or Z5). Therefore, the tracking error signal TEO and the focus error signal FEO can be accurately obtained, superior reproduced signals can be obtained in a reproducing operation, and superior recording signals can be written in the disk 1 in a recording operation.

In the first to fifth operational examples, a laser power is constant. However, a laser power for a prescribed type of disk is changed. For example, a laser power is 0.25 mW in a reproducing operation for a ROM region, a laser power is 0.5 mW in a reproducing operation for a PC region, and a laser power is 5 mW in a recording operation for the PC region. Therefore, it is applicable that an offset value be adjusted each time a laser power is changed.

Next, a sixth operational example of the offset control method is described. An operation performed in the apparatus 32 or 81 in case of no existence of the disk 1 is the same as in the first operational example.

As shown in FIG. 17, because unnecessary offsets having positive values are added to true offsets of the focus and tracking error detecting signals Sa to Sf, a minimum offset of each signal denotes a desired (or true) offset. Also, in cases where polarities of the focus and tracking error detecting signals Sa to Sf are inverted, unnecessary offsets having negative values are added to true offsets of the focus and tracking error detecting signals Sa to Sf. Therefore, a maximum offset of each signal denotes a desired (or true) offset. In other words, the minimum (or maximum) offset is obtained in cases where an intensity of a laser beam which is radiated from a laser diode LD and is returned to a sensor of the laser diode LD is minimized.

In cases where the disk 1 is set in the apparatus 32 or 81, the optical pick-up 2 is initially placed at an unspecified focusing position such as the focusing position Z0, Z1, Z2, Z3, Z4 or Z5. In this case, a focus servo is set to the "off" condition, the focus current is linearly increased, and then the focus current is linearly decreased. That is, the focus current is changed in a triangular form to move the optical pick-up 2 from the focusing position Z0 to the focusing position Z5 and again move the optical pick-up 2 from the focusing position Z5 to the focusing position Z0. During the movement of the photo-spot (or the optical pick-up 2), voltages of the focus and tracking error detecting signals Sa to Sf and the tracking and focus error signals TE and FE, a first sum Va+Vc of voltages of the focus error detecting signals Sa and Sc and a second sum Vb+Vd of voltages of the focus error detecting signals Sb and Sd are detected by the CPU 11e on every sampling period. That is, a plurality of sampling points ranging from several sampling points to tens of sampling points are spaced in equal intervals in a region between the focusing positions Z0 and Z5, and the first and second sums are obtained for each of the sampling points.

For example, ten sampling points PS1 to PS10 corresponding to ten values 0, 20, 40, 60, 80, 100, 120, 140, 160 and 180 mA of the focus current are determined, voltages Va to Vf, Vte and Vfe of the focus and tracking error detecting signals Sa to Sf and the tracking and focus error signals TE and FE are measured by the CPU 11e for each of the sampling points. Therefore, a block of voltages Va to Vf, Vte and Vfe is obtained for each of the sampling points, and tens blocks of voltages are stored in the RAM 11c. Thereafter, a particular block of voltages in which each of particular voltages Va to Vf, Vte and Vfe corresponding to a particular sampling point is minimum among the corresponding voltages of the ten blocks is selected by the CPU 11e, and a plurality of D/A values stored in the ROM 11d are output to the microcomputer data interface 36 to set voltages Va to Vf, Vte and Vfe corresponding to the particular sampling point to a reference voltage Vref.

Accordingly, it is judged by the CPU 11e that an intensity of a laser beam which is radiated from a laser diode LD of the optical pick-up 2 and is returned to a sensor of the laser diode LD is minimized when the focus current is set to a particular value corresponding to the particular sampling point, and offsets of the focus and tracking error detecting signals Sa to Sf and the tracking and focus error signals TE and FE are adjusted by using the particular voltages of the signals corresponding to the minimum intensity of the laser beam. Therefore, the tracking error signal TEO and the focus error signal FEO can be accurately obtained, superior reproduced signals can be obtained in a reproducing operation, and superior recording signals can be written in the disk 1 in a recording operation.

In this example, an offset of a photo sensor of the optical pick-up 2, an offset of circuits shown in FIG. 1 and an offset caused by a stray light such as light returning to the photo sensor of the laser diode are included in the offsets of the tracking and focus error signals TEO and FEO.

Next, a seventh operational example of the offset control method is described.

Because the optical pick-up 2 is moved in a focusing direction perpendicular to the disk surface, an offset is caused by the weight of the optical pick-up 2. Therefore, there is a probability that the optical pick-up 2 collides with the disk 1. In this case, the optical pick-up 2 and the disk 1 are damaged. Also, though the laser beam is theoretically focused on the data recording plane when the optical pick-up 2 is placed at the focusing position Z3, in cases where the optical pick-up 2 is placed below the disk 1 (FIG. 1), a focusing position of the optical pick-up 2 is shifted to a further point from the disk 1 because of the weight of the optical pick-up 2. For example, the laser beam is actually focused on the data recording plane when the optical pick-up 2 is placed at the focusing position Z0. In contrast, in cases where the optical pick-up 2 is placed above the disk 1, a focusing position of the optical pick-up 2 is shifted to a nearer point to the disk 1 because of the weight of the optical pick-up 2. For example, the laser beam is actually focused on the data recording plane when the optical pick-up 2 is placed at the focusing position Z7. Therefore, though there is no problem in cases where the optical pick-up 2 is placed below the disk 1, there is a problem that the optical pick-up 2 collides with the disk 1 in cases where the optical pick-up 2 is placed above the disk 1. To solve the above problem in the seventh operational example, offsets of the tracking error signal TEO and the focus error signal FEO are adjusted on condition that a laser power is set to zero or a value lower than that in a reproducing operation. In detail, regardless of a disk detecting signal read out from the disk 1, the optical pick-up 2 is fixed to an initial position, a laser power of the laser beam is set to zero or a minimum value such as 0.05 mW which equals to ⅕ of 0.25 mW set for reproducing data stored in a ROM region of the disk 1, and voltages of the focus and tracking error detecting signals Sa to Sf and the tracking and focus error signals TE and FE, a first sum Va+Vc of voltages of the focus error detecting signals Sa and Sc and a second sum Vb+Vd of voltages of the focus error detecting signals Sb and Sd are measured by the CPU 11e on every sampling period. Tens of voltages are measured for each of the signals. Thereafter, an average voltage of the measured voltages is calculated for each of the signals, a plurality of offset values stored in the ROM 11d are selected according to the average voltages and are output to the microcomputer data interface 36 to set the voltages of the focus and tracking error signals FE and TE to a reference voltage Vref, and a pair of offset signals FOFS and TOFS are output from the interface 36 according to the offset values. Therefore, offsets of the tracking error signal TEO and the focus error signal FEO can be adjusted.

In this example, an offset of a photo sensor of the optical pick-up 2, an offset of circuits shown in FIG. 1 and an offset caused by a stray light such as light returning to the photo sensor of the laser diode are included in the offsets of the tracking and focus error signals TEO and FEO. Therefore, though the offset caused by a stray light cannot be measured in the seventh operational example, the offset of the photo sensor and the offset of the circuits can be stably measured regardless of whether the optical pick-up 2 is placed above or below the disk 1. Also, even though the offset caused by a stray light cannot be disregarded, there is a case that the offset caused by a stray light is substantially adjusted by correcting the adjustment of the offset of the photo sensor and the adjustment of the offset of the circuits.

Also, because the adjustment of the offsets of the tracking and focus error signals TEO and FEO can be stably performed in the seventh operational example, a measurement error is considerably low as compared with those in the first to sixth operational examples. Therefore, the accuracy of the offset adjustment can be enhanced, a measurement time can be considerably shortened, and the judgement of the disk detecting signal is not required.

Next, an eighth operational example of the offset control method is described with reference to FIGS. 17 and 18. In the eighth operational example, the offsets of the tracking and focus error signals TEO and FEO are adjusted on condition that voltage levels of the tracking and focus error signals TE and FE change with the laser power of the laser beam.

Figure 18:
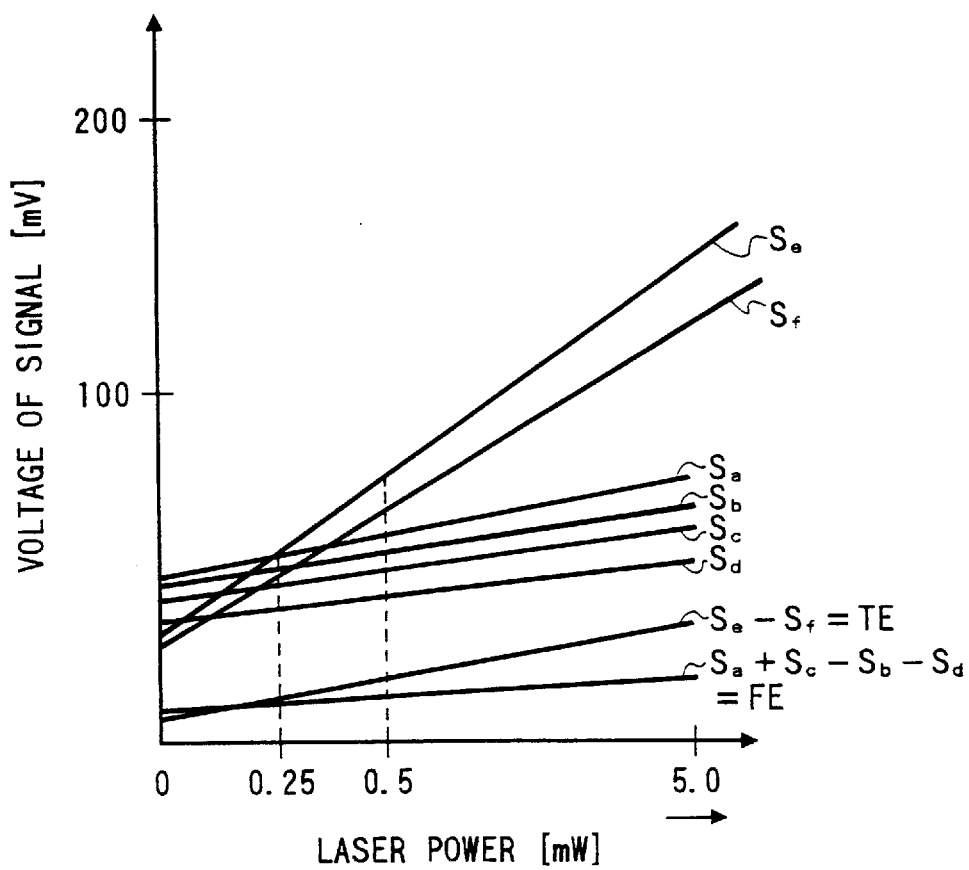
FIG. 18 shows the change of voltage levels of detecting signals with respect to a laser power.
Figure 19:
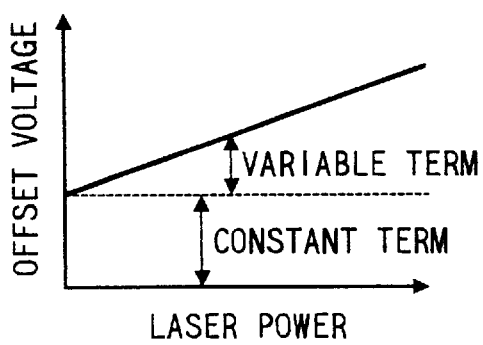
FIG. 19 shows a constant term regardless of a laser power and a variable term proportional to the laser power in each of detecting signals.

FIG. 18 shows the change of voltage levels of the detecting signals Sa to Sf with respect to a laser power. FIG. 19 shows a constant term regardless of a laser power and a variable term proportional to the laser power in each of the detecting signals Sa to Sf.

As shown in FIG. 18, voltage levels of the detecting signals Sa to Sf change with the laser power of the laser beam. Therefore, a voltage level A+C−B−D of the focus error signal FE and a voltage level E−F of the tracking error signal TE change with the laser power of the laser beam. Here, the coefficient a for a focus balance adjusting degree and the coefficient β for a tracking balance adjusting degree are set to 1 for convenience. As shown in FIG. 19, the voltage level E−F of the tracking error signal TE is composed of a variable term proportional to the laser power and a constant term, and the variable term indicates a stray light component. The voltage level E−F is expressed according to an equation (1).

$$E-F = (b1-b2)X + c1-c2 \tag{1}$$

Here, a symbol X denotes a value of the laser power.

In cases where identification information recorded in the table of contents (TOC) region is reproduced, the optical pick-up 2 is placed at an initial position on condition that any focus current does not flow through the focus actuating coil of the optical pick-up 2, and a value of the laser power is set to A=0.25 mW. Therefore, a voltage level VT1 of the tracking error signal TE is measured by the CPU 11e and is stored in the RAM 11c.

$$VT1 = (b1-b2)A + c1-c2 \tag{2}$$

Thereafter, in cases where information data stored in a data region is reproduced, a value of the laser power is increased to B=0.5 mW on condition that the optical pick-up 2 is placed at the initial position. Therefore, a voltage level VT2 of the tracking error signal TE is measured by the CPU 11e and is stored in the RAM 11c.

$$VT2 = (b1-b2)B + c1-c2 \tag{3}$$

Therefore, a first coefficient b1−b2 and a second coefficient c1−c2 are obtained from the equations (2) and (3).

$$b1-b2 = (VT1-VT2)/(A-B)$$

$$c1-c2 = (A*VT2 - B*VT1)/(A-B) \tag{4}$$

The equation (1) is rewritten by using the equation (4).

$$E-F=(VT1-VT2)/(A-B)*X+(A*VT2-B*VT1)/(A-B) \quad (5)$$

Therefore, in cases where the values VT1 and VT2 are measured, even though the laser power is changed, a tracking offset of the tracking error signal TEO can be adjusted. That is, an offset value stored in the ROM 11d is output to the microcomputer data interface 36 to set a voltage level of the tracking error signal TE to a reference voltage Vref.

Next, the adjustment of the offset of the focus error signal FEO is described.

Voltage levels A, B, C and D of the detecting signals Sa to Sd are expressed according to equations (6) to (9).

$$A=a*\sin\omega t+b1*X+c1 \quad (6)$$

$$B=a*\sin(\omega t+\pi)+b2*X+c2 \quad (7)$$

$$C=a*\sin\omega t+b3*X+c3 \quad (8)$$

$$D=a*\sin(\omega t+\pi)+b4*X+c4 \quad (9)$$

Therefore, the voltage level A+C−B−D of the focus error signal FE is expressed according to an equation (10).

$$A+C-B-D=4a*\sin\omega t+(b1+b3-b2-b4)*X+c1+c3-c2-c4 \quad (10)$$

In cases where identification information recorded in the table of contents (TOC) region is reproduced, the optical pick-up 2 is placed at an initial position on condition that any focus current does not flow through the focus actuating coil of the optical pick-up 2, and a value of the laser power is set to A=0.25 mW. Therefore, a voltage level VF1 of the focus error signal FE is measured by the CPU 11e and is stored in the RAM 11c.

$$VF1=(b1+b3-b2-b4)A+c1+c3-c2-c4 \quad (11)$$

Thereafter, in cases where information data stored in a data region is reproduced, a value of the laser power is increased to B=0.5 mW on condition that the optical pick-up 2 is placed at the initial position. Therefore, a voltage level VF2 of the focus error signal FE is measured by the CPU 11e and is stored in the RAM 11c.

$$VF2=(b1+b3-b2-b4)B+c1+c3-c2-c4 \quad (12)$$

Therefore, a first coefficient b1+b3−b2−b4 and a second coefficient c1+c3−c2−c4 are obtained from the equations (11) and (12).

$$b1+b3-b2-b4=(VF1-VF2)/(A-B)$$

$$c1+c3-c2-c4=(A*VF2-B*VF1)/(A-B) \quad (13)$$

The equation (10) is rewritten by using the equation (13).

$$A+C-B-D=(VF1-VF2)/(A-B)*X+(A*VF2-B*VF1)/(A-B) \quad (14)$$

Therefore, in cases where the values VF1 and VF2 are measured, even though the laser power is changed, a focus offset of the focus error signal FEO can be adjusted. That is, an offset value stored in the ROM 11d is output to the microcomputer data interface 36 to set a voltage level of the focus error signal FE to a reference voltage Vref.

Next, a ninth operational example of the offset control method is described. In the ninth operational example, the offsets of the tracking and focus error signals TEO and FEO are adjusted on condition that voltage levels of the tracking and focus error signals TE and FE change with the laser power of the laser beam.

In cases where a tracking offset of the tracking error signal TEO is adjusted, the optical pick-up 2 is placed at an initial position on condition that any focus current does not flow through the focus actuating coil of the optical pick-up 2, and a value of the laser power is set to zero (X=0). Therefore, a voltage level VT3 of the tracking error signal TE is measured by the CPU 11e and is stored in the RAM 11c.

$$VT3=c1-c2 \quad (15)$$

Thereafter, in cases where information data stored in a data region is reproduced, a value of the laser power is increased to B=0.5 mW on condition that the optical pick-up 2 is placed at the initial position. Therefore, a voltage level VT4 of the tracking error signal TE is measured by the CPU 11e and is stored in the RAM 11c.

$$VT4=(b1-b2)B+c1-c2 \quad (16)$$

Therefore, a first coefficient b1−b2 and a second coefficient c1−c2 are obtained from the equations (15) and (16).

$$b1-b2=(VT4-VT3)/B$$

$$c1-c2=VT3 \quad (17)$$

The equation (1) is rewritten by using the equation (17).

$$E-F=(VT4-VT3)/B*X+VT3 \quad (18)$$

Therefore, in cases where the values VT3 and VT4 are measured, even though the laser power is changed, a tracking offset of the tracking error signal TEO can be adjusted. That is, an offset value stored in the ROM 11d is output to the microcomputer data interface 36 to set a voltage level of the tracking error signal TE to a reference voltage Vref.

In cases where a focus offset of the focus error signal FEO is adjusted, the optical pick-up 2 is placed at an initial position on condition that any focus current does not flow through the focus actuating coil of the optical pick-up 2, and a value of the laser power is set to zero (X=0). Therefore, a voltage level VF3 of the focus error signal FE is measured by the CPU 11e and is stored in the RAM 11c.

$$VF3=c1+c3-c2-c4 \quad (19)$$

Thereafter, in cases where information data stored in a data region is reproduced, a value of the laser power is increased to B=0.5 mW on condition that the optical pick-up 2 is placed at the initial position. Therefore, a voltage level VF4 of the focus error signal FE is measured by the CPU 11e and is stored in the RAM 11c.

$$VF4=(b1+b3-b2-b4)B+c1+c3-c2-c4 \quad (20)$$

Therefore, a first coefficient b1+b3−b2−b4 and a second coefficient c1+c3−c2−c4 are obtained from the equations (19) and (20).

$$b1+b3-b2-b4=(VF4-VF3)/B$$

$$c1+c3-c2-c4=VF3 \qquad (21)$$

The equation (10) is rewritten by using the equation (21).

$$A+C-B-D=(VF4-VF3)/B*X+VF3 \qquad (22)$$

Therefore, in cases where the values VF3 and VF4 are measured, even though the laser power is changed, a focus offset of the focus error signal FEO can be adjusted. That is, an offset value stored in the ROM 11$d$ is output to the microcomputer data interface 36 to set a voltage level of the focus error signal FE to a reference voltage Vref.

Also, in the eighth and ninth operational examples, because the laser power is set to 0 mw, 0.25 mW for the reproduction in the TOC region and 0.5 mW for the reproduction in the data region, the adjustment of the offsets can be performed without setting the laser power to 5 mW. Therefore, there is no probability that necessary data is erroneously erased. Also, the adjustment of the offsets can be performed at a short time.

Also, the present invention is not limited to the equations (5), (14), (18) and (22) indicating the voltage levels of the focus and tracking error signals FE and TE. That is, the equations (5), (14), (18) and (22) can be simplified. Also, it is applicable that a voltage level table stored in the ROM 11$d$ be searched for voltage levels of the focus and tracking error signals FE and TE without calculating the voltage levels of the focus and tracking error signals FE and TE according to the equations (5), (14), (18) and (22).

Also, it is applicable that coefficients and equations corresponding to the change of offset, balance and gain with circumstance conditions such as temperature be stored in advance in the ROM 11$d$. Therefore, even though one of the circumstance conditions changes, the adjustment of the offset, balance and gain can be corrected by calculating adjusting values according to the coefficients and equations without setting the servo control to the "off" condition.

Next, a tenth operational example of the offset control method is described. In the tenth operational example, coefficients of the equation (1) or (10) which change with the temperature detected by the temperature sensor 20 are stored in advance in the ROM 11$d$.

In cases where an optimizing operation is required for the first time during the reproducing operation, for example, in one of the steps S22, S8, S25 and S17 of FIG. 5 or one of the steps S47, S49, S57 and S59 of FIG. 10, the servo control performed under the control of the servo circuit 10$e$ is set to the "off" condition, a temperature is measured by the temperature sensor 20, and offsets of the tracking and focus error signals TEO and FEO are adjusted according to the eighth or ninth operational example. That is, the laser power is set to a first level and a second level (0.25 mW and 0.5 mW, or 0 mW and 0.5 mW), voltage levels (or offset values) of the tracking and focus error signals TE and FE are measured by the CPU 11$e$ for each of the levels of the laser power, coefficients of the equation (1) or (10) are calculated, and corrected offset values for the tracking and focus error signals TE and FE and a particular laser power are calculated according to the equations (5) and (14) or the equations (18) and (22) and are output.

Thereafter, in cases where the optimizing operation is again required because of the change of the temperature detected by the temperature sensor 20, the coefficients stored in the ROM 11$d$ are corrected according to a temperature change, and other corrected offset values for the tracking and focus error signals TE and FE and the particular laser power are calculated according to the corrected coefficients and are output.

Accordingly, even though circumstance conditions such as temperature is changed, the optimizing operation can be performed at a short time without setting the servo control to the "off" condition.

Also, in cases where the laser power is changed, it is required to set the laser power at an optimizing value according to an ambient temperature, a temperature of the disk 1 and a temperature of the optical pick-up 2. Therefore, the particular laser power is read out from the disk 1 in the optimizing operation performed for the first time, the particular laser power is corrected by the CPU 11$e$ according to the ambient temperature detected by the temperature sensor 20 and an optimizing laser power equation stored in the ROM 11$d$, and corrected offset values for a corrected particular laser power are calculated and output. Thereafter, in cases where the optimizing operation is again required because of the change of the temperature detected by the temperature sensor 20, coefficients of the optimizing laser power equation according to a temperature change, the particular laser power is again corrected by the CPU 11$e$ according to the ambient temperature and the corrected optimizing laser power equation, and other corrected offset values for another corrected particular laser power are calculated and output.

Accordingly, even though an optimizing laser power changes with the temperature, the particular laser power can be reliably optimized at a short time, and the optimizing operation can be performed at a short time without setting the servo control to the "off" condition.

In the first to tenth operational examples, the focus offset and the tracking offset are adjusted by detecting the voltages of the focus and tracking error signals FE and TE. However, the focus offset and the tracking offset can be adjusted by detecting any of the detecting signals Sa to Sf and the focus and tracking error signals FE and TE. Also, the focus offset can be adjusted by detecting a first combined signal obtained by combining the detecting signals Sa and Sc and a second combined signal obtained by combining the detecting signals Sb and Sd. Also, the offset adjustment can be performed according to a run-in adjustment in place of the use of offset values stored in the ROM 11$d$.

In the first and fifth embodiments, the temperature sensor 20 is used as a first detecting means for detecting one of physical conditions (or circumstance conditions) of the optical disk recording and/or reproducing apparatus 32 or 81 or an optical recording medium represented by the disk 1. However, it is applicable that a sensor for detecting and measuring the change of humidity, the change of an electric source voltage, a physical change caused by an external shock, the change of a resonant condition caused by the difference in a rotational speed between inner and outer portions of the disk 1, the change of eccentricity of the disk 1, the change of a plane-shaking degree of the disk 1, the change of an optical characteristic of the disk 1 caused by the positional displacement of the disk 1, the change of a rotational speed of the disk 1 caused by the change of the performance of the spindle motor 3, the number of actuating times of the spindle motor 3, the number of moving times of the optical pick-up 2, or a sum of moving distances of the optical pick-up 2 be provided for the apparatus 32 or 81 in place of the temperature sensor 20 or in addition to the temperature sensor 20.

Also, the recording and/or reproducing operations are performed in the apparatus 32 or 81. However, it is applicable that the optimizing operation be performed in an optical disk recording or reproducing apparatus.

Also, the optical disk 1 has two layers. However, it is applicable that the optimizing operation be performed for a disk having a multi-layer structure.

Also, in the fifth embodiment, the request of the optimizing operation is judged according to the circumstance conditions such as the circumstance temperature detected by the temperature sensor 20. However, it is applicable that the optimizing operation be performed by temporarily stopping the recording operation according to the number of erred signals counted by the error counting unit 83 in the same manner as in the second embodiment. Also, in cases where the optimizing operation is performed by temporarily stopping the recording operation according to the number of erred signals, it is applicable that it is judged whether the optimizing operation is effective or noneffective, in the same manner as in the third embodiment. Also, it is applicable that the request of the optimizing operation be judged on every predetermined time, in the same manner as in the fourth embodiment.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An optical disk reproducing apparatus for reproducing pieces of information data recorded in a plurality of layers including a first layer and a second layer of an optical recording medium, comprising:

a transducer for reading out the information data from each of the layers of the optical recording medium;

buffer storing means for temporarily storing the information data read out from each of the layers by the transducer;

data rate controlling means for controlling the writing of the information data in the buffer storing means and the reading-out of the information data from the buffer storing means to write the information data read out by the transducer in the buffer storing means at a first data rate and read out the information data stored in the buffer storing means to an external apparatus at a second data rate lower than the first data rate;

servo control performing means for performing a tracking control of the transducer or a focus control of the transducer;

standby condition setting means for setting the transducer to a standby condition to temporarily stop the reading-out of the information data from each of the layers of the optical recording medium performed by the transducer;

optimizing operation performing means for performing a first optimizing operation for the first layer in which the tracking or focus control of the transducer performed by the servo control performing means is optimized to read out the information data from the first layer of the optical recording medium and a second optimizing operation for the second layer in which the tracking or focus control of the transducer performed by the servo control performing means is optimized to read out the information data from the second layer of the optical recording medium;

reproduction request receiving means for receiving a first request requesting the reproduction of the information data recorded in the first layer of the optical recording medium or a second request requesting the reproduction of the information data recorded in the second layer of the optical recording medium; and controlling means for performing a first control, in cases where the first request is received by the reproduction request receiving means, in which the optimizing operation performing means is controlled to perform the first optimizing operation for the first layer, the transducer of which the tracking or focus control is optimized by the optimizing operation performing means is controlled to read out pieces of first information data from the first layer of the optical recording medium under control of the servo control performing means, the data rate controlling means is controlled to write the first information data read out by the transducer in the buffer storing means at the first data rate and read out the first information data stored in the buffer storing means to the external apparatus at the second data rate, it is judged whether or not a volume of the first information data stored in the buffer storing means is equal to or more than a first predetermined value, the standby condition setting means is controlled to set the transducer to a standby condition in cases where the volume of the first information data is equal to or more than the first predetermined value, the optimizing operation performing means is controlled to perform the second operation for the second layer while setting the transducer to the standby condition and reading out the first information data stored in the buffer storing means to the external apparatus, it is judged whether or not the volume of the first information data stored in the buffer storing means is equal to or less than a second predetermined value, and the transducer and the data rate controlling means are controlled to read out pieces of other first information data from the first layer of the optical recording medium and write the other first information data in the buffer storing means in cases where the volume of the first information data is equal to or less than the second predetermined value, and performing a second control, in cases where the second request is received by the reproduction request receiving means, in which the optimizing operation performing means is controlled to perform the second optimizing operation for the second layer, the transducer of which the tracking or focus control is optimized by the optimizing operation performing means is controlled to read out pieces of second information data from the second layer of the optical recording medium under control of the servo control performing means, the data rate controlling means is controlled to write the second information data read out by the transducer in the buffer storing means at the first data rate and read out the second information data stored in the buffer storing means to the external apparatus at the second data rate, it is judged whether or not a volume of the second information data stored in the buffer storing means is equal to or more than the first predetermined value, the standby condition setting means is controlled to set the transducer to a standby condition in cases where the volume of the second information data is equal to or more than the first predetermined value, the optimizing operation performing means is controlled to perform the first operation for the first layer while setting the transducer to the standby condition and reading out the second information data stored in the buffer storing means to the external apparatus, it is judged whether or not the volume of the second information data stored in the buffer storing means is equal to or less than the second predetermined value, and the transducer and the data rate controlling means are controlled to write pieces of other second information data read out from the second layer of the optical recording medium in the buffer storing means at the first data rate and read out the other second information data from the buffer storing means at the second data rate in cases where the volume of the second information data is equal to or less than the second predetermined value.

2. An optical disk reproducing apparatus according to claim 1 in which at least one other optimizing operation for at least one layer other than the first and second layers is performed in the optimizing operation performing means in cases where the at least one layer other than the first and second layers exists in the optical recording medium, the tracking or focus control performed by the servo controlling means for the transducer through which the information data are read out from the at least one layer of the optical recording medium being optimized in the at least one other optimizing operation.

3. An optical disk reproducing apparatus for reproducing pieces of information data recorded in a plurality of layers including a first layer and a second layer of an optical recording medium, comprising:

a transducer for reading out the information data from each of the layers of the optical recording medium;

buffer storing means for temporarily storing the information data read out from each of the layers by the transducer;

data rate controlling means for controlling the writing of the information data in the buffer storing means and the reading-out of the information data from the buffer storing means to write the information data read out by the transducer in the buffer storing means at a first data rate and read out the information data stored in the buffer storing means to an external apparatus at a second data rate lower than the first data rate;

servo control performing means for performing a tracking control of the transducer or a focus control of the transducer;

standby condition setting means for setting the transducer to a standby condition to temporarily stop the reading-out of the information data from each of the layers of the optical recording medium performed by the transducer;

optimizing operation performing means for performing a first optimizing operation for the first layer in which the tracking or focus control of the transducer performed by the servo control performing means is optimized to read out the information data from the first layer of the optical recording medium and a second optimizing operation for the second layer in which the tracking or focus control of the transducer performed by the servo control performing means is optimized to read out the information data from the second layer of the optical recording medium;

reproduction request receiving means for receiving a first request requesting the reproduction of the information data recorded in the first layer of the optical recording medium or a second request requesting the reproduction of the information data recorded in the second layer of the optical recording medium;

optimizing operation requesting means for requesting the performance of the first or second optimizing operation of the optimizing operation performing means; and controlling means for performing a first control, in cases where the first request is received by the reproduction request receiving means, in which the transducer is controlled to read out pieces of first information data from the first layer of the optical recording medium under control of the servo control performing means, the data rate controlling means is controlled to write the first information data read out by the transducer in the buffer storing means at the first data rate and read out the first information data stored in the buffer storing means to the external apparatus at the second data rate, it is judged whether or not a volume of the first information data stored in the buffer storing means is equal to or more than a first predetermined value, the standby condition setting means is controlled to set the transducer to a standby condition in cases where the volume of the first information data is equal to or more than the first predetermined value, it is judged whether or not the optimizing operation requesting means requests the performance of the first or second optimizing operation of the optimizing operation performing means in cases where the transducer is set to the standby condition, the optimizing operation performing means is controlled to perform the first optimizing operation for the first layer in cases where the optimizing operation requesting means requests the performance of the first or second optimizing operation of the optimizing operation performing means, the optimizing operation performing means is controlled to perform the second operation for the second layer while reading out the first information data stored in the buffer storing means to the external apparatus in cases where the first optimizing operation is performed by the optimizing operation performing means, it is judged whether or not the volume of the first information data stored in the buffer storing means is equal to or less than a second predetermined value, and the transducer and the data rate controlling means are controlled to read out pieces of other first information data from the first layer of the optical recording medium and write the other first information data in the buffer storing means in cases where the volume of the first information data is equal to or less than the second predetermined value, and performing a second control, in cases where the second request is received by the reproduction request receiving means, in which the transducer is controlled to read out pieces of second information data from the second layer of the optical recording medium under control of the servo control performing means, the data rate controlling means is controlled to write the second information data read out by the transducer in the buffer storing means at the first data rate and read out the second information data stored in the buffer storing means to the external apparatus at the second data rate, it is judged whether or not a volume of the second information data stored in the buffer storing means is equal to or more than a first predetermined value, the standby condition setting means is controlled to set the transducer to a standby condition in cases where the volume of the second information data is equal to or more than the first predetermined value, it is judged whether or not the optimizing operation requesting means requests the performance of the first or second optimizing operation of the optimizing operation performing means in cases where the transducer is set to the standby condition, the optimizing operation performing means is controlled to perform the second optimizing operation for the second layer in cases where the optimizing operation requesting means requests the performance of the first or second optimizing operation of the optimizing operation performing means, the optimizing operation performing means is controlled to perform the first operation for the first layer while reading out the second information data stored in the buffer storing means to the external apparatus in cases where the second optimizing operation is performed by the optimizing operation performing means, it is judged whether or not the volume of the second information data stored in the buffer storing means is equal to or less than a second predetermined value, and the transducer and the data rate controlling means are controlled to write pieces of other second information data read out from the second layer of the optical recording medium in the buffer storing means at the first data rate and read out the other second information data from the buffer storing means at the second data rate in cases where the volume of the second information data is equal to or less than the second predetermined value.

4. An optical disk reproducing apparatus according to claim 3 in which the optimizing operation requesting means comprises:

physical condition detecting means for detecting a physical condition value of the optical disk reproducing apparatus or the optical recording medium; and physical condition judging means for judging whether or not the physical condition value detected by the physical condition detecting means exceeds a reference value or whether or not a difference between a physical condition value currently detected by the physical condition detecting means and another physical condition value previously detected by the physical condition detecting means is larger than a prescribed value and requesting the performance of the first or second optimizing operation in cases where the physical condition value exceeds the reference value or the difference is larger than the prescribed value.

5. An optical disk reproducing apparatus according to claim 3 in which the optimizing operation requesting means comprises:

error correcting means for correcting one or more erred signals obtained by erroneously reading out one or more pieces of particular information data from a particular layer of the optical recording medium;

error counting means for counting the number of erred signals corrected by the error correcting means; and error signal judging means for judging whether or not the number of erred signals counted by the error counting means is higher than a reference number and requesting the performance of the first or second optimizing operation in cases where the number of erred signals is higher than the reference number.

6. An optical disk reproducing apparatus according to claim 5 in which the optimizing operation requesting means further comprises:

reproducing operation controlling means for controlling the servo control performing means and the transducer to again read out the particular information data from the particular layer of the optical recording medium, one or more particular erred signals obtained by erroneously reading out the particular information data again being corrected by the error correcting means, the number of particular erred signals being counted by the error counting means, and the number of particular erred signals counted being judged by the error signal judging means; and alarming means for controlling the optimizing operation performing means to stop the first, second and other optimizing operations and outputting an alarm in cases where it is judged by the error signal judging means that the number of particular erred signals is higher than the reference number.

7. An optical disk reproducing apparatus according to claim 3 in which the optimizing operation requesting means comprises:

time interval detecting means for detecting a predetermined time interval; and requesting means for requesting the performance of the first or second optimizing operation on every predetermined time interval detected by the time interval detecting means.

8. An optical disk reproducing apparatus according to claim 3 in which at least one other optimizing operation for at least one layer other than the first and second layers is performed in the optimizing operation performing means in cases where the at least one layer other than the first and second layers exists in the optical recording medium, the tracking or focus control performed by the servo controlling means for the transducer through which the information data are read out from the at least one layer of the optical recording medium being optimized in the at least one other optimizing operation.

9. An optical disk recording apparatus for recording pieces of information data transmitted from an external apparatus in a plurality of layers including a first layer and a second layer of an optical recording medium, comprising:

buffer storing means for temporarily storing the information data transmitted from the external apparatus;

data rate controlling means for controlling the writing of the information data in the buffer storing means and the reading-out of the information data from the buffer storing means to read out the information data from the buffer storing means at a first data rate and write the information data transmitted from the external apparatus in the buffer storing means at a second data rate lower than the first data rate;

a transducer for writing the information data read out from the buffer storing means under control of the data rate controlling means in each of the layers of the optical recording medium;

servo control performing means for performing a tracking or focus control for the transducer;

standby condition setting means for setting the transducer to a standby condition to temporarily stop the writing of the information data performed by the transducer;

optimizing operation performing means for performing a first optimizing operation for the first layer in which the tracking or focus control for the transducer performed by the servo control performing means is optimized to write the information data in the first layer of the optical recording medium and a second optimizing operation for the second layer in which the tracking or focus control for the transducer performed by the servo control performing means is optimized to write the information data in the second layer of the optical recording medium;

recording request receiving means for receiving a first request requesting the recording of the information data in the first layer of the optical recording medium or a second request requesting the recording of the information data in the second layer of the optical recording medium; and controlling means for performing a first control, in cases where the first request is received by the recording request receiving means, in which the optimizing operation performing means is controlled to perform the first optimizing operation for the first layer, the data rate controlling means is controlled to write pieces of first information data transmitted from an external apparatus in the buffer storing means at the second data rate and read out the first information data stored in the buffer storing means to the transducer at the first data rate, the transducer of which the tracking or focus control is optimized by the optimizing operation performing means is controlled to write the first information data read out from the buffer storing means in the first layer of the optical recording medium under control of the servo control performing means, it is judged whether or not a volume of the first information data stored in the buffer storing means is equal to or more than a first predetermined value, the standby condition setting means is controlled to set the transducer to the standby condition in cases where the volume of the first information data is less than the first predetermined value, the optimizing operation performing means is controlled to perform the second operation for the second layer while writing one or more pieces of other first information data transmitted from the external apparatus in the buffer storing means in cases where the transducer is set to the standby condition and the transducer is controlled to write the first information data stored in the buffer storing means in the first layer of the optical recording medium under control of the servo control performing means in cases where the volume of the first information data is equal to or more than the first predetermined value, and performing a second control, in cases where the second request is received by the recording request receiving means, in which the optimizing operation performing means is controlled to perform the second optimizing operation for the second layer, the data rate controlling means is controlled to write pieces of second information data transmitted from an external apparatus in the buffer storing means at the second data rate and read out the second information data stored in the buffer storing means to the transducer at the first data rate, the transducer of which the tracking or focus control is optimized by the optimizing operation performing means is controlled to write the second information data in the second layer of the optical recording medium under control of the servo control performing means, it is judged whether or not a volume of the second information data stored in the buffer storing means is equal to or more than a first predetermined value, the standby condition setting means is controlled to set the transducer to the standby condition in cases where the volume of the first information data is less than the first predetermined value, the optimizing operation performing means is controlled to perform the first and operation for the first layer while writing one or more pieces of other second information data transmitted from the external apparatus in the buffer storing means in cases where the transducer is set to the standby condition and the transducer is controlled to write the second information data stored in the buffer storing means in the second layer of the optical recording medium under control of the servo control performing means in cases where the volume of the first information data is equal to or more than the first predetermined value.

10. An optical disk reproducing apparatus according to claim 9 in which at least one other optimizing operation for at least one layer other than the first and second layers is performed in the optimizing operation performing means in cases where the at least one layer other than the first and second layers exists in the optical recording medium, the tracking or focus control performed by the servo controlling means for the transducer through which the information data are written in the at least one layer of the optical recording medium being optimized in the at least one other optimizing operation.

11. An optical disk recording apparatus for recording pieces of information data transmitted from an external apparatus in a plurality of layers including a first layer and a second layer of an optical recording medium, comprising:

buffer storing means for temporarily storing the information data transmitted from the external apparatus;

data rate controlling means for controlling the writing of the information data in the buffer storing means and the reading-out of the information data from the buffer storing means to read out the information data from the buffer storing means at a first data rate and write the information data transmitted from the external apparatus in the buffer storing means at a second data rate lower than the first data rate;

a transducer for writing the information data read out from the buffer storing means under control of the data rate controlling means in each of the layers of the optical recording medium;

servo control performing means for performing a tracking or focus control for the transducer;

standby condition setting means for setting the transducer to a standby condition to temporarily stop the writing of the information data performed by the transducer;

optimizing operation performing means for performing a first optimizing operation for the first layer in which the tracking or focus control for the transducer performed by the servo control performing means is optimized to write the information data in the first layer of the optical recording medium, a second optimizing operation for the second layer in which the tracking or focus control for the transducer performed by the servo control performing means is optimized to write the information data in the second layer of the optical recording medium;

recording request receiving means for receiving a first request requesting the recording of the information data in the first layer of the optical recording medium or a second request requesting the recording of the information data in the second layer of the optical recording medium;

optimizing operation requesting means for requesting the performance of the first or second optimizing operation of the optimizing operation performing means; and controlling means for performing a first control, in cases where the first request is received by the reproduction request receiving means, in which the data rate controlling means is controlled to write pieces of first information data transmitted from an external apparatus in the buffer storing means at the second data rate and read out the first information data from the buffer storing means at the first data rate, the transducer is controlled to write the first information data read out from the buffer storing means in the first layer of the optical recording medium, it is judged whether or not a volume of the first information data stored in the buffer storing means is equal to or more than a first predetermined value, the standby condition setting means is controlled to set the transducer to a standby condition in cases where the volume of the first information data is less than the first predetermined value, it is judged whether or not the optimizing operation requesting means requests the performance of the first or second optimizing operation of the optimizing operation performing means in cases where the transducer is set to the standby condition, the optimizing operation performing means is controlled to perform the first optimizing operation for the first layer while writing one or more pieces of other first information data transmitted from the external apparatus in the buffer storing means in cases where the optimizing operation requesting means requests the performance of the first or second optimizing operation of the optimizing operation performing means, the optimizing operation performing means is controlled to perform the second operation for the second layer while writing the other first information data in the buffer storing means in cases where the first optimizing operation is performed by the optimizing operation performing means and the transducer is controlled to write the first information data stored in the buffer storing means in the first layer of the optical recording medium under control of the servo control performing means in cases where the volume of the first information data is equal to or more than the first predetermined value, and performing a second control, in cases where the second request is received by the reproduction request receiving means, in which the data rate controlling means is controlled to write pieces of second information data transmitted from the external apparatus in the buffer storing means at the second data rate and read out the second information data from the buffer storing means at the first data rate, the transducer is controlled to write the second information data read out from the buffer storing means in the second layer of the optical recording medium, it is judged whether or not a volume of the second information data stored in the buffer storing means is equal to or more than the first predetermined value, the standby condition setting means is controlled to set the transducer to a standby condition in cases where the volume of the second information data is less than the first predetermined value, it is judged whether or not the optimizing operation requesting means requests the performance of the first or second optimizing operation of the optimizing operation performing means in cases where the transducer is set to the standby condition, the optimizing operation performing means is controlled to perform the second optimizing operation for the second layer while writing one or more pieces of other second information data transmitted from the external apparatus in the buffer storing means in cases where the optimizing operation requesting means requests the performance of the first or second optimizing operation of the optimizing operation performing means, the optimizing operation performing means is controlled to perform the first operation for the first layer while writing the other second information data in the buffer storing means in cases where the second optimizing operation is performed by the optimizing operation performing means and the transducer is controlled to write the second information data stored in the buffer storing means in the second layer of the optical recording medium under control of the servo control performing means in cases where the volume of the second information data is equal to or more than the first predetermined value.

12. An optical disk recording apparatus according to claim 11 in which the optimizing operation requesting means comprises:

physical condition detecting means for detecting a physical condition value of the optical disk recording apparatus or the optical recording medium; and physical condition judging means for judging whether or not the physical condition value detected by the physical condition detecting means exceeds a reference value or whether or not a difference between a physical condition value currently detected by the physical condition detecting means and another physical condition value previously detected by the physical condition detecting means is larger than a prescribed value and requesting the performance of the first or second optimizing operation in cases where the physical condition value exceeds the reference value or the difference is larger than the prescribed value.

13. An optical disk recording apparatus according to claim 11 in which the optimizing operation requesting means comprises:

time interval detecting means for detecting a predetermined time interval; and requesting means for requesting the performance of the first or second optimizing operation on every predetermined time interval detected by the time interval detecting means.

14. An optimizing method of a servo control in an optical disk reproducing apparatus having a transducer for reading out pieces of information data recorded in a plurality of layers including a first layer and a second layer of an optical recording medium, buffer storing means for temporarily storing the information data read out by the transducer, data rate controlling means for controlling the writing of the information data in the buffer storing means and the reading-out of the information data from the buffer storing means to write the information data read out by the transducer in the buffer storing means at a first data rate and read out the information data stored in the buffer storing means to an external apparatus at a second data rate lower than the first data rate, and servo controlling means for performing a tracking or focus control for the transducer, comprising the steps of:

judging whether a first request requesting the reproduction of the information data recorded in the first layer of the optical recording medium is received or a second request requesting the reproduction of the information data recorded in the second layer of the optical recording medium is received;

performing a first optimizing operation for the first layer in which the tracking or focus control performed by the servo controlling means for the transducer through which the information data are read out from the first layer of the optical recording medium is optimized in cases where it is judged that the first request is received;

reading out pieces of first information data from the first layer of the optical recording medium under control of the servo controlling means through the transducer for which the tracking or focus control is optimized;

writing the first information data read out from the first layer in the buffer storing means at the first data rate under control of the data rate controlling means;

reading out the first information data stored in the buffer storing means to an external apparatus at the second data rate under control of the data rate controlling means;

judging whether or not a volume of the first information data stored in the buffer storing means is equal to or more than a first predetermined value;

setting the transducer to a standby condition to temporarily stop the reading of the first information data from the first layer of the optical recording medium in cases where it is judged that the volume of the first information data stored in the buffer storing means is equal to or more than the first predetermined value;

performing a second optimizing operation for the second layer in which the tracking or focus control performed by the servo controlling means for the transducer through which the information data are read out from the second layer of the optical recording medium is optimized, while reading out the first information data stored in the buffer storing means to the external apparatus in cases where the transducer is set to the standby condition;

judging whether or not the volume for the first information data stored in the buffer storing means is equal to or less than a second predetermined value;

reading out pieces of other first information data from the first layer of the optical recording medium though the transducer under control of the servo controlling means and writing the other first information data in the buffer storing means in cases where it is judged that the volume of the first information data is equal to or less than the second predetermined value;

performing the second optimizing operation for the second layer in cases where it is judged that the second request is received;

reading out pieces of second information data from the second layer of the optical recording medium under control of the servo controlling means through the transducer for which the tracking or focus control is optimized;

writing the second information data read out from the second layer in the buffer storing means at the first data rate under control of the data rate controlling means;

reading out the second information data stored in the buffer storing means to the external apparatus at the second data rate under control of the data rate controlling means;

judging whether or not a volume of the second information data stored in the buffer storing means is equal to or more than the first predetermined value;

setting the transducer to the standby condition to temporarily stop the reading of the second information from the second layer of the optical recording medium in cases where it is judged that the volume of the second information data stored in the buffer storing means is equal to or more than the first predetermined value;

performing the first operation for the first layer while reading out the second information data stored in the buffer storing means to the external apparatus in cases where the transducer is set to the standby condition;

judging whether or not the volume of the second information data stored in the buffer storing means is equal to or less than the second predetermined value; and reading out pieces of other second information data from the second layer of the optical recording medium though the transducer under control of the servo controlling means and writing the other second information data in the buffer storing means in cases where it is judged that the volume of the second information data is equal to or less than the second predetermined value.

15. An optimizing method of a servo control in an optical disk reproducing apparatus having a transducer for reading out pieces of information data recorded in a plurality of layers including a first layer and a second layer of an optical recording medium, buffer storing means for temporarily storing the information data read out by the transducer, data rate controlling means for controlling the writing of the information data in the buffer storing means and the reading out of the information data from the buffer storing means to write the information data read out by the transducer in the buffer storing means at a first data rate and read out the information data stored in the buffer storing means to an external apparatus at a second data rate lower than the first data rate, servo controlling means for performing a tracking or focus control for the transducer, and optimizing operation requesting means for requesting an optimizing operation, comprising the steps of:

judging whether a first request requesting the reproduction of the information data recorded in the first layer of the optical recording medium is received or a second request requesting the reproduction of the information data recorded in the second layer of the optical recording medium is received;

reading out pieces of first information data from the first layer of the optical recording medium under control of the servo controlling means through the transducer in cases where it is judged that the first request is received;

writing the first information data read out from the first layer in the buffer storing means at the first data rate under control of the data rate controlling means;

reading out the first information data stored in the buffer storing means to an external apparatus at the second data rate under control of the data rate controlling means;

judging whether or not a volume of the first information data stored in the buffer storing means is equal to or more than a first predetermined value;

setting the transducer to a standby condition to temporarily stop the reading of the first information data from the first layer of the optical recording medium in cases where it is judged that the volume of the first information data stored in the buffer storing means is equal to or more than the first predetermined value;

judging whether or not the optimizing operation requesting means requests an optimizing operation in cases where the transducer is set to the standby condition;

performing a first optimizing operation for the first layer, in which the tracking or focus control performed by the servo controlling means for the transducer through which the information data are read out from the first layer of the optical recording medium is optimized, while reading out the first information data stored in the buffer storing means to the external apparatus in cases where it is judged that the optimizing operation requesting means requests an optimizing operation;

performing a second optimizing operation for the second layer, in which the tracking or focus control performed by the servo controlling means for the transducer through which the information data are read out from the second layer of the optical recording medium is optimized, while reading out the first information data stored in the buffer storing means to the external apparatus in cases where the first optimizing operation is performed;

judging whether or not the volume of the first information data stored in the buffer storing means is equal to or less than a second predetermined value;

reading out pieces of other first information data from the first layer of the optical recording medium though the transducer under control of the servo controlling means and writing the other first information data in the buffer storing means in cases where it is judged that the volume of the first information data is equal to or less than the second predetermined value;

reading out pieces of second information data from the second layer of the optical recording medium under control of the servo controlling means through the transducer in cases where it is judged that the second request is received;

writing the second information data read out from the second layer in the buffer storing means at the first data rate under control of the data rate controlling means;

reading out the second information data stored in the buffer storing means to the external apparatus at the second data rate under control of the data rate controlling means;

judging whether or not a volume of the second information data stored in the buffer storing means is equal to or more than the first predetermined value;

setting the transducer to the standby condition to temporarily stop the reading of the second information data from the second layer of the optical recording medium in cases where it is judged that the volume of the second information data stored in the buffer storing means is equal to or more than the first predetermined value;

judging whether or not the optimizing operation requesting means requests an optimizing operation in cases where the transducer is set to the standby condition;

performing the second optimizing operation for the second layer while reading out the second information data stored in the buffer storing means to the external apparatus in cases where it is judged that the optimizing operation requesting means requests an optimizing operation;

performing the first operation for the first layer while reading out the second information data stored in the buffer storing means to the external apparatus in cases where the second optimizing operation is performed;

judging whether or not the volume of the second information data stored in the buffer storing means is equal to or less than the second predetermined value; and reading out pieces of other second information data from the second layer of the optical recording medium though the transducer under control of the servo controlling means and writing the other second information data in the buffer storing means in cases where it is judged that the volume of the second information data is equal to or less than the second predetermined value.

16. An optimizing method according to claim 15 in which each of the steps of judging whether or not the optimizing operation requesting means requests an optimizing operation, comprising the steps of:

detecting a physical condition value of the optical disk reproducing apparatus or the optical recording medium;

judging whether or not the physical condition value exceeds a reference value or whether or not a difference between a physical condition value currently detected and another physical condition value previously detected is larger than a prescribed value; and requesting an optimizing operation in cases where the physical condition value exceeds the reference value or the difference is larger than the prescribed value.

17. An optimizing method according to claim 15 in which each of the steps of judging whether or not the optimizing operation requesting means requests an optimizing operation, comprising the steps of:

correcting one or more erred signals obtained by erroneously reading out one or more pieces of particular information data from the first or second layer of the optical recording medium;

counting the number of erred signals corrected;

judging whether or not the number of erred signals counted is higher than a reference number; and requesting an optimizing operation in cases where the number of erred signals is higher than the reference number.

18. An optimizing method according to claim 17 in which each of the steps of judging whether or not the optimizing operation requesting means requests an optimizing operation, further comprising the steps of:

again reading out the particular information data from the first or second layer of the optical recording medium, correcting one or more particular erred signals obtained by erroneously reading out the particular information data again from the first or second layer of the optical recording medium;

counting the number of particular erred signals corrected;

judging whether or not the number of particular erred signals counted is higher than the reference number; and stopping the first, second and other optimizing operations and outputting an alarm in cases where it is judged that the number of particular erred signals is higher than the reference number.

19. An optimizing method according to claim 15 in which each of the steps of judging whether or not the optimizing operation requesting means requests an optimizing operation, comprising the steps of:

detecting a predetermined time interval; and requesting an optimizing operation on every predetermined time interval detected.

20. An optimizing method of a servo control in an optical disk recording apparatus having buffer storing means for temporarily storing pieces of information data transmitted from an external apparatus, data rate controlling means for controlling the writing of the information data in the buffer storing means and the reading-out of the information data from the buffer storing means to read out the information data from the buffer storing means at a first data rate and write the information data in the buffer storing means at a second data rate lower than the first data rate, a transducer for writing the information data read out from the buffer storing means in a plurality of layers including a first layer and a second layer of an optical recording medium, and servo controlling means for performing a tracking or focus control for the transducer, comprising the steps of:

judging whether a first request requesting the recording of the information data recorded in the first layer of the optical recording medium is received or a second request requesting the recording of the information data recorded in the second layer of the optical recording medium is received;

performing a first optimizing operation for the first layer in which the tracking or focus control performed by the servo controlling means for the transducer through which the information data are written in the first layer of the optical recording medium is optimized in cases where it is judged that the first request is received;

writing pieces of first information data transmitted from the external apparatus in the buffer storing means at the second data rate under the control of the data rate controlling means;

reading out the first information data stored in the buffer storing means to the transducer at the first data rate under the control of the data rate controlling means;

judging whether or not a volume of the first information data stored in the buffer storing means is equal to or more than a first predetermined value;

setting the transducer to a standby condition to temporarily stop the writing of the first information data performed by the transducer in cases where the volume of the first information data is less than the first predetermined value;

performing a second optimizing operation for the second layer, in which the tracking or focus control performed by the servo controlling means for the transducer through which the information data are written in the second layer of the optical recording medium is optimized, while writing one or more pieces of other first information data transmitted from the external apparatus in the buffer storing means in cases where the transducer is set to the standby condition;

writing the first information data stored in the buffer storing means in the first layer of the optical recording medium under control of the servo controlling means in cases where the volume of the first information data is equal to or more than the first predetermined value;

performing the second optimizing operation for the second layer in cases where it is judged that the second request is received;

writing pieces of second information data transmitted from the external apparatus in the buffer storing means at the second data rate under the control of the data rate controlling means;

reading out the second information data stored in the buffer storing means to the transducer at the first data rate under the control of the data rate controlling means;

judging whether or not a volume of the second information data stored in the buffer storing means is equal to or more than the first predetermined value;

setting the transducer to the standby condition to temporarily stop the writing of the second information data performed by the transducer in cases where the volume of the second information data is less than the first predetermined value;

performing the first operation for the first layer while writing one or more pieces of other second information data transmitted from the external apparatus in the buffer storing means in cases where the transducer is set to the standby condition; and writing the second information data stored in the buffer storing means in the second layer of the optical recording medium under control of the servo controlling means in cases where the volume of the second information data is equal to or more than the first predetermined value.

21. An optimizing method of a servo control in an optical disk recording apparatus having buffer storing means for temporarily storing pieces of information data transmitted from an external apparatus, data rate controlling means for controlling the writing of the information data in the buffer storing means and the reading-out of the information data from the buffer storing means to read out the information data from the buffer storing means at a first data rate and write the information data in the buffer storing means at a second data rate lower than the first data rate, a transducer for writing the information data read out from the buffer storing means in a plurality of layers including a first layer and a second layer of an optical recording medium, servo controlling means for performing a tracking or focus control for the transducer, and optimizing operation requesting means for requesting an optimizing operation, comprising the steps of:

judging whether a first request requesting the recording of the information data recorded in the first layer of the optical recording medium is received or a second request requesting the recording of the information data recorded in the second layer of the optical recording medium is received;

writing pieces of information data transmitted from the external apparatus in the buffer storing means at the second data rate under control of the data rate controlling means in cases where it is judged that the first request is received;

reading out the first information data from the buffer storing means at the first data rate under control of the data rate controlling means to write the first information data in the first layer of the optical recording medium through the transducer;

judging whether or not a volume of the first information data stored in the buffer storing means is equal to or more than a first predetermined value;

setting the transducer to a standby condition to temporarily stop the writing of the first information data performed by the transducer in cases where the volume of the first information data is less than the first predetermined value;

judging whether or not the optimizing operation requesting means requests an optimizing operation in cases where the transducer is set to the standby condition;

performing a first optimizing operation for the first layer, in which the tracking or focus control performed by the servo controlling means for the transducer through which the first information data are written in the first layer of the optical recording medium is optimized, while writing one or more pieces of other first information data transmitted from the external apparatus in the buffer storing means in cases where the optimizing operation requesting means requests the optimizing operation;

performing a second optimizing operation for the second layer, in which the tracking or focus control performed by the servo controlling means for the transducer through which the information data are written in the second layer of the optical recording medium is optimized, while writing the other first information data in the buffer storing means in cases where the first optimizing operation is performed;

writing the first information data stored in the buffer storing means in the first layer of the optical recording medium through the transducer under control of the servo controlling means in cases where the volume of the first information data is equal to or more than the first predetermined value;

writing pieces of second information data transmitted from the external apparatus in the buffer storing means at the second data rate under control of the data rate controlling means in cases where it is judged that the second request is received;

reading out the second information data from the buffer storing means at the first data rate under control of the data rate controlling means to write the second information data in the first layer of the optical recording medium through the transducer;

judging whether or not a volume of the second information data stored in the buffer storing means is equal to or more than the first predetermined value;

setting the transducer to the standby condition to temporarily stop the writing of the second information data performed by the transducer in cases where the volume of the second information data is less than the first predetermined value;

judging whether or not the optimizing operation requesting means requests an optimizing operation in cases where the transducer is set to standby condition;

performing the second optimizing operation for the second layer while writing one or more pieces of other second information data transmitted from the external apparatus in the buffer storing means in cases where the optimizing operation requesting means requests the optimizing operation;

performing the first operation for the first layer while writing the other second information data in the buffer storing means in cases where the second optimizing operation is performed; and writing the second information data stored in the buffer storing means in the second layer of the optical recording medium through the transducer under control of the servo controlling means in cases where the volume of the second information data is equal to or more than the first predetermined value.

22. An optimizing method according to claim 21 in which each of the steps of judging whether or not the optimizing operation requesting means requests an optimizing operation, comprising the steps of:

detecting a physical condition value of the optical disk recording apparatus or the optical recording medium;

judging whether or not the physical condition value exceeds a reference value or whether or not a difference between a physical condition value currently detected and another physical condition value previously detected is larger than a prescribed value; and requesting an optimizing operation in cases where the physical condition value exceeds the reference value or the difference is larger than the prescribed value.

23. An optimizing method according to claim 21 in which each of the steps of judging whether or not the optimizing operation requesting means requests an optimizing operation, comprising the steps of:

detecting a predetermined time interval; and requesting an optimizing operation on every predetermined time interval detected.

24. An optimizing method of a servo control in an optical disk reproducing apparatus having a transducer for reading out pieces of information data recorded in a single layer of an optical recording medium, buffer storing means for temporarily storing the information data read out by the transducer, data rate controlling means for controlling the writing of the information data in the buffer storing means and the reading out of the information data from the buffer storing means to write the information data read out by the transducer in the buffer storing means at a first data rate and read out the information data stored in the buffer storing means to an external apparatus at a second data rate lower than the first data rate, servo controlling means for performing a tracking or focus control for the transducer, and optimizing operation requesting means for requesting an optimizing operation, comprising the steps of:

writing pieces of information data read out from the layer of the optical recording medium to the buffer storing means through the transducer at the first data rate under control of the servo control performing means;

reading out the information data stored in the buffer storing means to the external apparatus at the second data rate under control of the servo control performing means;

judging whether or not a volume of the information data stored in the buffer storing means is equal to or more than a first predetermined value;

setting the transducer to a standby condition to temporarily stop the reading of the information data performed by the transducer in cases where the volume of the information data is equal to or more than the first predetermined value;

correcting one or more erred signals obtained by erroneously reading out one or more pieces of particular information data from the layer of the optical recording medium in cases where the transducer is set to the standby condition;

counting the number of erred signals corrected;

judging whether or not the number of erred signals counted is higher than a reference number;

requesting an optimizing operation in the optimizing operation requesting means in cases where the number of erred signals is higher than the reference number;

performing the optimizing operation for the layer of the optical recording medium, in which the tracking or focus control performed by the servo controlling means for the transducer through which the information data are written in the layer of the optical recording medium is optimized in cases where the optimizing operation requesting means requests the optimizing operation;

again reading out the particular information data from the layer of the optical recording medium, correcting one or more particular erred signals obtained by erroneously reading out the particular information data again from the layer of the optical recording medium;

counting the number of particular erred signals corrected;

judging whether or not the number of particular erred signals counted is higher than the reference number;

stopping the optimizing operation and outputting an alarm in cases where it is judged that the number of particular erred signals is higher than the reference number;

judging whether or not the volume of the information data stored in the buffer storing means is equal to or less than a second predetermined valuein cases where it is judged that the number of particular erred signals is equal to or lower than the reference number; and reading out pieces of other information data from the layer of the optical recording medium and writing the other information data in the buffer storing means in cases where the volume of the information data is equal to or less than the second predetermined value.

* * * * *